(12) United States Patent
Adogla et al.

(10) Patent No.: US 12,095,868 B2
(45) Date of Patent: Sep. 17, 2024

(54) CLOUD BASED CROSS DOMAIN SYSTEM—VIRTUAL DATA DIODE

(71) Applicant: Oracle International Corporation, Redwood Shores, CA (US)

(72) Inventors: Eden Grail Adogla, Seattle, WA (US); Thomas Werner Kuehnel, Seattle, WA (US)

(73) Assignee: Oracle International Corporation, Redwood Shores, CA (US)

(*) Notice: Subject to any disclaimer, the term of this patent is extended or adjusted under 35 U.S.C. 154(b) by 0 days.

(21) Appl. No.: 17/534,187

(22) Filed: Nov. 23, 2021

(65) Prior Publication Data

US 2023/0164224 A1    May 25, 2023

(51) Int. Cl.
*H04L 67/141* (2022.01)
*H04L 49/00* (2022.01)

(52) U.S. Cl.
CPC ............ *H04L 67/141* (2013.01); *H04L 49/30* (2013.01)

(58) Field of Classification Search
None
See application file for complete search history.

(56) References Cited

U.S. PATENT DOCUMENTS

| | | | |
|---|---|---|---|
| 8,139,581 B1 * | 3/2012 | Mraz | H04L 63/105 370/395.3 |
| 9,053,114 B1 | 6/2015 | Lemar et al. | |
| 10,242,045 B2 | 3/2019 | Grue et al. | |
| 10,474,613 B1 * | 11/2019 | Dunn | H04W 12/128 |
| 11,245,762 B1 * | 2/2022 | BenHanokh | H04L 67/60 |
| 2013/0232564 A1 * | 9/2013 | Ellis | G06F 21/85 726/11 |
| 2014/0139737 A1 * | 5/2014 | Clarke | H04N 21/2381 348/465 |

(Continued)

FOREIGN PATENT DOCUMENTS

| | | | | |
|---|---|---|---|---|
| EP | 2830270 A1 | 1/2015 | | |
| WO | WO-2019007582 A1 * | 1/2019 | ......... | H04L 63/0209 |

OTHER PUBLICATIONS

Borges de Freitas et al., "SDN-enabled virtual data diode", Conference: 4th ESORICS Workshop On The Security Of Industrial Control Systems & Of Cyber-Physical Systems (CyberICPS 2018), Sep. 2018, pp. 17.

(Continued)

*Primary Examiner* — Tonia L Dollinger
*Assistant Examiner* — Ishrat Rashid
(74) *Attorney, Agent, or Firm* — Invoke

(57) ABSTRACT

In some aspects, a network interface card (NIC) may receive, at a first node of a network interface card associated with a disconnected network, a message intended for the disconnected network and sent using a first communication protocol. The network interface card may send the message from the first node to a second node of the network interface card using a second communication protocol, the second communication protocol being configured for unidirectional communication. The network interface card may receive the message at the second node. The network interface card may send, from the second node, the message to a destination node of the disconnected network using a third communication protocol. Numerous other aspects are described.

35 Claims, 22 Drawing Sheets

(56) References Cited

U.S. PATENT DOCUMENTS

| | | | |
|---|---|---|---|
| 2016/0036697 A1 | 2/2016 | Decusatis et al. | |
| 2016/0285786 A1* | 9/2016 | Mraz | H04L 12/6418 |
| 2017/0005948 A1 | 1/2017 | Melander et al. | |
| 2020/0036732 A1 | 1/2020 | Grubel et al. | |
| 2020/0259566 A1 | 8/2020 | Menoher | |
| 2020/0278892 A1 | 9/2020 | Nainar et al. | |
| 2020/0389433 A1 | 12/2020 | Zivic | |
| 2021/0314232 A1* | 10/2021 | Nainar | H04L 47/125 |
| 2022/0103554 A1* | 3/2022 | Seetharaman | H04L 63/10 |
| 2022/0365851 A1 | 11/2022 | Simon et al. | |
| 2022/0374417 A1 | 11/2022 | Danilov et al. | |
| 2023/0076694 A1* | 3/2023 | Nyhuis | H04L 67/535 |
| 2023/0161642 A1 | 5/2023 | Adogla et al. | |

OTHER PUBLICATIONS

International Application No. PCT/US2022/079946, "International Search Report and Written Opinion", mailed Mar. 7, 2023, 12 pages.

* cited by examiner

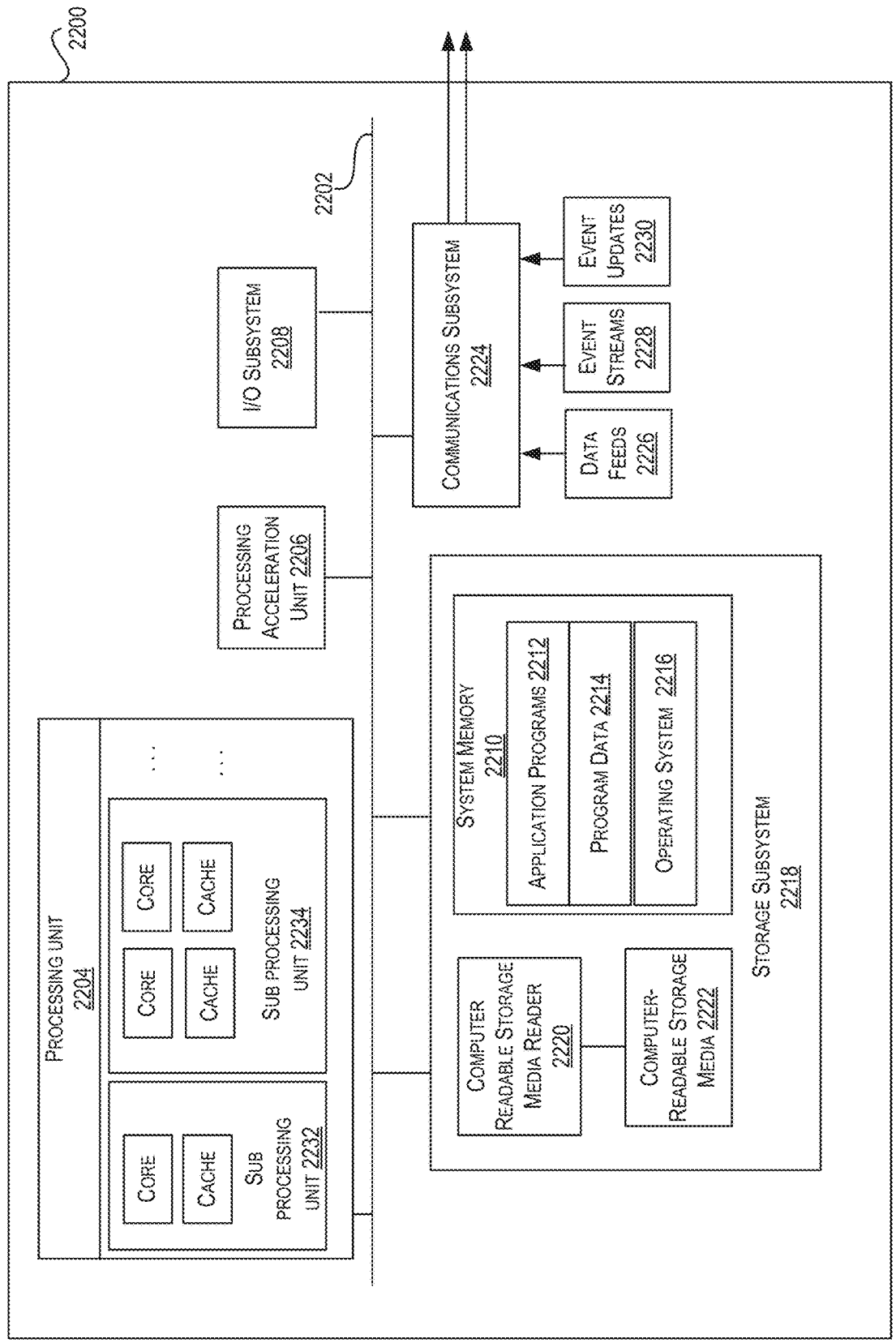

CLOUD BASED CROSS DOMAIN SYSTEM—VIRTUAL DATA DIODE

CROSS-REFERENCE TO RELATED APPLICATIONS

The present application is related to the following applications, the entire contents of which are incorporated herein by reference for all purposes:
(1) U.S. Non-Provisional application Ser. No. 17/534,194, filed on Nov. 23, 2021, entitled "CLOUD BASED CROSS DOMAIN SYSTEM-CDSaaS"; and
(2) U.S. Non-Provisional Application Ser. No. 17/534,196, filed on Nov. 23, 2021, entitled "CLOUD BASED CROSS DOMAIN SYSTEM—CDS WITH DISAGGREGATED PARTS".

BACKGROUND

Techniques exist for hardware implemented cross-domain solutions to control and inspect data entering a dedicated network. However, such techniques are difficult to maintain and operate.

BRIEF SUMMARY

Techniques are provided for a software implemented cloud based cross domain system that allows for secure one-way traffic into a dedicated network without the need for specialized hardware.

In an embodiment, a system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a computer-implemented method. The computer-implemented method also includes receiving, at a first node of the network interface card (NIC) associated with a disconnected network, a message or data intended for the disconnected network and sent using a first communication protocol. The method also includes sending the message or data from the first node to a second node of the network interface card using a second communication protocol, the second communication protocol being configured for unidirectional communication. The method also includes receiving the message or data at the second node. The method also includes sending, from the second node, the message or data to a destination node of the disconnected network using a third communication protocol. Other embodiments of this aspect include corresponding computer systems, apparatus, and computer programs recorded on one or more computer storage devices, each configured to perform the actions of the methods.

In one general aspect, the second communication protocol is a user datagram protocol (UDP).

In one general aspect, the network interface card comprises a smart network interface card (Smart NIC). A Smart NIC can process messages or data arriving at one of its interfaces and forward it to another interface. The process can be in form of Software and/or Hardware analyzing the incoming message or and converting in line with rules that can be configured on the Smart NIC.

In one general aspect, the disconnected network comprises a virtual cloud network.

In one general aspect, the disconnected network is not connected to the Internet.

In one general aspect, the message, after leaving the second node, passes through a filter chain before arriving at the destination node.

In one general aspect, the connection between the first node and the second node is established using a networking links, like an Ethernet cable.

In one general aspect, the connection established using the network link does not include a one way transfer device.

One general aspect includes one or more non-transitory computer-readable storage media that may include computer-executable instructions that, when executed by one or more processors of a computing device, cause the computing device to perform instructions comprising: receiving, at a first node of the network interface card (NIC) associated with a disconnected network, a message intended for the disconnected network and sent using a first communication protocol. The method also includes sending the message from the first node to a second node of the network interface card using a second communication protocol, the second communication protocol being configured for unidirectional communication. The method also includes receiving the message at the second node. The method also includes sending, from the second node, the message to a destination node of the disconnected network using a third communication protocol. Other embodiments of this aspect include corresponding computer systems, apparatus, and computer programs recorded on one or more computer storage devices, each configured to perform the actions of the methods.

One general aspect includes a network interface card (NIC) associated with a disconnected network, comprising: a first node, a second node, a memory storing computer-executable instructions, and one or more processors. The one or more processors being configured to access the first node, the second node, and the memory, and configured to execute the computer-executable instructions to at least: receive, at the first node, a message intended for the disconnected network and sent using a first communication protocol. The one or more processors are also configured to send the message from the first node to the second node using a second communication protocol, the second communication protocol being configured for unidirectional communication. The one or more processors are also configured to receive the message at the second node. The one or more processors are also configured to send, from the second node, the message to a destination node of the disconnected network using a third communication protocol. Other embodiments of this aspect include corresponding computer systems, apparatus, and computer programs recorded on one or more computer storage devices, each configured to perform the actions of the methods.

Techniques are provided for a software as a service (SaaS) provisioned cloud based cross-domain solution that allows for secure one-way traffic into a dedicated network without the need for specialized hardware.

In an embodiment, one or more filters can be selected from a plurality of filters for a data pipeline by a computer device of a virtual cloud network. The plurality of filters comprising at least one of: a malware filter, a content filter, a signature filter, a content analyzer. Filters can be statically configured or dynamically updated using machine learning and artificial intelligence algorithms. A sequential order for the one or more selected filters in the data pipeline can be determined by the computing device of the virtual cloud network. A message in the data pipeline can be received from a network interface card (NIC) by the computing device of the virtual cloud network. The network interface card can be configured as a one-way transfer device. The message in the data pipeline can be filtered by passing the message through the one or more selected filters in the determined sequential order. Logs of events occurring in the data pipeline can be provided by the computing device of the virtual cloud network via a logging network. Such event logs can contain references to the data, such as sender and recipient, data type, names in case of files or values for structured data, timestamps, and filtering decision, such as pass, reject, warning. Other embodiments of this aspect include corresponding computer systems, apparatus, and computer programs recorded on one or more computer storage devices, each configured to perform the actions of the methods.

In one general aspect, the determined sequential order is determined based at least in part on a source of the message.

In one general aspect, the one or more selected filters are selected based at least in part on a source of the message.

In one general aspect, a plurality of the one or more filters are selected for a same source of the message.

In one general aspect, the network interface card comprises a software-based one-way transfer device.

In one general aspect, the method further comprises changing the one or more selected filters from the data pipeline after the message is processed by the one or more selected filters in the determined sequential order.

In one general aspect, the computing device is a virtual machine running in the cloud.

One general aspect includes one or more non-transitory computer-readable storage media that may include computer-executable instructions that, when executed by one or more processors of a computing device, cause the computing device to perform instructions comprising: selecting one or more filters from a plurality of filters for a data pipeline, the plurality of filters comprising at least one of a malware filter, a content filter, a signature filter, a content analyzer.

Filters can be adaptive to be configured via machine learning and artificial intelligence. The model for those filters can be dynamically updated as part of a feedback loop, The feedback loop can be trained by test data that are sent through the system and marked as such. The test data can contains data deemed good and also data deemed bad. The algorithm can be tuned based on the test data. In some circumstances, the data itself is not transferred to the end user but is mere test data to adjust the machine learning/AI model deployed by the filter logic. Test data can be continuously sent as new malware or threats are uncovered. Test data can be sent from the untrusted network side or injected from the trusted network. A determination of whether the he source of the test data can be trusted can be achieved by cryptographic means. The trusted sender can sign the messages containing the test data with its private key. The machine learning system processing the test data to update the machine learning models can have a corresponding public key configured and the system can be able to verify the authenticity of the sender. In some embodiments the AI model training may happen outside the cross domain solution's filtering system. The fully trained model can be uploaded via a secured channel to the cross domain solution's filtering system. The model can be used in filtering content going through the filtering system.

Determining a sequential order for the one or more selected filters in the data pipeline. Receiving a message in the data pipeline from a network interface card (MC), the network interface card being configured as a one way transfer device. Filtering the message in the data pipeline by passing the message through the selected filters in the determined order, and providing logs of events occurring in the data pipeline via a logging network. Other embodiments of this aspect include corresponding computer systems, apparatus, and computer programs recorded on one or more computer storage devices, each configured to perform the actions of the methods.

One general aspect includes a data pipeline comprising a network interface card (NIC). The network interface card being configured as a one way transfer device. The data pipeline also includes a plurality of filters comprising at least one of: a malware filter, a content filter, a signature filter, a content analyzer. The data pipeline also includes a virtual cloud network configured to include one or more of the filters from the plurality of filters. Messages received by the virtual cloud network from the network interface controller pass through the one or more filters of the data pipeline sequentially in an order determined during configuration. The data pipeline can also include a logging network for providing logs of events occurring in the data pipeline. Other embodiments of this aspect include corresponding computer systems, apparatus, and computer programs recorded on one or more computer storage devices, each configured to perform the actions of the methods.

Techniques are provided for a cross-domain solution with disaggregated parts.

In an embodiment, an application programming interface (API) configured to present a set of filter types is generated by a computing device of a disconnected network. A selection of one or more filter types from the set of filter types is received via the application programming interface. A sequential order for the selected filter types is received via the application programming interface. A data pipeline with the selection of filter in the sequential order is generated by the computing device of the disconnected network and in response to a command received via the application programming interface. A message received at a one way transfer device is analyzed by the computing device of the disconnected network by passing the message though the selected filters in the sequential order. A log of events occurring in the data pipeline is received by a logging network of the disconnected network. The log of events is presented via the application programming interface. The data pipeline is terminated upon receiving a termination command via the application programming interface. Other embodiments of this aspect include corresponding computer systems, apparatus, and computer programs recorded on one or more computer storage devices, each configured to perform the actions of the methods.

In one general aspect, the one or more filter types include one or more of a malware filter, a content filter, a signature filter, a content analyzer.

In one general aspect, the method further includes: sending messages from the disconnected network to a trusted repository via a one way transfer device.

In one general aspect, the one way transfer device is a software based one way transfer device.

In one general aspect, the log of events includes logs of events taking place at an operating system (OS) level, an application level, and a payload level.

In one general aspect, the disconnected network comprises a virtual cloud network.

In one general aspect, the one way transfer device is a smart network interface card (Smart NIC).

One general aspect includes one or more non-transitory computer-readable storage media that may include computer-executable instructions that, when executed by one or more processors of a computing device, cause the computing device to perform instructions comprising: generating an application programming interface (API) configured to present a set of filter types. Receiving, via the application programming interface, a selection of one or more filters types from the set of filter types. Receiving, via the application programming interface, a sequential order for the selected filter types. Generating, in response to a command received via the application programming interface, a data pipeline with the selection of filters in the sequential order. Analyzing a message received at a one way transfer device by passing the message through the selected filters in the sequential order. Receiving, via a logging network of the disconnected network, a log of events occurring in the data pipeline. Presenting the log of events via the application programing interface, and terminating the data pipeline upon receiving a termination command via the application programming interface.

One general aspect includes a system comprising a memory configured to store a plurality of instructions and one or more processors configured to access the memory, and to execute the plurality of instructions to at least: generate an application programming interface (API) configured to present a set of filter types. Receive, via the application programming interface, a selection of one or more filters types from the set of filter types. Receive a sequential order for the selected filter types. Generate, in response to a command received via the application programming interface, a data pipeline with the selection of filters in the sequential order. Analyze a message received at a one way transfer device by passing the message through the selected filters in the sequential order. Receive, via a logging network of the disconnected network, a log of events occurring in the data pipeline. Present the log of events via the application programing interface, and terminate the data pipeline upon receiving a termination command via the application programming interface.

BRIEF DESCRIPTION OF THE DRAWINGS

FIG. 22 is a block diagram illustrating an example computer system, according to at least one embodiment.

DETAILED DESCRIPTION

Figure 1:
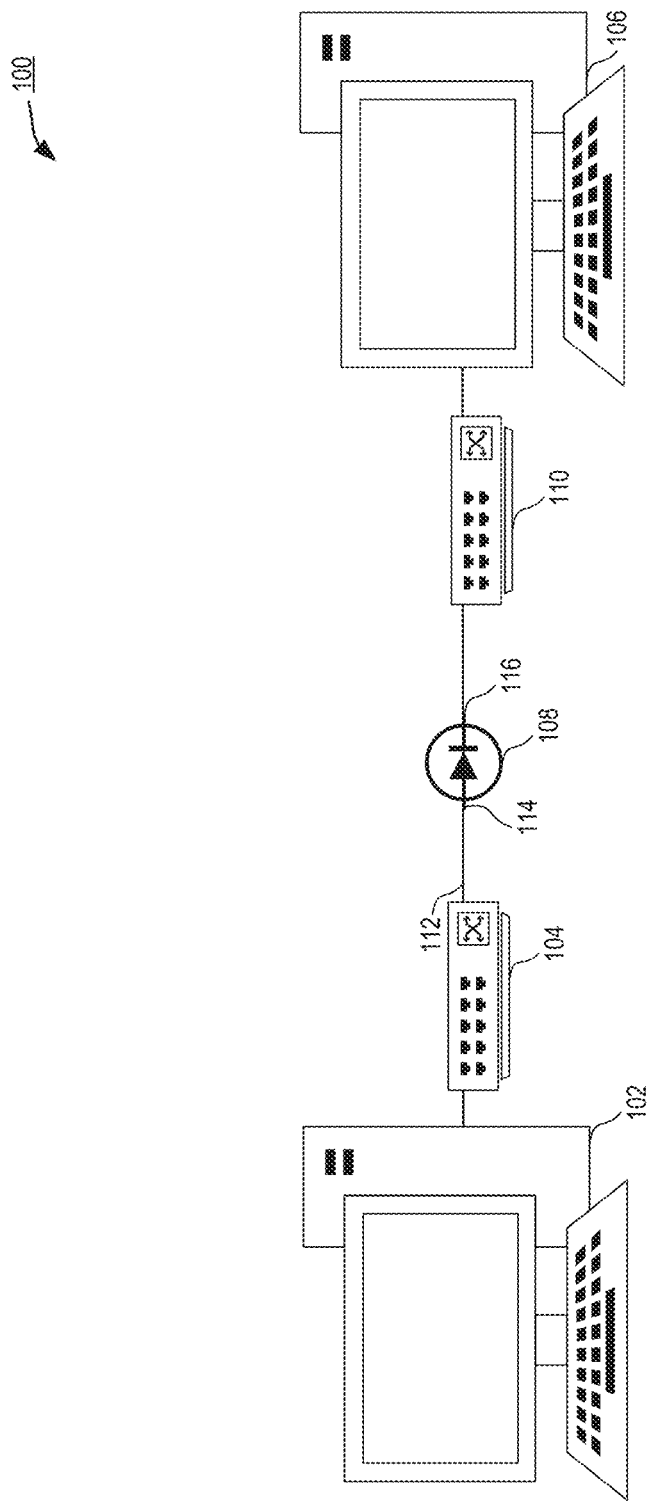
FIG. 1 shows a simplified diagram of a hardware implemented disconnected network according to certain embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure provide techniques for implementing a cloud based cross-domain solution. A cross-domain solution can, in some examples, restrict the access or transfer of information between two or more security domains. The proposed system may be implemented with a network interface card (NIC) associated with a disconnected network.

A disconnected network can be a secure computer network that is isolated from communication with unsecured networks. Disconnected networks can be configured to permit inbound traffic while prohibiting outbound traffic. In one implementation, a message intended for the disconnected network can be received at a first node of the NIC. The received message being sent with a first communication protocol (e.g., transmission control protocol (TCP), user datagram protocol (UDP)), or message queue telemetry transport (MQTT). In some implementations, multiple communication protocols can be supported.

The received message can be forwarded to a second node of the network interface card using a second communication protocol. The second network communication protocol can be any protocol configured for one-way communication including UDP. Messages can be received from the first node at the second node but the second protocol will not permit traffic in the other direction. Once the traffic is received at the second node, the message is forwarded to a destination node in the disconnected network using a third communication protocol.

Cross-domain solutions can include disconnected networks that are separated from unsecure networks (e.g., the Internet or other public networks) by physical isolation (e.g., air gap) or by hardware that enforces a one-way communication (e.g., bump-in-the-wire/data diode). While such networks are secure, the systems are unwieldy and expensive to maintain, and, because of the specialized hardware involved, the networks are generally used in limited circumstances (e.g., military or governmental networks, industrial control systems, or life-critical systems). Additionally, physical isolation or hardware implemented one-way communication are not feasible for cloud networks.

A software implemented cross-domain solution can be used to create a cloud based disconnected network without the inconvenience of physically moving data to the disconnected network (e.g., air gap) or hardware to physically enforce one-way communication (e.g., data diode). Traffic traveling into a NIC of a disconnected region can be interrupted and transmitted within the NIC using a one-way protocol. The protocol enforces one-way traffic to ensure information within the disconnected network is less susceptible to compromise. In some circumstances, the cross-domain solution can include a separate one-way communication pathway from the disconnected network to a trusted source outside of the network.

Before reaching the destination node within the disconnected network, messages sent from the second node can pass through a series of filters. The filters can analyze the messages in an effort to protect the disconnected network from infiltration. The filters can be configurable via an application programming interface (API) so that a client can select an appropriate set of filters based on the client's need for security. The client can also select a time period for the cloud based domain system. In some implementations, the order of filters, or the individual filters used, can be changed between messages in an attempt to counter attempts to infiltrate the network.

Traditional cross-domain solutions are implemented using custom hardware. The hardware can be expensive to design and difficult to maintain. To add a filter or change the order of the filters in a traditional cross-domain solution, the hardware containing the filters would have to be removed, altered, and replaced. A cloud based cross-domain system can be fully or partially implemented in the cloud. For instance, a cross-domain solution can use hardware enforced one-way communication, such as a data diode, and cloud implemented content filters. Alternatively, the cross-domain solution may include software enforced one-way communication and hardware implemented content filters. A cloud based cross-domain solution allows for flexibility in constructing a cross-domain solution.

A cloud based cross-domain solution system allows for flexibility and such a system is adaptable for different use cases. For instance, different message configurations can be applied to traffic from different sources with fewer filters applied to messages from trustworthy sources. The order of filters can be altered between messages, or at regular intervals, to complicate attempts by attackers to design messages that can evade the filters. In some circumstances, one-way communication can also be enforced only on a subset of the messages received at the cross-domain solution.

Data about the messages received at the cross-domain solution can be used to train a or artificial intelligence and/or machine learning (AI/ML) content filter model. The data can include the packet origin, characteristics of known virus or malware, or traffic patterns. The AI/ML content filter can determine that packets from certain sources are suspect or trustworthy based on information supplied by the other content filters. For example, if traffic from a particular internet protocol (IP) address is consistently flagged as containing malware the AI/ML filter may subject packets from that IP address or the same origin to extra filtering. The AI/ML filter can use information obtained from packets flagged by content filters as containing malware or viruses to identify known or unknown viruses so that the cross-domain solution can adapt to new threats. The AI/ML filter can also use traffic patterns to identify threats. For example, a substantial increase in traffic from a source can indicate a potential threat.

The AI/ML model can be continuously trained by data marked as "test or learning data" that is sent from a trusted source. The test data can contains reference data that should be blocked or allowed to pass. So when a new malware or disallowed content is detected, the test data can contain the signature of the malware or other another characteristic, like origin and a hint for the learning algorithm to block such data when transferred as a real payload into the trusted network. Test data can indicate to malware patterns or define specific attributes in structured data, e.g., data range for MQTT data exceeding a certain range. In some circumstances, the source of the learning data has to be trusted. Using cryptographic methods, the authenticity of the source (sender) of test data can be established. In one embodiment, the test data can be encrypted using the public key of the AI/ML algorithm and then signed with a private key only known to the sender. The AI/ML algorithm that is associated with the filter can have the corresponding public key of the test data source configured allowing to verify the signature of the training data after using its private key to decrypt the data itself. The AI/ML learning can be extended to content filtering on payloads such as images, for restricting the resolution, metadata or content to known patterns. The AI/ML algorithm can further instruct the filter to change or re-encode the image to remove hidden malware or otherwise undesirable content.

An advantage of a cloud implemented cross-domain solution is that the cross-domain solution can be exposed as a service to a client. The cross-domain solution can allow a customer (e.g., a client) to monitor or audit the cloud domain service. A customer can configure the cross-domain solution to select filters and/or the order of filters, and the customer can designate what traffic passes through the cross-domain solution. For example, the customer can whitelist certain sources so that two way communication is possible between the disconnected network and the whitelisted sources. A cloud-based cross-domain solution allows for flexibility of use that is not possible in a hardware-based cross-domain solution. Additionally, a cloud-based cross-domain solution can be implemented without expensive and inflexible specialized hardware.

In an illustrative example, a customer is presented with an API for configuring a cloud based cross-domain solution and selects a time period for the cloud based cross-domain solution and a series of filters. In this case, the customer selects a month time period for the cloud based distributed network and a malware filter followed by a content filter.

After configuration, a message, intended for a destination node inside of the disconnected network, is sent from a source node. The message is sent using transmission control protocol/Internet protocol (TCP/IP) and the message is received at a first node of the NIC. In order to pass across the NIC, the message can be converted from TCP/IP to a protocol suitable for one-way communication. A communication protocol can be modified so that the communication protocol is configured for only one-way communication. The NIC, at the first node, converts the message to a one-way communication protocol, in this case User Datagram Protocol (UDP), and forwards the message to a second node in the NIC.

In circumstances where the message is sent via a streaming protocol (e.g., Real Time Messaging Protocol (RTMP)), the entire message is intercepted at the first node, as if the first node were the destination node, before the message is forwarded to the second node. In this case, the message is not streamed and the message packets are accepted, stored, and forwarded to the second node via a connectionless protocol such as UDP as the packets are received.

At the second node, the message is forwarded to a destination node inside of the secured network using a network protocol that is employed in the secured network. In this case, the secured network uses TCP/IP but the network could use a third protocol, such as File Transfer Protocol (FTP), TCP/IP, User Datagram Protocol (UDP), Hypertext Transfer Protocol (HTTP), Post Office Protocol (POP3), Internet Message Access Protocol (IMAP), Simple Mail Transfer Protocol (SMTP), etc. for internal communication.

After leaving the second node, but before reaching the destination node, the message is passed through a series of configurable filters. In this case, the message is scanned by malware filter, to ensure that the message does not contain any malware that may compromise the network, and a content filter, to check that the message reaching the network is the appropriate type of content. After the message passes through all the filters, the message is forwarded to its destination node.

FIG. 1 shows a simplified diagram 100 of a hardware implemented disconnected network according to some embodiments. A disconnected network can be a computer network that is physically isolated from other networks by removing physical and wireless network connections. Data is moved between these air-gapped networks using physical storage media such as thumb drives. While these networks are secure, transferring data with thumb drives is cumbersome. Other disconnected networks use data diodes that permit one-way traffic into the disconnected network, while preventing the broadcast of sensitive information from the disconnected network.

Simplified diagram 100 shows computer device A connected to a router A 104 according to some embodiments. Computer device A 102 can be a personal computer, a server computer, a virtual machine, a tablet device, a mobile phone, or any other computer device. Computer device A 104 can be physically connected to router A 104, for example, by a network cable or computer device A 104 can be connected to router A 104 wirelessly (e.g., WiFi). In some implementations, computer device A 102 can be connected to the internet or a private network through router A.

Computer A 102 can be connected to computer B 106 through communication between router A 104 and router B 110. A network cable 112 containing a data diode 108 can connect router A 104 and router B 110. Hardware data diodes can enforce the one way direction by physical means, e.g. an optical link comprising of optical sender, often a laser or light emitting diode (LED) and a receiver, a photo sensitive semiconductor such as a photoelectric transistor 108. Other one way systems can be utilized to implement the functionality of a one way transfer device. Messages received at a first terminal 114 of data diode 108 can be passed to the diode's second terminal 116, but a message cannot be sent from the second terminal 116 to the first terminal 114.

In some implementations, the disconnected network exists behind the second terminal 116 of the data diode 108. Messages can be sent across data diode 108 into the disconnected network. However, messages cannot leave the disconnected terminal via the data diode. In these implementations, router B 110 and computer device B 106 are isolated from outside networks, but computer device B 106 can still be connected to other devices inside the disconnected network through router B 106. For example, computer B could be part of a network containing confidential information where the ability to send information outside of the network could pose a security threat.

In other implementations, the disconnected network exists behind the first terminal 116 of the data diode 108. In these implementations, the disconnected network includes Messages can be sent from the disconnected network to an outside network via data diode 108 but messages cannot be received by the disconnected network. Such a network could be used in an electronic voting system where the system should be able to provide results to the public while being immune from inbound attacks.

Figure 2:
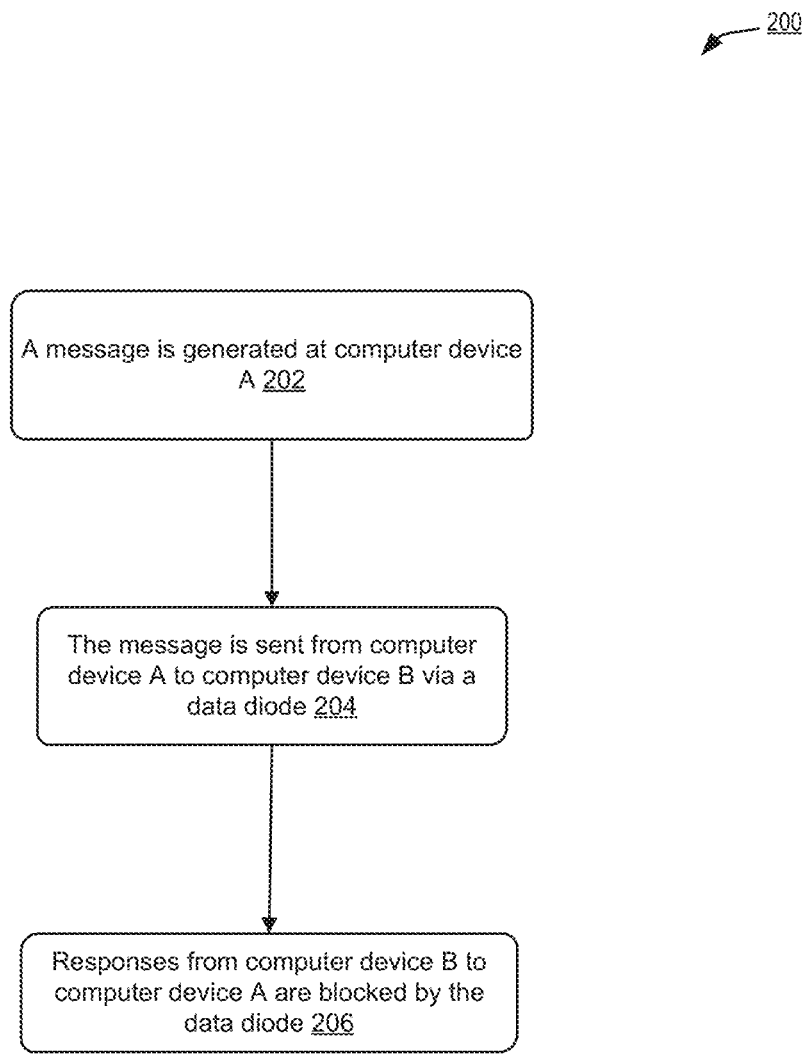
FIG. 2 shows a process for communicating with a hardware implemented disconnected network according to certain embodiments.

FIG. 2 shows a process for communicating with a hardware implemented disconnected network according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 200 in greater detail, at block 202, a message is generated by a computer device A 102. The message can be sent from computer device A 102 to a router A 104 that can forward the message to the message's destination. Computer device A 102 can be a personal computer, a mobile device, a tablet, or a server computer. Router A 104 can be physically connected to computer device A 102 by a cable that permits message transmission (e.g., by an Ethernet cable), or the message can be sent from computer device A 102 to router A 104 via radio waves (e.g., WiFi).

At block 204, the message, sent by computer device A 102, is sent to the second computer device B 106 after passing through a data diode 108. The message can be forwarded from router A 104 to a router B 110 via an Ethernet cable 112 containing data diode 108 (e.g., bump-in-the-wire). Data diode 108 can permit the data comprising the message sent by router A 104 to pass through data diode 108 to router B 110 because the data diode can allow transfer of data one way. Router B 110 can forward the message that was received from router A 104 to computer device B 114.

At block 206, responses generated by computer device B 114 are blocked by data diode 108. While messages passing from router A 104 to router B 110 can pass through data diode 108, one way transfer restriction from data diode 108 along, messages passing from router B 110 to router A 104 are blocked. Accordingly computer device B 114 can be disconnected from other computer devices because computer device B 114 can be prevented from sending outgoing messages.

Figure 3:
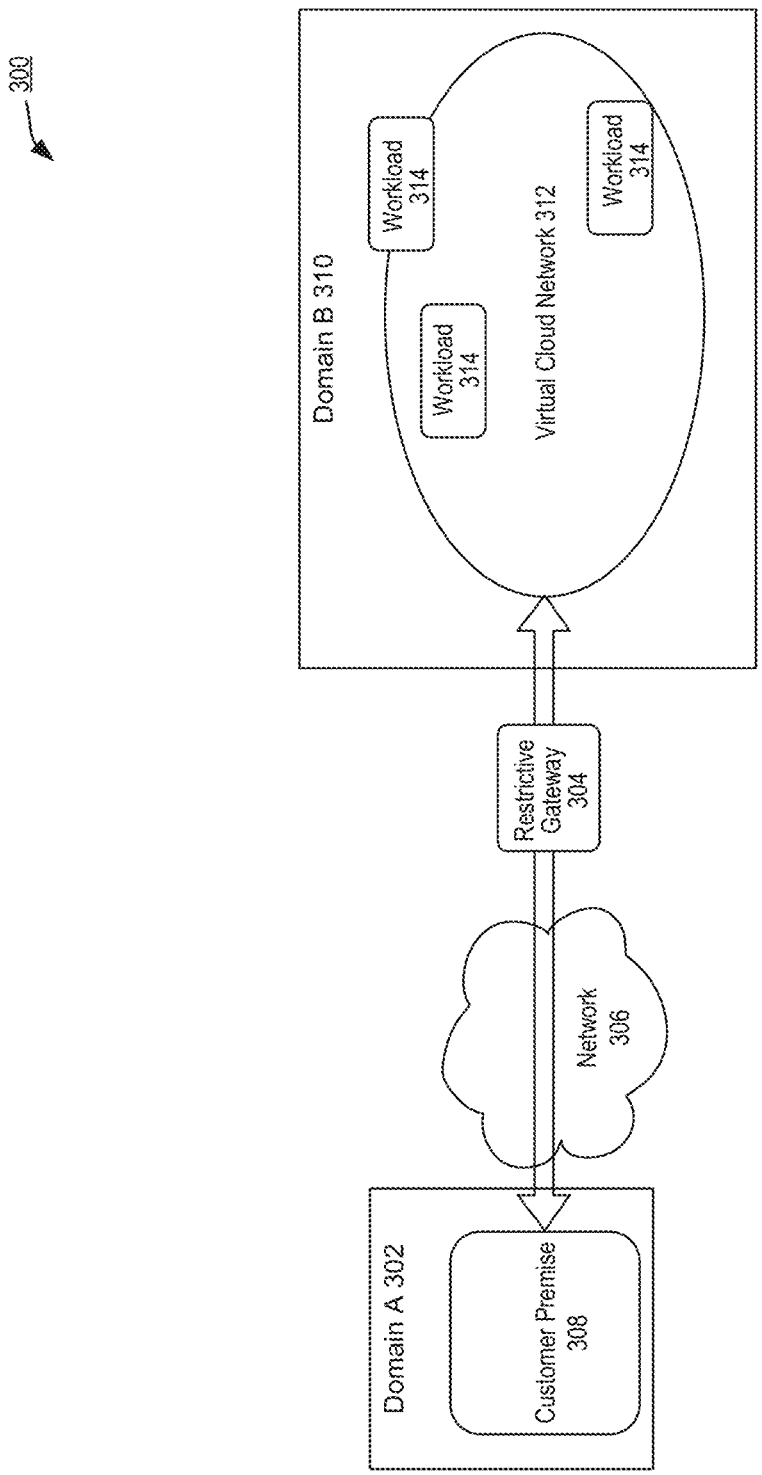
FIG. 3 shows a simplified representation of a cloud based cross-domain solution that can be used to control access between domains according to certain embodiments.

FIG. 3 shows a simplified representation of a cloud based cross-domain solution 300 that can be used to control access between domains according to certain embodiments. Cross-domain solutions can include implementations that allow restricted two-way communication between networks, or implementations that include disconnected networks.

Figure 4:
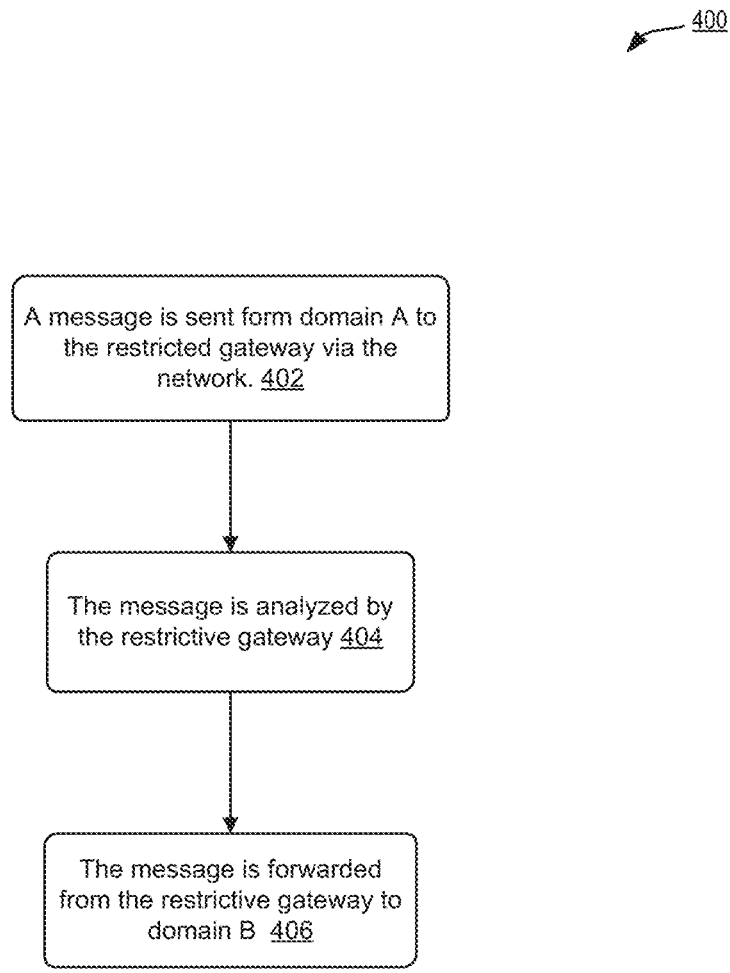
FIG. 4 shows a process for controlling access between domains using a cloud based domain service according to certain embodiments.

FIG. 4 shows a process for controlling access between domains using a cloud based domain service according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 400 in greater detail, at block 402, a message can be sent from domain A 302 to the restrictive gateway 304 via the network 306. The message can be generated within domain A 302 at a customer premise 308. The restrictive gateway 304 can be a smart network interface card (Smart NIC) and the network 306 can be a private network or the Internet.

At block 404, the message can be analyzed by the restrictive gateway to determine if the message from domain A 302 should be permitted access to domain B 310. Restrictive gateway 304 can determine if the message should be permitted access using a predetermined access policy.

Restrictive gateway 304 can also use filters to analyze messages before permitting access to domain B 310. The filters can include a malware filter to check for malware and viruses in the messages. Restrictive gateway 304 can also include a signature filter to determine if the message has cryptographically verifiable signatures that attest to the message's provenance. The filters can also include a content analyzer to determine the message's validity. The content analyzer can, for instance, check checksums received out-of-band or in-band with the apparent related payload. The data in the message can contain a checksum to prove the validity of the data. The checksum can be attached to the data itself. The checksum can also be transferred as part of data in a separate message. The filters can also include an artificial intelligence or machine learning filter that has been trained to determine if a message should be permitted access to domain B 310.

At block 406, the restrictive gateway 304 can forward the message to domain B 310 after determining that the message should be permitted access. The second domain can be a virtual cloud network 312. In some implementations, the destination node for the message can be a workload 314 in virtual cloud network 312. Workloads 314 can include virtual machines, databases, containers, and applications.

Figure 5:
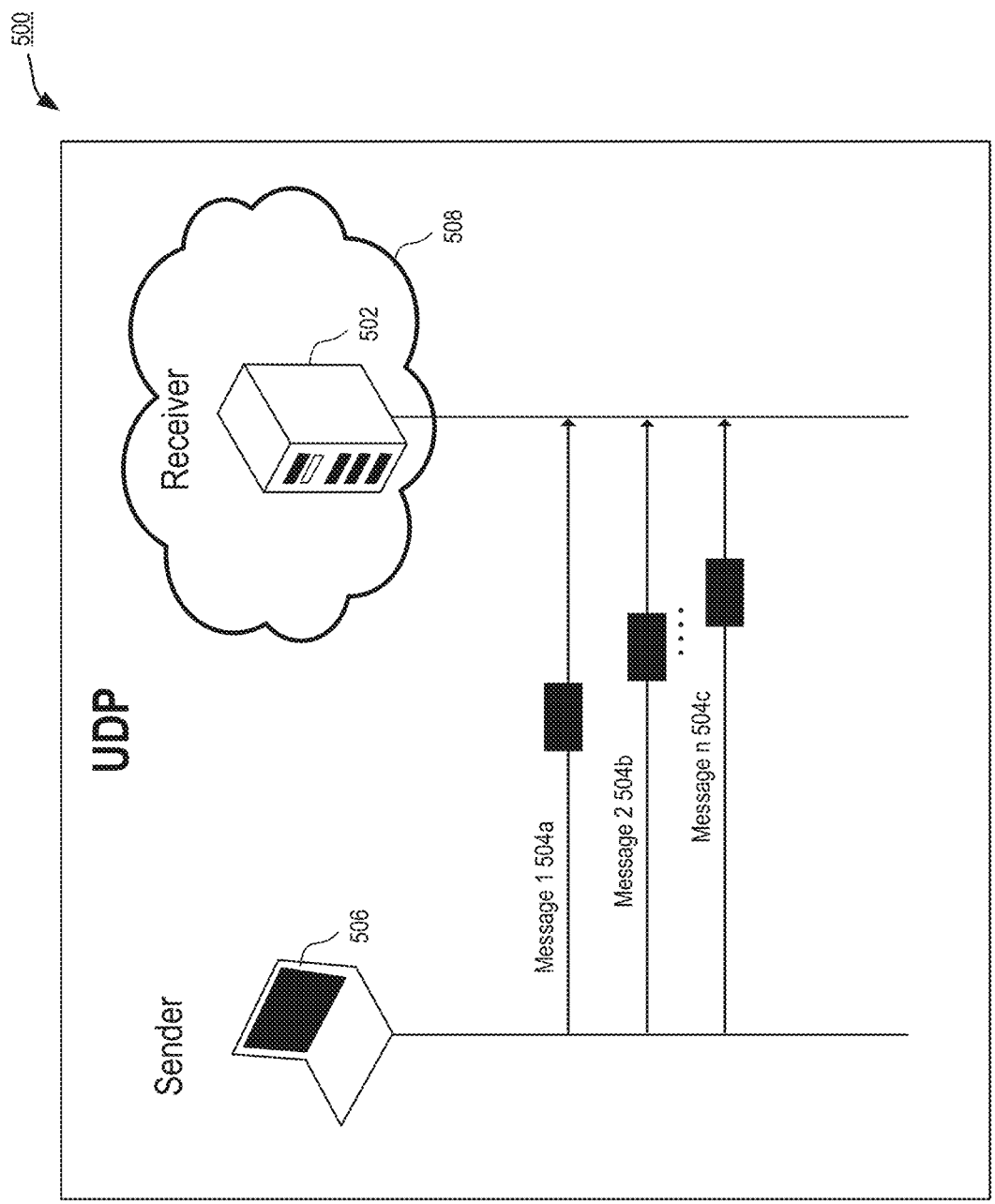
FIG. 5 shows a simplified diagram of the user datagram protocol (UDP) according to certain embodiments.

FIG. 5 shows a simplified diagram 500 of the user datagram protocol (UDP) according to certain embodiments. Communications protocols can permit one-way or two-way communication; however, disconnected networks may use hardware to enforce one-way communication. In the example of FIG. 5, one-way communication can be enforced by a protocol, such as UDP.

Turning to diagram 500 in greater detail, sender 506 and receiver 502 can be computing devices that are capable of network communication. Sender 506 and reviver 502 can be a personal computer, a server computer, a mobile device, a tablet device etc. Sender 506 and receiver 502 can comprise a cross-domain solution. Sender 506 can be a first domain in a cross-domain solution and receiver 502 can be a second domain in a cross-domain solution. Receiver 502 can be part of a disconnected region 508. Disconnected region 508 can be a network that is isolated from other networks. Devices in disconnected region 508 can be configured so that the devices are capable of receiving traffic from other networks but not capable of sending traffic from disconnected region 508 to other networks.

Sender 506 and receiver 502, can be connected by any communication link including a physical connection (e.g., connected by a network cable or fiber optic cable). Sender 506 and receiver 502 can be wirelessly connected (e.g., connected by WiFi). Messages 504*a-c* can be traffic that is sent between the sender 506 and the receiver 502. Traffic sent via UDP, including messages 508*a-c*, can be sent without handshaking dialogs. Sender 506 can send messages 504*a-c* to receiver 502 without a request from receiver 502.

Figure 6:
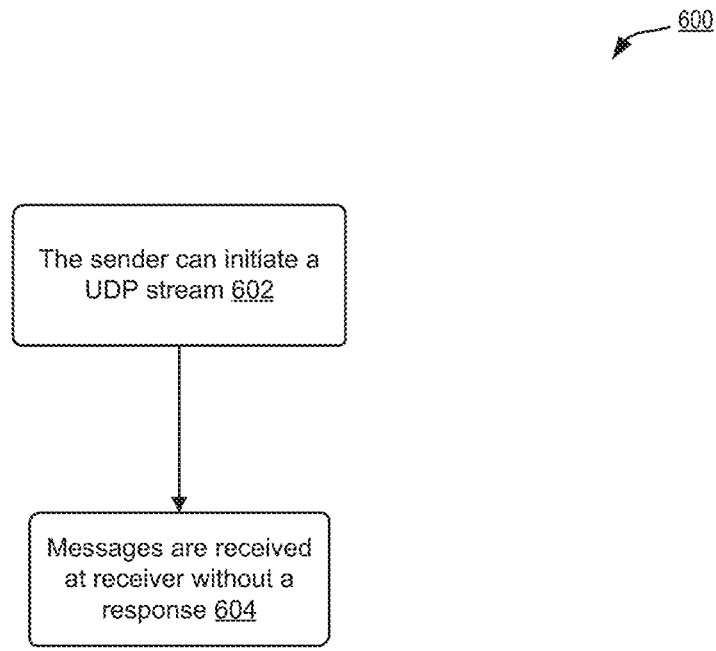
FIG. 6 shows a process for communicating with user datagram protocol (UDP) according to certain embodiments.

FIG. 6 shows a process for communicating with user datagram protocol (UDP) according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to process 600 in greater detail, at block 602, sender 506 can initiate a UDP stream. The stream can consist of a series of packets sent from sender 506 to receiver 502. Sender 506 can initiate a transmission without receiving a request from the receiver 502. Receiver 502 can be configured to receive packets sent by sender 506. Receiver 502 can be configured so that receiver 502 is incapable of sending messages to sender 506. The UDP stream can be a stream of messages sent with any communication protocol that can be configured for one-way communication.

At block 604, the messages 508*a-c* sent by sender 506 are received by receiver 502. Receiver 502 can receive messages 508*a-c* without receiver 502 providing a response to sender 506. Messages 508*a-c* can be packets with a source port number, a destination port number, and checksums, for error checking and security. Sender 506 can send responses 508a-c in a continuous stream, beginning with response 1 508a, without any communication from receiver 502. Once sender 506 has sent the responses, sender 506 can stop transmission without receiving confirmation that the messages arrived at receiver 502. Sender 506 can be configured so that sender 506 is incapable of receiving any messages.

Figure 7:
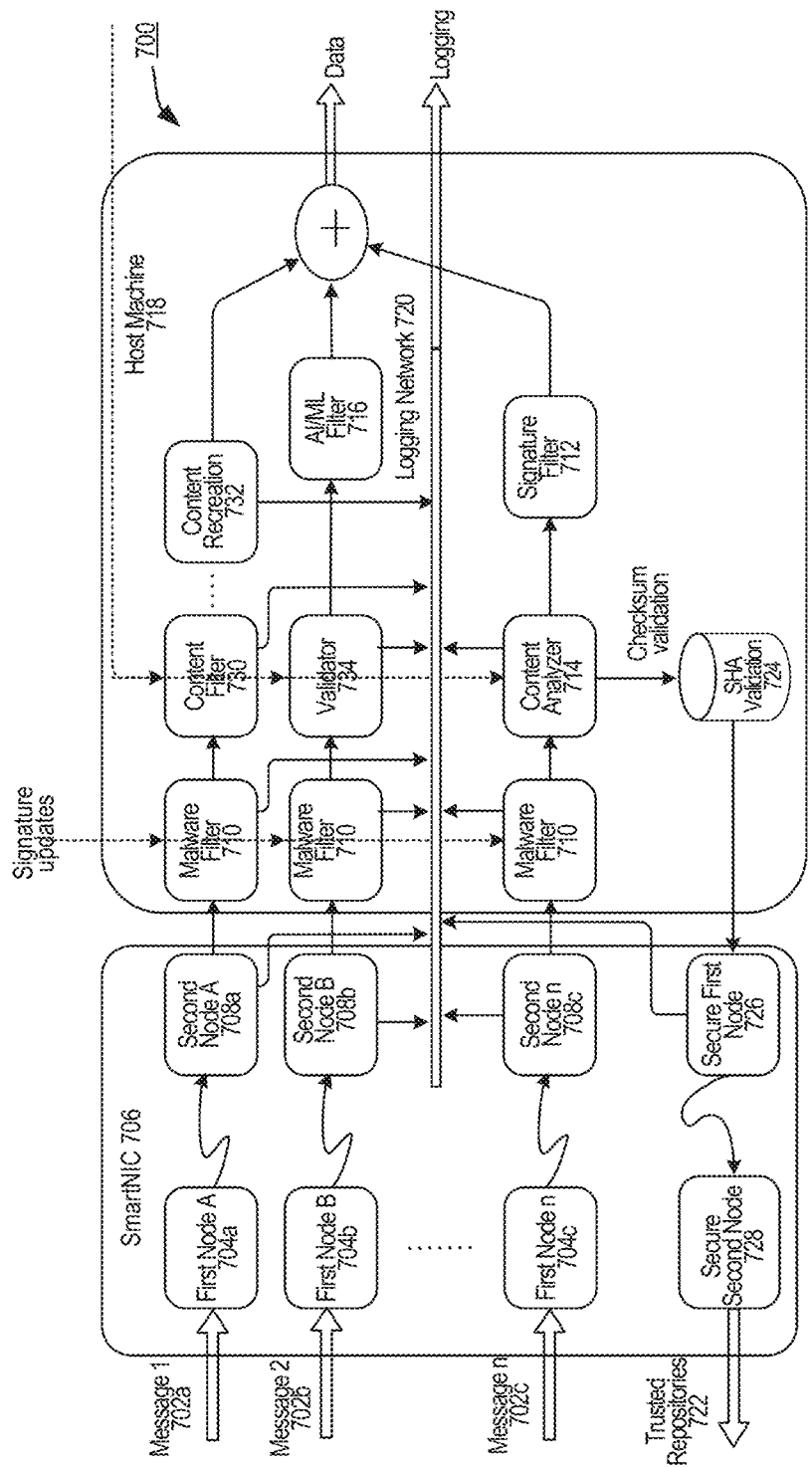
FIG. 7 shows a diagram of a data pipeline including a software implemented cross-domain solution according to certain embodiments.

FIG. 7 shows a diagram 700 of a data pipeline including a software implemented cross-domain solution according to certain embodiments.

Turning to diagram 700 in greater detail, as part of the data pipeline smart network interface card (Smart NIC) 706 contains two sets of nodes: first nodes 704a-c and second nodes 708a-c. Communication between first node a 704a and 704b can occur using a communication protocol configured for one-way traffic (e.g., UDP). Messages 702a-c received at first nodes 704a-c can be passed to second nodes 708a-c, but first nodes 704a-c can be configured to ignore messages sent from second nodes 708a-c.

Smart NIC 706, in some implementations, can contain a secure pathway for communicating from Smart NIC 706 to trusted repositories 722. Messages received from host machine 718 at secure first node 726 can be passed to secure second node 728 using a one-way communication protocol. Once the message is received at secure second node 728, the message can be forwarded to trusted repository 722 using a one-way or two-way communication protocol.

Host machine 718 an contain one or more filters including malware filters 710, content analyzers 714, content filters 730, content recreation filters 732, validators 734, artificial intelligence/machine learning filters 716, and signature filters 712. The filters can be arranged in a chain with messages received from second nodes 708a-c being passed through the filters in sequential order. Host machine 718 can be a virtual computer device or a bare metal computer device. In some circumstances, a message can pass through one or more filters before the message arrives at the first node. One or more filters can be arranged between the first node and the second node. A message traveling from the first node to the second node can pass through the one or more filters.

Malware filter 710 can check for malware or viruses in the messages passing through the data pipeline. Messages containing malware or viruses can be rejected before the message reaches the disconnected network. Content filter 730 can check for banned words, banned byte sequences, fragments of files or other content that is banned by the content filter's logic. Content filter 730 can remove the banned content from the message before forwarding the message or content filter 730 can reject the message. Signature filter 712 can check a message to determine if the message has cryptographically verifiable signatures that attest to the messages' provenance. Content analyzers 714 can analyze the message to determine the message's validity. For instance, content analyzer 714 can check checksums received out-of-band or in-band with the related message. An artificial intelligence/machine learning filter 716 can be a filter that uses a trained machine learning algorithm to determine whether a message should be allowed to pass through the data pipeline.

In hardware implemented cross-domain solutions, the filters, such as the ones contained in host machine 718, can be in a fixed order that is difficult to rearrange. In a software implemented cross-domain solution, the order of individual filters can be changed depending on the type of message and the message source. Messages from trustworthy sources can be passed through fewer filters, while messages from less trustworthy sources can be passed through more filters. In some circumstances, the filter order, or the list of filters in the filter chain, can be changed between messages.

Host machine 718 can also include a logging network 720 to provide information about events occurring in the data pipeline between Smart NIC 706 and host machine 718. In Smart NIC 706, information can be provided to the logging network from second nodes 708a-c or secure first node 726. In host machine 718, information about events occurring in the filters can be provided to the logging network.

The logging network can be a network bus for shipping logs from components to a security information and event management (STEM) system for accepting logs of events taking place in the data pipeline at the operating system (OS) level, the application level, and the payload level. The STEM system can use the logs to perform analyses, to raise the alarm about potential malware in the data stream, and to take remedial action such as quarantining the data in question.

Host machine 718 can also include an independent reverse pipeline that provides messages to trusted repositories 722 through Smart NIC 706 via first secure node 726 and second secure node 728. Messages for the reverse pipeline are provided from filters to a secure hash algorithm (SHA) validation system 724 in host machine 718. SHA validation 724 can provide messages to trusted repositories 722 through Smart NIC 706.

The independent reverse pipeline is separate from the data pipeline and the reverse pipeline can be used to help a trusted system using trusted repositories 722 to learn about messages that are weeded out by the filters. Information provided by the reverse pipeline can also be used to learn about valid messages that are inappropriately excluded by the filters. A trusted system can use information about inappropriately excluded messages to increase throughput by fixing the issues causing the inappropriate exclusion.

Figure 8:
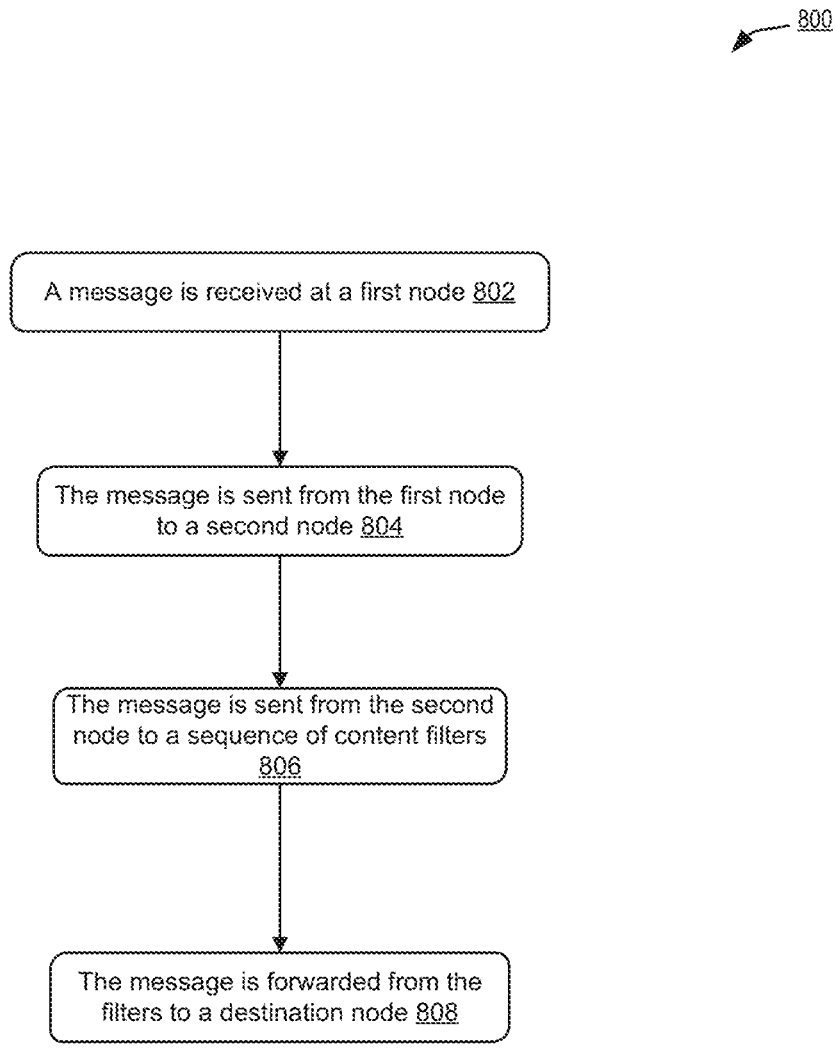
FIG. 8 shows a method for communicating using a data pipeline that includes a software implemented cross-domain solution according to certain embodiments.

FIG. 8 shows a process for communicating using a data pipeline that includes a software implemented cross-domain solution according to certain embodiments. This process is illustrated as a logical flow diagram, each operation of which can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Turning to the method 800 in greater detail, at block 802, messages 702a-c can be received, as part of a data pipeline, at a first nodes 704a-c of a smart network interface card 406 (smartNIC) from a first domain. A Smart NIC device can be a device that contains two logical and or physical interfaces and a processing system comprising of hardware to process data entering on one of the interfaces and forwarding it to the other interface. Processing the data can mean that the data is analyzed, re-formatted, aggregated etc. The hardware can comprise microprocessors running software based algorithms that are invoked by the data. Messages 702a-c can be sent using a first communication protocol and, in some implementations, first nodes 704a-c can be configured to receive messages sent with more than one communication protocol. In some implementations, first nodes 704a-c can be configured to receive all incoming traffic.

At block 804, messages 702a-c can be sent from first nodes 704a-c to second nodes 708a-c using a one-way communication protocol (e.g., UDP). Smart NIC 706 can be a cross-domain solution because messages 702a-c can be received at first nodes 704a-c from a first domain and the messages can be forwarded from second nodes 708a-c to a second domain.

In some implementations, the one-way communication protocol can allow messages in the data pipeline to be sent from first nodes 704a-c to second nodes 708a-c, but messages are prevented from being sent from second nodes 708a-c to first nodes 704a-c. In some implementations, any messages sent from second nodes 708a-c to first nodes 704a-c will not be accepted. Messages 702a-c received at second nodes 708a-c as packets sent using a one-way communication protocol can be unpacked and reconstructed as forward able payloads that can be sent to destination nodes in the second domain.

Non-streaming messages received at first nodes 704a-c can be accepted, stored and forwarded to second node 708a-c as the messages are received. Streaming messages can be intercepted at first nodes 704a-c as if first nodes 704a-c were the destination nodes. The streaming messages can be repackaged into a format defined by the one-way communication protocol and forwarded to second nodes 708a-c. Streaming messages can be reconstructed and forwarded from second nodes 708a-c to destination nodes as if the messages originated at second nodes 708a-c.

At block 806, the messages, as part of the data pipeline, can be passed through a sequence of filters before the message reaches the second domain. The filters can include malware filters 710 to check for malware and viruses in the messages, signature filters 712 to determine if the message has cryptographically verifiable signatures that attest to the message's provenance, content analyzers 714 to determine the message's validity, artificial intelligence or machine learning filters 716 that have been trained to determine if a message should be permitted access to the second domain. The content filters 710-716 can be hosted in a host machine 718, where the host machine can be a virtual machine or a bare metal server. The filters can be modules that can accept a message payload, reject a message payload, or transform a message payload into a different format.

In some implementations, an application programming interface (API) can be provided to the client so that the client can generate the data pipeline. The data pipeline can include a sequence of content filters that can be used to analyze messages. The client can select the sequence of content filters via the API. As part of generating the data pipeline, the client can define the attributes of a cross domain solution (CDS) via the API. The data pipeline can be constructed based at least in part on the defined attributes. In an additional implementation, the client can select, using the API, an order for the sequence of content filters. The order for the content filters can be variable and the order for content filters can change between messages. The client can also select multiple sequences of content filters where the sequence of filters for a given message can change based on indicators of trustworthiness for that message. For example, messages from known internet protocol (IP) addresses can be analyzed by fewer content filters.

In some implementations, events generated by the content filters 710-716 can be provided to a logging network 720 as part of the data pipeline. The events received at logging network 720 can be provided by host machine 718 as a log of events occurring in the data pipeline. The log of events can be accepted ant a security information and event management (STEM) system and the logs, or information about the logs, can be provided to the client via the API.

At block 808, the message in the data pipeline can be forwarded to a destination node in the second domain. In some implementations, after receiving the message, the client can terminate the data pipeline using the API. In some implementations, the client can generate, and terminate, a data pipeline for individual messages.

In some implementations, information about the messages can be provided to a trusted repositories 722 using a secure pipeline. In one embodiment, information about the message, in this case secure hash algorithm validation 724 information, can be provided to a secure first node 726 in the secure pipeline. Secure first node 726 can be configured like first nodes 704a-c and messages can be sent from secure first node 726 to a secure second node 728 using a one-way communication protocol. The message can be received at secure second node 728 and secure second node 728 can be configured like second nodes 708a-c. Messages received at the secure second node 728 can be forwarded to trusted repositories 722.

Figure 9A:
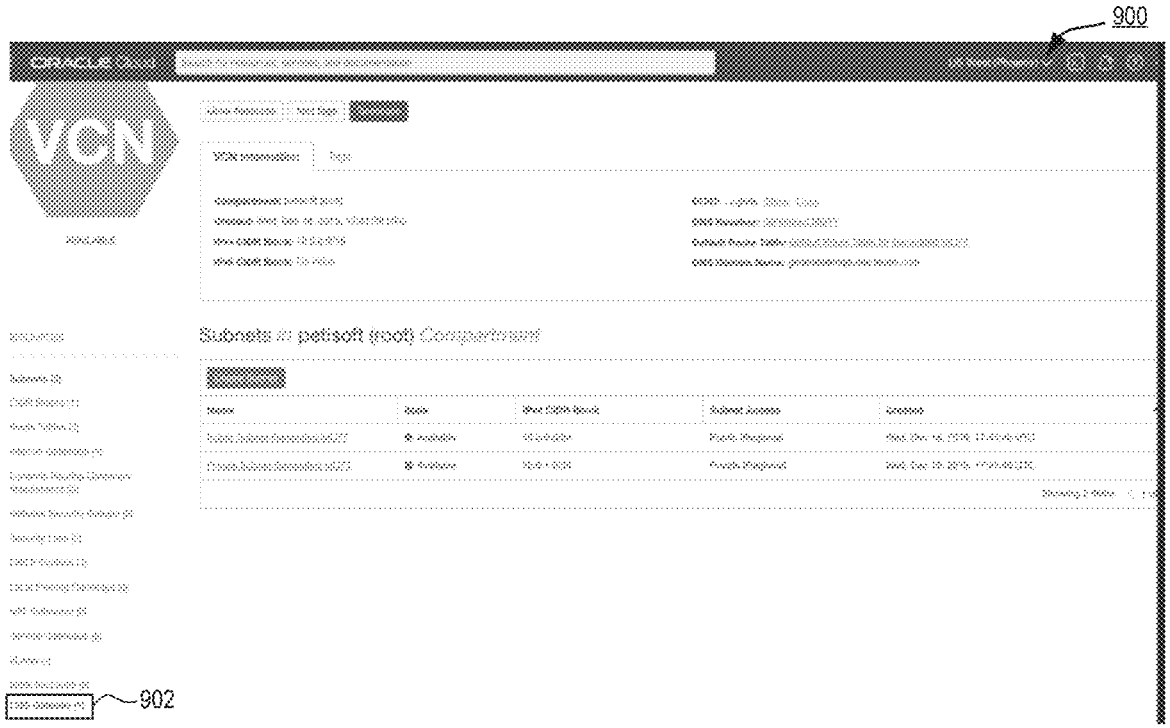
FIG. 9A shows a user interface (UI) for configuring a cloud network according to an embodiment.

FIG. 9A shows a user interface (UI) 900 for configuring a cloud network according to an embodiment. A user can configure the cloud network by accessing the user interface with a computing device. The cloud network can be configured to include a cross domain solution gateway. A user can select a cross domain solution gateway menu by selecting the cross domain solution gateway button 902.

Figure 9B:
FIG. 9B shows a user interface (UI) for configuring a cross domain solution according to an embodiment.

FIG. 9B shows a user interface (UI) 901 for configuring a cross domain solution according to an embodiment. The cross domain solution can be a virtual cross domain solution. The virtual cross domain solution can be an appliance created via an application programming interface (API). A user can create a cross domain solution gateway by selecting the "create cross domain solution gateway" button 904. The user can configure the gateway using the user interface 901. For instance, the user can select the direction for the cross domain solution. The user can also select which networks, or subnetworks, are connected by the cross domain solution. A user can also select one or more filters that can scan messages received at the cross domain system through the UI. The user can provide a filter sequence through the UI.

Figure 10:
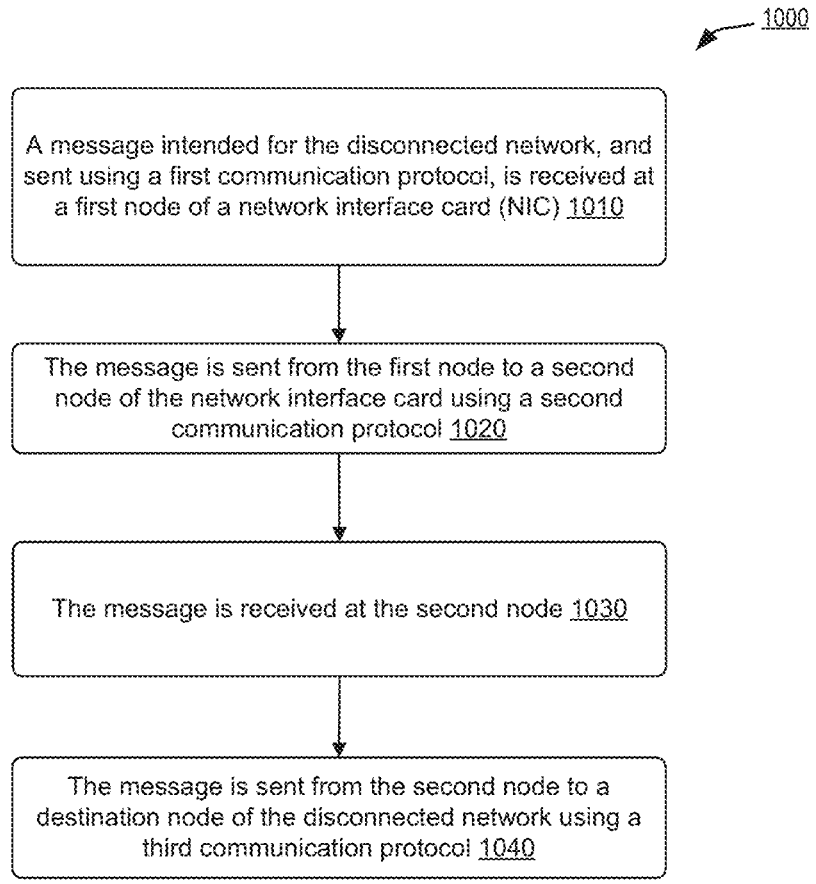
FIG. 10 shows a method for a software implemented cross-domain solution according to certain embodiments.

FIG. 10 shows a method for a software implemented cross-domain solution according to certain embodiments. In some implementations, one or more process blocks of FIG. 10 may be performed by a network interface card. In some implementations, the network interface card can be a smart network interface card (e.g., Smart NIC). In some implementations, one or more process blocks of FIG. 10 may be performed by another device or a group of devices separate from or including the network interface card.

Turning to process 1000 in further detail, at block 1010, a message intended for the disconnected network and sent using a first communication protocol is received at a first node of a network interface card (NIC) associated with a disconnected network. The first node can be similar to first nodes 404a-c from FIG. 4 and the message can be received from a private network or a public network such as the Internet. The first node can be configured so that the first node cannot receive messages sent by the second node.

At block 1020, the message is sent from the first node to a second node of the network interface card using a second communication protocol. The second communication protocol can be configured for unidirectional (e.g., one-way) communication. In some implementations, the second communication protocol can be user datagram protocol (UDP). The second communication protocol can be any communication protocol that can be configured to allow communication exclusively in one direction. The second node can be similar to second nodes 708*a-c* described above in relation to FIG. 7.

The first node and the second node can be connected by a network cable such as an Ethernet cable or fiber optic cable. In some implementations, the network cable connecting the first node and the second node does not include a diode. In some implementations, the second communication protocol can be the same as the first communication protocol. In some implementations the first node and the second node are connected wirelessly. The first node and the second node can be located on separate devices.

At block 1030, the message is received at the second node. In some implementations, the second node is configured so that messages cannot be sent from the second node to the first node. In some implementations, the first node and the second node can be located on different devices. The first node and second node can communicate via a wireless connection.

At block 1040, the message is sent from the second node to a destination node of the disconnected network using a third communication protocol. In some implementations, the disconnected network can be isolated from a public network (e.g., the Internet). In some implementations, the disconnected network is configured to only receive messages and cannot send messages to destination nodes outside of the disconnected network. In some implementations, the disconnected network comprises a virtual cloud network. In some implementations, the message, after leaving the second node, passes through a filter chain before arriving at the destination node. The filter chain can include one or more of a malware filter, a content filter, a signature filter, a content analyzer. The aforementioned filters can use artificial intelligence and/or machine learning (AI/ML) to adapt to new malware or attacks. In some embodiments, training or test data is sent inline from a trusted source. In other embodiments, pre-trained AI/ML models produced elsewhere are uploaded from a trusted source to perform the filtering. In some implementations, the third communication protocol can be the same protocol as the first or second communication protocol.

Process 1000 may include additional implementations, such as any single implementation or any combination of implementations described below and/or in connection with one or more other processes described elsewhere herein.

Although FIG. 10 shows example blocks of process 1000, in some implementations, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
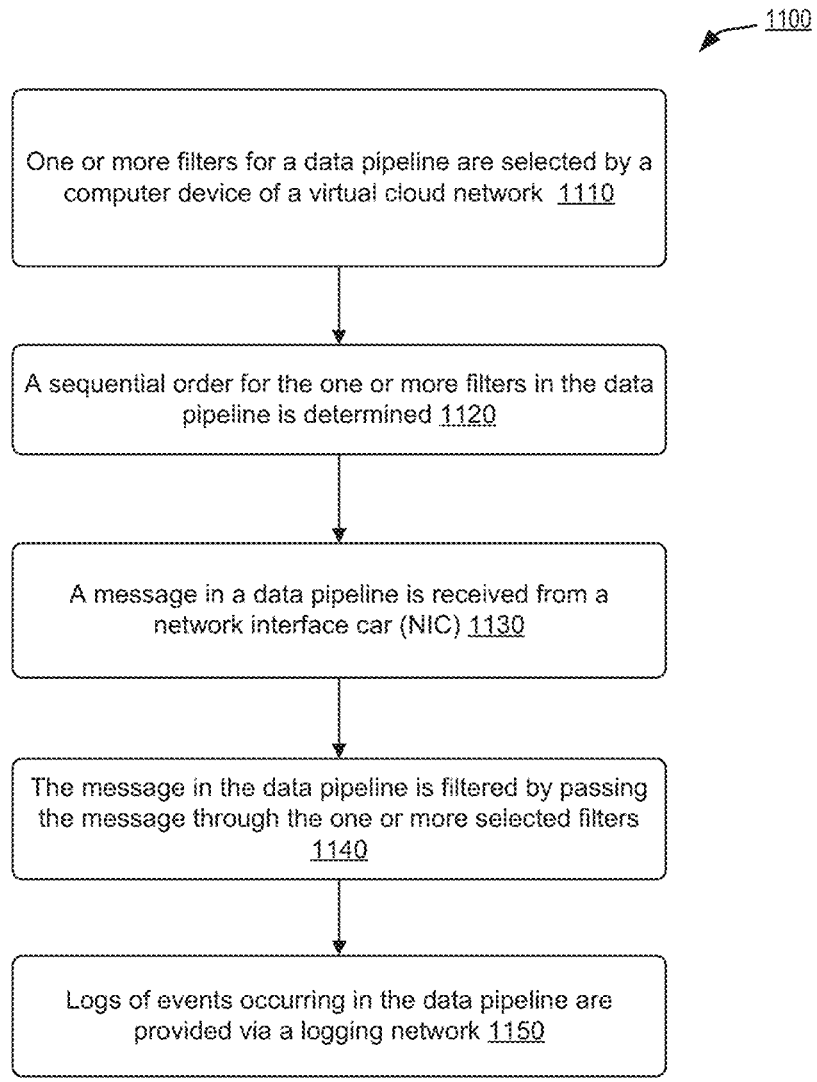
FIG. 11 shows a method for a software as a service (SaaS) based cross-domain solution according to certain embodiments.

FIG. 11 shows a method for a software as a service (SaaS) based cross-domain solution according to certain embodiments. In some implementations, one or more process blocks of FIG. 11 may be performed by a computer device of a virtual cloud network. In some implementations, one or more process blocks of FIG. 11 may be performed by another device or a group of devices separate from or including the network interface card.

At block 1110, selecting, one or more filters are selected by a computer device of a virtual cloud network from a plurality of filters for a data pipeline, the plurality of filters comprising at least one of: a malware filter; a content filter; a signature filter; a content analyzer; AI/ML and the ability to update the filters can be exposed to a customer via API. The customer can send marked training (test) data through the system. In another embodiment other sources such as the cloud service provider, the owner of the disconnected network, security analysts, or other trusted sources can send learning and training data into the AI/ML system. The customer may select the sources and may define the criteria, such as frequency, applicable filter, and/or audit period. A customer (e.g., client or user) can select the plurality of filters for a data pipeline. In some other embodiments, the customer may pre-train the AI/ML model and send the trained model instead of the training data. In some implementations, the virtual cloud network is a virtual machine. In some implementations, the one or more selected filters are selected based at least in part on a source of the message. In some implementations, a plurality of the one or more filters are selected for a same source of the message.

At block 1120, a sequential order for the one or more selected filters in the data pipeline is determined. A customer (e.g., client or user) can determine the sequential order. In some implementations, the determined sequential order is determined based at least in part on a source of the message. In some implementations, the order of the one or more selected filters are determined based at least in part on a source of the message. The filters can include an artificial intelligence and/or machine learning (AI/ML) filter. The AI/ML filter can use a pretrained artificial intelligence or machine learning model. The AI/ML filter can also use an artificial intelligence or machine learning model that is trained on training data obtained from the disconnected network. The training data can include the packet origin, characteristics of known viruses or malware, or traffic patterns of traffic received at the disconnected network. The AI/ML filter can be trained on training data including packets flagged by content filters. The flagged packets can be packets that were identified as containing malware or a virus. The AI/ML filter can be trained to identify packets containing malware or a virus using the flagged packets.

At block 1130, a message in the data pipeline from a network interface card (NIC) is received, the network interface card being configured as a one-way transfer device. In some implementations, the network interface card comprises a software-based one-way transfer device. The network interface card can be a single device or one or more devices.

At block 1140, the message in the data pipeline is filtered by passing the message through the one or more selected filters in the determined sequential order. The sequential order can change based on the source of a message. In some circumstances, the number of filters can depend on the message. The sequential order of the filters can also vary between messages. The number of filters can also vary from message to message.

At block 1150, logs of events occurring in the data pipeline are provided via a logging network. The logs can be provided to a set of trusted repositories and in some implementations, information from the logs can be provided to the client via the application programming interface (API).

Process 1100 may include additional implementations, such as any single implementation or any combination of implementations described below and/or in connection with one or more other processes described elsewhere herein.

In some implementations, process 1100 includes removing the one or more selected filters from the data pipeline after the message is processed by the one or more selected filters in the determined sequential order.

Although FIG. 11 shows example blocks of process 1100, in some implementations, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
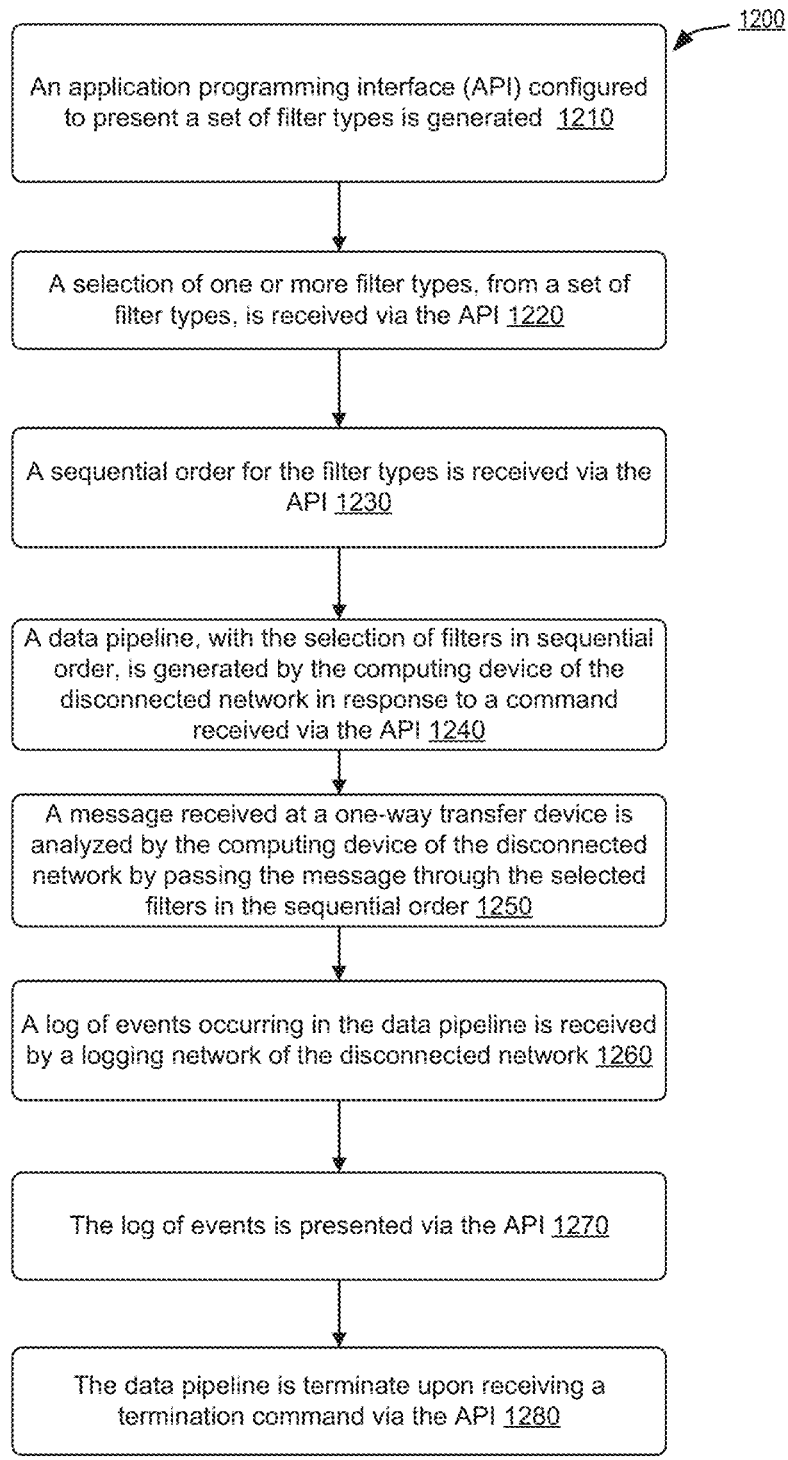
FIG. 12 shows a method for a cross-domain solution with disaggregated parts according to certain embodiments.

FIG. 12 shows a method 1200 for a cross-domain solution with disaggregated parts according to certain embodiments. In some implementations, one or more process blocks of FIG. 12 may be performed by a computing device of a disconnected network. In some implementations, one or more process blocks of FIG. 12 may be performed by another device or a group of devices separate from or including the network interface card.

At block 1210, an application programming interface (API) configured to present a set of filter types is generated by a computing device of a disconnected network. In some implementations the API can be a user interface (e.g., console) such as the user interface described above in relation to FIG. 9. The filter types can include one or more of a malware filter, a content filter, a signature filter, a content analyzer, a machine learning filter, or an artificial intelligence filter. The API can be part of providing a cross-domain solution as a service. The filters can include one or more artificial intelligence and/or machine learning (AI/ML) filters. The AI/ML filter can use a pretrained artificial intelligence and/or machine learning model. The AI/ML filter can also use an artificial intelligence and/or machine learning model that is trained on training data obtained from the disconnected network. The training data can include the packet origin, characteristics of known viruses or malware, or traffic patterns of traffic received at the disconnected network. The AI/ML filter can be trained on training data including packets flagged by content filters. The flagged packets can be packets that were identified as containing malware or a virus. The AI/ML filter can be trained to identify packets containing malware or a virus using the flagged packets.

At block 1220, a selection of one or more filter types, from the set of filter types, is received via the application programming interface. The selection of one or more filter types can be provided by a customer (e.g., client or user). The one or more filter types can be selected as part of configuring a cross-domain solution. The cross-domain solution can be configured via an application programming interface (API). The API can be provided to a user through a web service (e.g., cross-domain solution as a service (CDSaaS)). The API can be used to construct, generate or modify one or more cross domain solution instances. In some implementations, the selection of filter types can change between messages. In some implementations, the selection of the filter types can be based in part on the source of the message At block 1230, a sequential order for the selected filter types is received via the application programming interface. The sequential order of the one or more filter types can be provided by a customer (e.g., client or user). The order of the one or more filter types can be selected as part of configuring a cross-domain solution. The cross-domain solution can be provided as a cross-domain solution as a service. In some implementations, the sequential order of filter types can change between messages. In some implementations, the sequential order of the filter types can be based in part on the source of the message.

At block 1240, a data pipeline, with the selection of filters in the sequential order, is generated by the computing device of the disconnected network and in response to a command received via the application programming interface. In some implementations, the disconnected network can be a virtual cloud network. The customer (e.g., client or user) can configure the virtual cloud network as part of providing a cross-domain solution as a service.

At block 1250, a message received at a one-way transfer device is analyzed by the computing device of the disconnected network by passing the message through the selected filters in the sequential order. The one-way transfer device can be a software-based one-way transfer device. In some implementations, the one-way transfer device can be a smart network interface card (Smart NIC).

At block 1260, a log of events occurring in the data pipeline is received by a logging network of the disconnected network. The log of events can include events taking place at an operating system (OS) level, an application level, and a payload level.

At block 1270, the log of events is presented via the application programming interface.

At block 1280, the data pipeline is terminated upon receiving a termination command via the application programming interface.

Process 1200 may include additional implementations, such as any single implementation or any combination of implementations described below and/or in connection with one or more other processes described elsewhere herein.

In some implementations, process 1200 includes sending messages from the disconnected network to a trusted repository via a one-way transfer device.

Although FIG. 12 shows example blocks of process 1200, in some implementations, process 1200 may include additional blocks, fewer blocks, different blocks, or differently arranged blocks than those depicted in FIG. 12. Additionally, or alternatively, two or more of the blocks of process 1200 may be performed in parallel.

The term cloud service is generally used to refer to a service that is made available by a cloud services provider (CSP) to users or customers on demand (e.g., via a subscription model) using systems and infrastructure (cloud infrastructure) provided by the CSP. Typically, the servers and systems that make up the CSP's infrastructure are separate from the customer's own on-premise servers and systems. Customers can thus avail themselves of cloud services provided by the CSP without having to purchase separate hardware and software resources for the services. Cloud services are designed to provide a subscribing customer easy, scalable access to applications and computing resources without the customer having to invest in procuring the infrastructure that is used for providing the services.

There are several cloud service providers that offer various types of cloud services. There are various different types or models of cloud services including Software-as-a-Service (SaaS), Platform-as-a-Service (PaaS), Infrastructure-as-a-Service (IaaS), and others.

A customer can subscribe to one or more cloud services provided by a CSP. The customer can be any entity such as an individual, an organization, an enterprise, and the like. When a customer subscribes to or registers for a service provided by a CSP, a tenancy or an account is created for that customer. The customer can then, via this account, access the subscribed-to one or more cloud resources associated with the account.

As noted above, infrastructure as a service (IaaS) is one particular type of cloud computing service. In an IaaS model, the CSP provides infrastructure (referred to as cloud services provider infrastructure or CSPI) that can be used by customers to build their own customizable networks and deploy customer resources. The customer's resources and networks are thus hosted in a distributed environment by infrastructure provided by a CSP. This is different from traditional computing, where the customer's resources and networks are hosted by infrastructure provided by the customer.

The CSPI may comprise interconnected high-performance compute resources including various host machines, memory resources, and network resources that form a physical network, which is also referred to as a substrate network or an underlay network. The resources in CSPI may be spread across one or more data centers that may be geographically spread across one or more geographical regions. Virtualization software may be executed by these physical resources to provide a virtualized distributed environment. The virtualization creates an overlay network (also known as a software-based network, a software-defined network, or a virtual network) over the physical network. The CSPI physical network provides the underlying basis for creating one or more overlay or virtual networks on top of the physical network. The virtual or overlay networks can include one or more virtual cloud networks (VCNs). The virtual networks are implemented using software virtualization technologies (e.g., hypervisors, functions performed by network virtualization devices (NVDs) (e.g., smartNICs), top-of-rack (TOR) switches, smart TORs that implement one or more functions performed by an NVD, and other mechanisms) to create layers of network abstraction that can be run on top of the physical network. Virtual networks can take on many forms, including peer-to-peer networks, IP networks, and others. Virtual networks are typically either Layer-3 IP networks or Layer-2 VLANs. This method of virtual or overlay networking is often referred to as virtual or overlay Layer-3 networking. Examples of protocols developed for virtual networks include IP-in-IP (or Generic Routing Encapsulation (GRE)), Virtual Extensible LAN (VXLAN—IETF RFC 7348), Virtual Private Networks (VPNs) (e.g., MPLS Layer-3 Virtual Private Networks (RFC 4364)), VMware's NSX, GENEVE (Generic Network Virtualization Encapsulation), and others.

For IaaS, the infrastructure (CSPI) provided by a CSP can be configured to provide virtualized computing resources over a public network (e.g., the Internet). In an IaaS model, a cloud computing services provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance. CSPI provides infrastructure and a set of complementary cloud services that enable customers to build and run a wide range of applications and services in a highly available hosted distributed environment. CSPI offers high-performance compute resources and capabilities and storage capacity in a flexible virtual network that is securely accessible from various networked locations such as from a customer's on-premises network. When a customer subscribes to or registers for an IaaS service provided by a CSP, the tenancy created for that customer is a secure and isolated partition within the CSPI where the customer can create, organize, and administer their cloud resources.

Customers can build their own virtual networks using compute, memory, and networking resources provided by CSPI. One or more customer resources or workloads, such as compute instances, can be deployed on these virtual networks. For example, a customer can use resources provided by CSPI to build one or multiple customizable and private virtual network(s) referred to as virtual cloud networks (VCNs). A customer can deploy one or more customer resources, such as compute instances, on a customer VCN. Compute instances can take the form of virtual machines, bare metal instances, and the like. The CSPI thus provides infrastructure and a set of complementary cloud services that enable customers to build and run a wide range of applications and services in a highly available virtual hosted environment. The customer does not manage or control the underlying physical resources provided by CSPI but has control over operating systems, storage, and deployed applications; and possibly limited control of select networking components (e.g., firewalls).

The CSP may provide a console that enables customers and network administrators to configure, access, and manage resources deployed in the cloud using CSPI resources. In certain embodiments, the console provides a web-based user interface that can be used to access and manage CSPI. In some implementations, the console is a web-based application provided by the CSP.

CSPI may support single-tenancy or multi-tenancy architectures. In a single tenancy architecture, a software (e.g., an application, a database) or a hardware component (e.g., a host machine or a server) serves a single customer or tenant. In a multi-tenancy architecture, a software or a hardware component serves multiple customers or tenants. Thus, in a multi-tenancy architecture, CSPI resources are shared between multiple customers or tenants. In a multi-tenancy situation, precautions are taken and safeguards put in place within CSPI to ensure that each tenant's data is isolated and remains invisible to other tenants.

In a physical network, a network endpoint ("endpoint") refers to a computing device or system that is connected to a physical network and communicates back and forth with the network to which it is connected. A network endpoint in the physical network may be connected to a Local Area Network (LAN), a Wide Area Network (WAN), or other type of physical network. Examples of traditional endpoints in a physical network include modems, hubs, bridges, switches, routers, and other networking devices, physical computers (or host machines), and the like. Each physical device in the physical network has a fixed network address that can be used to communicate with the device. This fixed network address can be a Layer-2 address (e.g., a MAC address), a fixed Layer-3 address (e.g., an IP address), and the like. In a virtualized environment or in a virtual network, the endpoints can include various virtual endpoints such as virtual machines that are hosted by components of the physical network (e.g., hosted by physical host machines). These endpoints in the virtual network are addressed by overlay addresses such as overlay Layer-2 addresses (e.g., overlay MAC addresses) and overlay Layer-3 addresses (e.g., overlay IP addresses). Network overlays enable flexibility by allowing network managers to move around the overlay addresses associated with network endpoints using software management (e.g., via software implementing a control plane for the virtual network). Accordingly, unlike in a physical network, in a virtual network, an overlay address (e.g., an overlay IP address) can be moved from one endpoint to another using network management software. Since the virtual network is built on top of a physical network, communications between components in the virtual network involves both the virtual network and the underlying physical network. In order to facilitate such communications, the components of CSPI are configured to learn and store mappings that map overlay addresses in the virtual network to actual physical addresses in the substrate network, and vice versa. These mappings are then used to facilitate the communications. Customer traffic is encapsulated to facilitate routing in the virtual network.

Accordingly, physical addresses (e.g., physical IP addresses) are associated with components in physical networks and overlay addresses (e.g., overlay IP addresses) are associated with entities in virtual networks. Both the physical IP addresses and overlay IP addresses are types of real IP addresses. These are separate from virtual IP addresses, where a virtual IP address maps to multiple real IP addresses. A virtual IP address provides a 1-to-many mapping between the virtual IP address and multiple real IP addresses.

The cloud infrastructure or CSPI is physically hosted in one or more data centers in one or more regions around the world. The CSPI may include components in the physical or substrate network and virtualized components (e.g., virtual networks, compute instances, virtual machines, etc.) that are in an virtual network built on top of the physical network components. In certain embodiments, the CSPI is organized and hosted in realms, regions and availability domains. A region is typically a localized geographic area that contains one or more data centers. Regions are generally independent of each other and can be separated by vast distances, for example, across countries or even continents. For example, a first region may be in Australia, another one in Japan, yet another one in India, and the like. CSPI resources are divided among regions such that each region has its own independent subset of CSPI resources. Each region may provide a set of core infrastructure services and resources, such as, compute resources (e.g., bare metal servers, virtual machine, containers and related infrastructure, etc.); storage resources (e.g., block volume storage, file storage, object storage, archive storage); networking resources (e.g., virtual cloud networks (VCNs), load balancing resources, connections to on-premise networks), database resources; edge networking resources (e.g., DNS); and access management and monitoring resources, and others. Each region generally has multiple paths connecting it to other regions in the realm.

Generally, an application is deployed in a region (i.e., deployed on infrastructure associated with that region) where it is most heavily used, because using nearby resources is faster than using distant resources. Applications can also be deployed in different regions for various reasons, such as redundancy to mitigate the risk of region-wide events such as large weather systems or earthquakes, to meet varying requirements for legal jurisdictions, tax domains, and other business or social criteria, and the like.

The data centers within a region can be further organized and subdivided into availability domains (ADs). An availability domain may correspond to one or more data centers located within a region. A region can be composed of one or more availability domains. In such a distributed environment, CSPI resources are either region-specific, such as a virtual cloud network (VCN), or availability domain-specific, such as a compute instance.

ADs within a region are isolated from each other, fault tolerant, and are configured such that they are very unlikely to fail simultaneously. This is achieved by the ADs not sharing critical infrastructure resources such as networking, physical cables, cable paths, cable entry points, etc., such that a failure at one AD within a region is unlikely to impact the availability of the other ADs within the same region. The ADs within the same region may be connected to each other by a low latency, high bandwidth network, which makes it possible to provide high-availability connectivity to other networks (e.g., the Internet, customers' on-premise networks, etc.) and to build replicated systems in multiple ADs for both high-availability and disaster recovery. Cloud services use multiple ADs to ensure high availability and to protect against resource failure. As the infrastructure provided by the IaaS provider grows, more regions and ADs may be added with additional capacity. Traffic between availability domains is usually encrypted.

In certain embodiments, regions are grouped into realms. A realm is a logical collection of regions. Realms are isolated from each other and do not share any data. Regions in the same realm may communicate with each other, but regions in different realms cannot. A customer's tenancy or account with the CSP exists in a single realm and can be spread across one or more regions that belong to that realm. Typically, when a customer subscribes to an IaaS service, a tenancy or account is created for that customer in the customer-specified region (referred to as the "home" region) within a realm. A customer can extend the customer's tenancy across one or more other regions within the realm. A customer cannot access regions that are not in the realm where the customer's tenancy exists.

An IaaS provider can provide multiple realms, each realm catered to a particular set of customers or users. For example, a commercial realm may be provided for commercial customers. As another example, a realm may be provided for a specific country for customers within that country. As yet another example, a government realm may be provided for a government, and the like. For example, the government realm may be catered for a specific government and may have a heightened level of security than a commercial realm. For example, Oracle Cloud Infrastructure (OCI) currently offers a realm for commercial regions and two realms (e.g., FedRAMP authorized and IL5 authorized) for government cloud regions.

In certain embodiments, an AD can be subdivided into one or more fault domains. A fault domain is a grouping of infrastructure resources within an AD to provide anti-affinity. Fault domains allow for the distribution of compute instances such that the instances are not on the same physical hardware within a single AD. This is known as anti-affinity. A fault domain refers to a set of hardware components (computers, switches, and more) that share a single point of failure. A compute pool is logically divided up into fault domains. Due to this, a hardware failure or compute hardware maintenance event that affects one fault domain does not affect instances in other fault domains. Depending on the embodiment, the number of fault domains for each AD may vary. For instance, in certain embodiments each AD contains three fault domains. A fault domain acts as a logical data center within an AD.

When a customer subscribes to an IaaS service, resources from CSPI are provisioned for the customer and associated with the customer's tenancy. The customer can use these provisioned resources to build private networks and deploy resources on these networks. The customer networks that are hosted in the cloud by the CSPI are referred to as virtual cloud networks (VCNs). A customer can set up one or more virtual cloud networks (VCNs) using CSPI resources allocated for the customer. A VCN is a virtual or software defined private network. The customer resources that are deployed in the customer's VCN can include compute instances (e.g., virtual machines, bare-metal instances) and other resources. These compute instances may represent various customer workloads such as applications, load balancers, databases, and the like. A compute instance deployed on a VCN can communicate with public accessible endpoints ("public endpoints") over a public network such as the Internet, with other instances in the same VCN or other VCNs (e.g., the customer's other VCNs, or VCNs not belonging to the customer), with the customer's on-premise data centers or networks, and with service endpoints, and other types of endpoints.

The CSP may provide various services using the CSPI. In some instances, customers of CSPI may themselves act like service providers and provide services using CSPI resources. A service provider may expose a service endpoint, which is characterized by identification information (e.g., an IP Address, a DNS name and port). A customer's resource (e.g., a compute instance) can consume a particular service by accessing a service endpoint exposed by the service for that particular service. These service endpoints are generally endpoints that are publicly accessible by users using public IP addresses associated with the endpoints via a public communication network such as the Internet. Network endpoints that are publicly accessible are also sometimes referred to as public endpoints.

In certain embodiments, a service provider may expose a service via an endpoint (sometimes referred to as a service endpoint) for the service. Customers of the service can then use this service endpoint to access the service. In certain implementations, a service endpoint provided for a service can be accessed by multiple customers that intend to consume that service. In other implementations, a dedicated service endpoint may be provided for a customer such that only that customer can access the service using that dedicated service endpoint.

In certain embodiments, when a VCN is created, it is associated with a private overlay Classless Inter-Domain Routing (CIDR) address space, which is a range of private overlay IP addresses that are assigned to the VCN (e.g., 10.0/16). A VCN includes associated subnets, route tables, and gateways. A VCN resides within a single region but can span one or more or all of the region's availability domains. A gateway is a virtual interface that is configured for a VCN and enables communication of traffic to and from the VCN to one or more endpoints outside the VCN. One or more different types of gateways may be configured for a VCN to enable communication to and from different types of endpoints.

A VCN can be subdivided into one or more sub-networks such as one or more subnets. A subnet is thus a unit of configuration or a subdivision that can be created within a VCN. A VCN can have one or multiple subnets. Each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN.

Each compute instance is associated with a virtual network interface card (VNIC), that enables the compute instance to participate in a subnet of a VCN. A VNIC is a logical representation of physical Network Interface Card (NIC). In general, a VNIC is an interface between an entity (e.g., a compute instance, a service) and a virtual network. A VNIC exists in a subnet, has one or more associated IP addresses, and associated security rules or policies. A VNIC is equivalent to a Layer-2 port on a switch. A VNIC is attached to a compute instance and to a subnet within a VCN. A VNIC associated with a compute instance enables the compute instance to be a part of a subnet of a VCN and enables the compute instance to communicate (e.g., send and receive packets) with endpoints that are on the same subnet as the compute instance, with endpoints in different subnets in the VCN, or with endpoints outside the VCN. The VNIC associated with a compute instance thus determines how the compute instance connects with endpoints inside and outside the VCN. A VNIC for a compute instance is created and associated with that compute instance when the compute instance is created and added to a subnet within a VCN. For a subnet comprising a set of compute instances, the subnet contains the VNICs corresponding to the set of compute instances, each VNIC attached to a compute instance within the set of computer instances.

Each compute instance is assigned a private overlay IP address via the VNIC associated with the compute instance. This private overlay IP address is assigned to the VNIC that is associated with the compute instance when the compute instance is created and used for routing traffic to and from the compute instance. All VNICs in a given subnet use the same route table, security lists, and DHCP options. As described above, each subnet within a VCN is associated with a contiguous range of overlay IP addresses (e.g., 10.0.0.0/24 and 10.0.1.0/24) that do not overlap with other subnets in that VCN and which represent an address space subset within the address space of the VCN. For a VNIC on a particular subnet of a VCN, the private overlay IP address that is assigned to the VNIC is an address from the contiguous range of overlay IP addresses allocated for the subnet.

In certain embodiments, a compute instance may optionally be assigned additional overlay IP addresses in addition to the private overlay IP address, such as, for example, one or more public IP addresses if in a public subnet. These multiple addresses are assigned either on the same VNIC or over multiple VNICs that are associated with the compute instance. Each instance however has a primary VNIC that is created during instance launch and is associated with the overlay private IP address assigned to the instance—this primary VNIC cannot be removed. Additional VNICs, referred to as secondary VNICs, can be added to an existing instance in the same availability domain as the primary VNIC. All the VNICs are in the same availability domain as the instance. A secondary VNIC can be in a subnet in the same VCN as the primary VNIC, or in a different subnet that is either in the same VCN or a different one.

A compute instance may optionally be assigned a public IP address if it is in a public subnet. A subnet can be designated as either a public subnet or a private subnet at the time the subnet is created. A private subnet means that the resources (e.g., compute instances) and associated VNICs in the subnet cannot have public overlay IP addresses. A public subnet means that the resources and associated VNICs in the subnet can have public IP addresses. A customer can designate a subnet to exist either in a single availability domain or across multiple availability domains in a region or realm.

As described above, a VCN may be subdivided into one or more subnets. In certain embodiments, a Virtual Router (VR) configured for the VCN (referred to as the VCN VR or just VR) enables communications between the subnets of the VCN. For a subnet within a VCN, the VR represents a logical gateway for that subnet that enables the subnet (i.e., the compute instances on that subnet) to communicate with endpoints on other subnets within the VCN, and with other endpoints outside the VCN. The VCN VR is a logical entity that is configured to route traffic between VNICs in the VCN and virtual gateways ("gateways") associated with the VCN. Gateways are further described below with respect to FIG. 1. A VCN VR is a Layer-3/IP Layer concept. In one embodiment, there is one VCN VR for a VCN where the VCN VR has potentially an unlimited number of ports addressed by IP addresses, with one port for each subnet of the VCN. In this manner, the VCN VR has a different IP address for each subnet in the VCN that the VCN VR is attached to. The VR is also connected to the various gateways configured for a VCN. In certain embodiments, a particular overlay IP address from the overlay IP address range for a subnet is reserved for a port of the VCN VR for that subnet. For example, consider a VCN having two subnets with associated address ranges 10.0/16 and 10.1/16, respectively. For the first subnet within the VCN with address range 10.0/16, an address from this range is reserved for a port of the VCN VR for that subnet. In some instances, the first IP address from the range may be reserved for the VCN VR. For example, for the subnet with overlay IP address range 10.0/16, IP address 10.0.0.1 may be reserved for a port of the VCN VR for that subnet. For the second subnet within the same VCN with address range 10.1/16, the VCN VR may have a port for that second subnet with IP address 10.1.0.1. The VCN VR has a different IP address for each of the subnets in the VCN.

In some other embodiments, each subnet within a VCN may have its own associated VR that is addressable by the subnet using a reserved or default IP address associated with the VR. The reserved or default IP address may, for example, be the first IP address from the range of IP addresses associated with that subnet. The VNICs in the subnet can communicate (e.g., send and receive packets) with the VR associated with the subnet using this default or reserved IP address. In such an embodiment, the VR is the ingress/egress point for that subnet. The VR associated with a subnet within the VCN can communicate with other VRs associated with other subnets within the VCN. The VRs can also communicate with gateways associated with the VCN. The VR function for a subnet is running on or executed by one or more NVDs executing VNICs functionality for VNICs in the subnet.

Route tables, security rules, and DHCP options may be configured for a VCN. Route tables are virtual route tables for the VCN and include rules to route traffic from subnets within the VCN to destinations outside the VCN by way of gateways or specially configured instances. A VCN's route tables can be customized to control how packets are forwarded/routed to and from the VCN. DHCP options refers to configuration information that is automatically provided to the instances when they boot up.

Security rules configured for a VCN represent overlay firewall rules for the VCN. The security rules can include ingress and egress rules, and specify the types of traffic (e.g., based upon protocol and port) that is allowed in and out of the instances within the VCN. The customer can choose whether a given rule is stateful or stateless. For instance, the customer can allow incoming SSH traffic from anywhere to a set of instances by setting up a stateful ingress rule with source CIDR 0.0.0.0/0, and destination TCP port 22. Security rules can be implemented using network security groups or security lists. A network security group consists of a set of security rules that apply only to the resources in that group. A security list, on the other hand, includes rules that apply to all the resources in any subnet that uses the security list. A VCN may be provided with a default security list with default security rules. DHCP options configured for a VCN provide configuration information that is automatically provided to the instances in the VCN when the instances boot up.

In certain embodiments, the configuration information for a VCN is determined and stored by a VCN Control Plane.

The configuration information for a VCN may include, for example, information about: the address range associated with the VCN, subnets within the VCN and associated information, one or more VRs associated with the VCN, compute instances in the VCN and associated VNICs, NVDs executing the various virtualization network functions (e.g., VNICs, VRs, gateways) associated with the VCN, state information for the VCN, and other VCN-related information. In certain embodiments, a VCN Distribution Service publishes the configuration information stored by the VCN Control Plane, or portions thereof, to the NVDs. The distributed information may be used to update information (e.g., forwarding tables, routing tables, etc.) stored and used by the NVDs to forward packets to and from the compute instances in the VCN.

In certain embodiments, the creation of VCNs and subnets are handled by a VCN Control Plane (CP) and the launching of compute instances is handled by a Compute Control Plane. The Compute Control Plane is responsible for allocating the physical resources for the compute instance and then calls the VCN Control Plane to create and attach VNICs to the compute instance. The VCN CP also sends VCN data mappings to the VCN data plane that is configured to perform packet forwarding and routing functions. In certain embodiments, the VCN CP provides a distribution service that is responsible for providing updates to the VCN data plane. Examples of a VCN Control Plane are also depicted in FIGS. 18, 19, 20, and 21 (see references 1816, 1916, 2016, and 2116) and described below.

A customer may create one or more VCNs using resources hosted by CSPI. A compute instance deployed on a customer VCN may communicate with different endpoints. These endpoints can include endpoints that are hosted by CSPI and endpoints outside CSPI.

Figure 13:
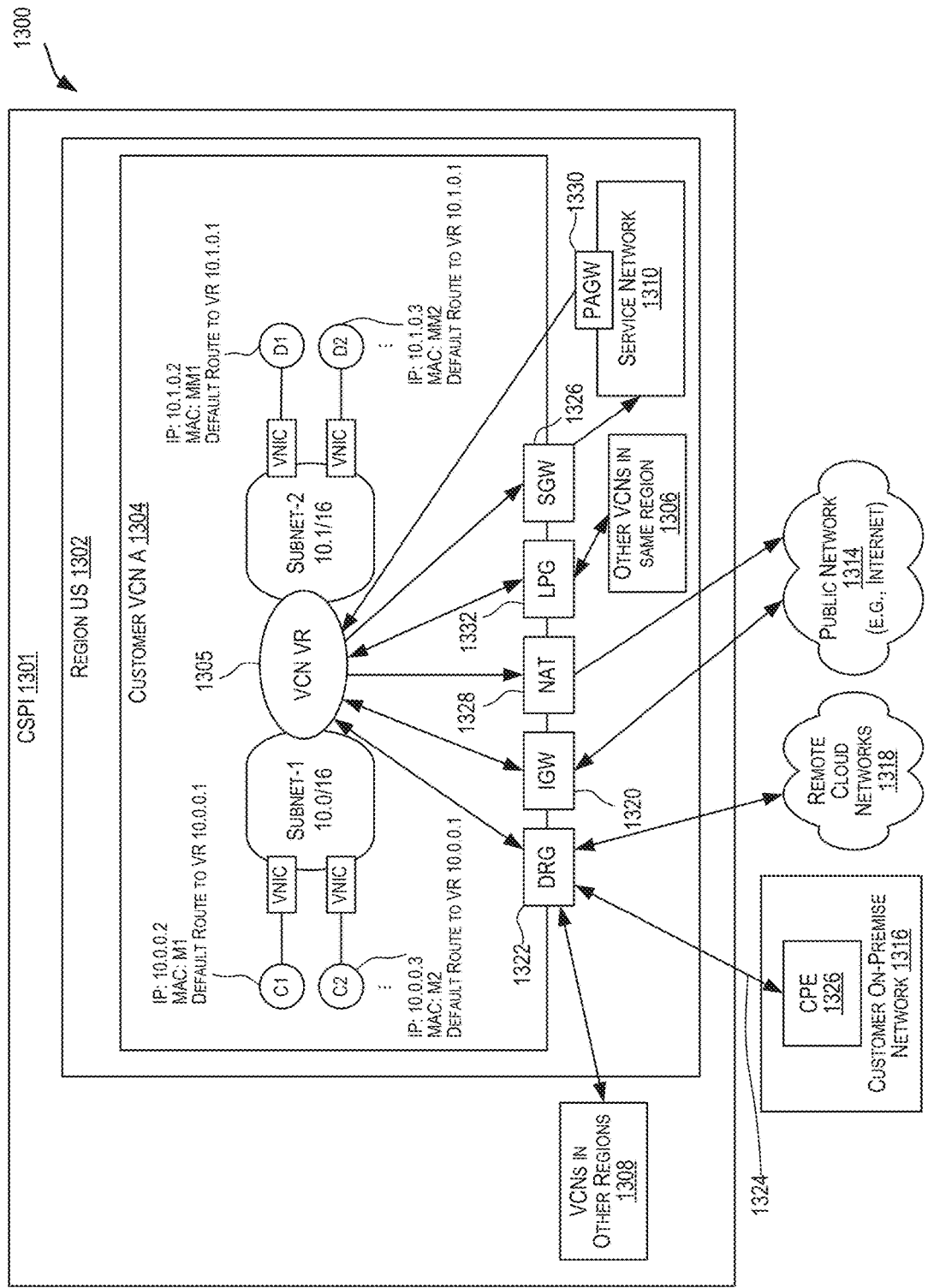
FIG. 13 is a high level diagram of a distributed environment showing a virtual or overlay cloud network hosted by a cloud service provider infrastructure according to certain embodiments.

Various different architectures for implementing cloud-based service using CSPI are depicted in FIGS. 13, 14, 15, 16, 17, 18, 19, 20, and 22, and are described below. FIG. 13 is a high level diagram of a distributed environment 1300 showing an overlay or customer VCN hosted by CSPI according to certain embodiments. The distributed environment depicted in FIG. 13 includes multiple components in the overlay network. Distributed environment 1300 depicted in FIG. 13 is merely an example and is not intended to unduly limit the scope of claimed embodiments. Many variations, alternatives, and modifications are possible. For example, in some implementations, the distributed environment depicted in FIG. 13 may have more or fewer systems or components than those shown in FIG. 1, may combine two or more systems, or may have a different configuration or arrangement of systems.

As shown in the example depicted in FIG. 13, distributed environment 1300 comprises CSPI 1301 that provides services and resources that customers can subscribe to and use to build their virtual cloud networks (VCNs). In certain embodiments, CSPI 1301 offers IaaS services to subscribing customers. The data centers within CSPI 1301 may be organized into one or more regions. One example region "Region US" 1302 is shown in FIG. 13. A customer has configured a customer VCN 1304 for region 1302. The customer may deploy various compute instances on VCN 1304, where the compute instances may include virtual machines or bare metal instances. Examples of instances include applications, database, load balancers, and the like.

In the embodiment depicted in FIG. 13, customer VCN 1304 comprises two subnets, namely, "Subnet-1" and "Subnet-2", each subnet with its own CIDR IP address range. In FIG. 13, the overlay IP address range for Subnet-1 is 16.0/16 and the address range for Subnet-2 is 16.1/16. A VCN Virtual Router 1305 represents a logical gateway for the VCN that enables communications between subnets of the VCN 1304, and with other endpoints outside the VCN. VCN VR 1305 is configured to route traffic between VNICs in VCN 1304 and gateways associated with VCN 1304. VCN VR 1305 provides a port for each subnet of VCN 1304. For example, VR 1305 may provide a port with IP address 10.0.0.1 for Subnet-1 and a port with IP address 10.1.0.1 for Subnet-2.

Multiple compute instances may be deployed on each subnet, where the compute instances can be virtual machine instances, and/or bare metal instances. The compute instances in a subnet may be hosted by one or more host machines within CSPI 6 1301. A compute instance participates in a subnet via a VNIC associated with the compute instance. For example, as shown in FIG. 13, a compute instance C1 is part of Subnet-1 via a VNIC associated with the compute instance. Likewise, compute instance C2 is part of Subnet-1 via a VNIC associated with C2. In a similar manner, multiple compute instances, which may be virtual machine instances or bare metal instances, may be part of Subnet-1. Via its associated VNIC, each compute instance is assigned a private overlay IP address and a MAC address. For example, in FIG. 13, compute instance C1 has an overlay IP address of 10.0.0.2 and a MAC address of M1, while compute instance C2 has an private overlay IP address of 10.0.0.3 and a MAC address of M2. Each compute instance in Subnet-1, including compute instances C1 and C2, has a default route to VCN VR 6 1305 using IP address 10.0.0.1, which is the IP address for a port of VCN VR 6 1305 for Subnet-1.

Subnet-2 can have multiple compute instances deployed on it, including virtual machine instances and/or bare metal instances. For example, as shown in FIG. 13, compute instances D1 and D2 are part of Subnet-2 via VNICs associated with the respective compute instances. In the embodiment depicted in FIG. 13, compute instance D1 has an overlay IP address of 0.1.0.2 and a MAC address of MM1, while compute instance D2 has an private overlay IP address of 10.1.0.3 and a MAC address of MM2. Each compute instance in Subnet-2, including compute instances D1 and D2, has a default route to VCN VR 6 1305 using IP address 10.1.0.1, which is the IP address for a port of VCN VR 1305 for Subnet-2.

VCN A 1304 may also include one or more load balancers. For example, a load balancer may be provided for a subnet and may be configured to load balance traffic across multiple compute instances on the subnet. A load balancer may also be provided to load balance traffic across subnets in the VCN.

A particular compute instance deployed on VCN 1304 can communicate with various different endpoints. These endpoints may include endpoints that are hosted by CSPI 1600 and endpoints outside CSPI 1600. Endpoints that are hosted by CSPI 1301 may include: an endpoint on the same subnet as the particular compute instance (e.g., communications between two compute instances in Subnet-1); an endpoint on a different subnet but within the same VCN (e.g., communication between a compute instance in Subnet-1 and a compute instance in Subnet-2); an endpoint in a different VCN in the same region (e.g., communications between a compute instance in Subnet-1 and an endpoint in a VCN in the same region 1306 or 1310, communications between a compute instance in Subnet-1 and an endpoint in service network 1310 in the same region); or an endpoint in a VCN in a different region (e.g., communications between a compute instance in Subnet-1 and an endpoint in a VCN in a different region 1308). A compute instance in a subnet hosted by CSPI 1301 may also communicate with endpoints that are not hosted by CSPI 1301 (i.e., are outside CSPI 1301). These outside endpoints include endpoints in the customer's on-premise network 1316, endpoints within other remote cloud hosted networks 1318, public endpoints 1314 accessible via a public network such as the Internet, and other endpoints.

Communications between compute instances on the same subnet are facilitated using VNICs associated with the source compute instance and the destination compute instance. For example, compute instance C1 in Subnet-1 may want to send packets to compute instance C2 in Subnet-1. For a packet originating at a source compute instance and whose destination is another compute instance in the same subnet, the packet is first processed by the VNIC associated with the source compute instance. Processing performed by the VNIC associated with the source compute instance can include determining destination information for the packet from the packet headers, identifying any policies (e.g., security lists) configured for the VNIC associated with the source compute instance, determining a next hop for the packet, performing any packet encapsulation/decapsulation functions as needed, and then forwarding/routing the packet to the next hop with the goal of facilitating communication of the packet to its intended destination. When the destination compute instance is in the same subnet as the source compute instance, the VNIC associated with the source compute instance is configured to identify the VNIC associated with the destination compute instance and forward the packet to that VNIC for processing. The VNIC associated with the destination compute instance is then executed and forwards the packet to the destination compute instance.

For a packet to be communicated from a compute instance in a subnet to an endpoint in a different subnet in the same VCN, the communication is facilitated by the VNICs associated with the source and destination compute instances and the VCN VR. For example, if compute instance C1 in Subnet-1 in FIG. 13 wants to send a packet to compute instance D1 in Subnet-2, the packet is first processed by the VNIC associated with compute instance C1. The VNIC associated with compute instance C1 is configured to route the packet to the VCN VR 1305 using default route or port 10.0.0.1 of the VCN VR. VCN VR 1305 is configured to route the packet to Subnet-2 using port 10.1.0.1. The packet is then received and processed by the VNIC associated with D1 and the VNIC forwards the packet to compute instance D1.

For a packet to be communicated from a compute instance in VCN 1304 to an endpoint that is outside VCN 1304, the communication is facilitated by the VNIC associated with the source compute instance, VCN VR 1305, and gateways associated with VCN 1304. One or more types of gateways may be associated with VCN 1304. A gateway is an interface between a VCN and another endpoint, where the another endpoint is outside the VCN. A gateway is a Layer-3/IP layer concept and enables a VCN to communicate with endpoints outside the VCN. A gateway thus facilitates traffic flow between a VCN and other VCNs or networks. Various different types of gateways may be configured for a VCN to facilitate different types of communications with different types of endpoints. Depending upon the gateway, the communications may be over public networks (e.g., the Internet) or over private networks. Various communication protocols may be used for these communications.

For example, compute instance C1 may want to communicate with an endpoint outside VCN 1304. The packet may be first processed by the VNIC associated with source compute instance C1. The VNIC processing determines that the destination for the packet is outside the Subnet-1 of C1. The VNIC associated with C1 may forward the packet to VCN VR 1305 for VCN 1304. VCN VR 1305 then processes the packet and as part of the processing, based upon the destination for the packet, determines a particular gateway associated with VCN 1304 as the next hop for the packet. VCN VR 1305 may then forward the packet to the particular identified gateway. For example, if the destination is an endpoint within the customer's on-premise network, then the packet may be forwarded by VCN VR 1305 to Dynamic Routing Gateway (DRG) gateway 1322 configured for VCN 1304. The packet may then be forwarded from the gateway to a next hop to facilitate communication of the packet to it final intended destination.

Various different types of gateways may be configured for a VCN. Examples of gateways that may be configured for a VCN are depicted in FIG. 13 and described below. Examples of gateways associated with a VCN are also depicted in FIGS. 18, 19, 20, and 21 (for example, gateways referenced by reference numbers 1834, 1836, 1838, 1934, 1936, 1938, 2034, 2036, 2038, 2134, 2136, and 2138) and described below. As shown in the embodiment depicted in FIG. 13, a Dynamic Routing Gateway (DRG) 1322 may be added to or be associated with customer VCN 1304 and provides a path for private network traffic communication between customer VCN 1304 and another endpoint, where the another endpoint can be the customer's on-premise network 1316, a VCN 1308 in a different region of CSPI 1301, or other remote cloud networks 1318 not hosted by CSPI 1301. Customer on-premise network 1316 may be a customer network or a customer data center built using the customer's resources. Access to customer on-premise network 1316 is generally very restricted. For a customer that has both a customer on-premise network 1316 and one or more VCNs 1304 deployed or hosted in the cloud by CSPI 1301, the customer may want their on-premise network 1316 and their cloud-based VCN 1304 to be able to communicate with each other. This enables a customer to build an extended hybrid environment encompassing the customer's VCN 1304 hosted by CSPI 1301 and their on-premises network 1316. DRG 1322 enables this communication. To enable such communications, a communication channel 1324 is set up where one endpoint of the channel is in customer on-premise network 1316 and the other endpoint is in CSPI 1301 and connected to customer VCN 1304. Communication channel 1324 can be over public communication networks such as the Internet or private communication networks. Various different communication protocols may be used such as IPsec VPN technology over a public communication network such as the Internet, Oracle's FastConnect technology that uses a private network instead of a public network, and others. The device or equipment in customer on-premise network 1316 that forms one end point for communication channel 1324 is referred to as the customer premise equipment (CPE), such as CPE 1326 depicted in FIG. 13. On the CSPI 1301 side, the endpoint may be a host machine executing DRG 1322.

In certain embodiments, a Remote Peering Connection (RPC) can be added to a DRG, which allows a customer to peer one VCN with another VCN in a different region. Using such an RPC, customer VCN 1304 can use DRG 1322 to connect with a VCN 1308 in another region. DRG 1322 may also be used to communicate with other remote cloud networks 1318, not hosted by CSPI 1301 such as a Microsoft Azure cloud, Amazon AWS cloud, and others.

As shown in FIG. 13, an Internet Gateway (IGW) 1320 may be configured for customer VCN 1304 the enables a compute instance on VCN 1304 to communicate with public endpoints 1314 accessible over a public network such as the Internet. IGW 15120 is a gateway that connects a VCN to a public network such as the Internet. IGW 1320 enables a public subnet (where the resources in the public subnet have public overlay IP addresses) within a VCN, such as VCN 1304, direct access to public endpoints 1312 on a public network 1314 such as the Internet. Using IGW 1320, connections can be initiated from a subnet within VCN 1304 or from the Internet.

A Network Address Translation (NAT) gateway 1328 can be configured for customer's VCN 1304 and enables cloud resources in the customer's VCN, which do not have dedicated public overlay IP addresses, access to the Internet and it does so without exposing those resources to direct incoming Internet connections (e.g., L4-L7 connections). This enables a private subnet within a VCN, such as private Subnet-1 in VCN 1304, with private access to public endpoints on the Internet. In NAT gateways, connections can be initiated only from the private subnet to the public Internet and not from the Internet to the private subnet.

In certain embodiments, a Service Gateway (SGW) 1326 can be configured for customer VCN 1304 and provides a path for private network traffic between VCN 1304 and supported services endpoints in a service network 1310. In certain embodiments, service network 1310 may be provided by the CSP and may provide various services. An example of such a service network is Oracle's Services Network, which provides various services that can be used by customers. For example, a compute instance (e.g., a database system) in a private subnet of customer VCN 1304 can back up data to a service endpoint (e.g., Object Storage) without needing public IP addresses or access to the Internet. In certain embodiments, a VCN can have only one SGW, and connections can only be initiated from a subnet within the VCN and not from service network 1310. If a VCN is peered with another, resources in the other VCN typically cannot access the SGW. Resources in on-premises networks that are connected to a VCN with FastConnect or VPN Connect can also use the service gateway configured for that VCN.

In certain implementations, SGW 1326 uses the concept of a service Classless Inter-Domain Routing (CIDR) label, which is a string that represents all the regional public IP address ranges for the service or group of services of interest. The customer uses the service CIDR label when they configure the SGW and related route rules to control traffic to the service. The customer can optionally utilize it when configuring security rules without needing to adjust them if the service's public IP addresses change in the future.

A Local Peering Gateway (LPG) 1332 is a gateway that can be added to customer VCN 1304 and enables VCN 1304 to peer with another VCN in the same region. Peering means that the VCNs communicate using private IP addresses, without the traffic traversing a public network such as the Internet or without routing the traffic through the customer's on-premises network 1316. In preferred embodiments, a VCN has a separate LPG for each peering it establishes. Local Peering or VCN Peering is a common practice used to establish network connectivity between different applications or infrastructure management functions.

Service providers, such as providers of services in service network 1310, may provide access to services using different access models. According to a public access model, services may be exposed as public endpoints that are publicly accessible by compute instance in a customer VCN via a public network such as the Internet and or may be privately accessible via SGW 1326. According to a specific private access model, services are made accessible as private IP endpoints in a private subnet in the customer's VCN. This is referred to as a Private Endpoint (PE) access and enables a service provider to expose their service as an instance in the customer's private network. A Private Endpoint resource represents a service within the customer's VCN. Each PE manifests as a VNIC (referred to as a PE-VNIC, with one or more private IPs) in a subnet chosen by the customer in the customer's VCN. A PE thus provides a way to present a service within a private customer VCN subnet using a VNIC. Since the endpoint is exposed as a VNIC, all the features associates with a VNIC such as routing rules, security lists, etc., are now available for the PE VNIC.

A service provider can register their service to enable access through a PE. The provider can associate policies with the service that restricts the service's visibility to the customer tenancies. A provider can register multiple services under a single virtual IP address (VIP), especially for multi-tenant services. There may be multiple such private endpoints (in multiple VCNs) that represent the same service.

Compute instances in the private subnet can then use the PE VNIC's private IP address or the service DNS name to access the service. Compute instances in the customer VCN can access the service by sending traffic to the private IP address of the PE in the customer VCN. A Private Access Gateway (PAGW) 1330 is a gateway resource that can be attached to a service provider VCN (e.g., a VCN in service network 1310) that acts as an ingress/egress point for all traffic from/to customer subnet private endpoints. PAGW 1330 enables a provider to scale the number of PE connections without utilizing its internal IP address resources. A provider needs only configure one PAGW for any number of services registered in a single VCN. Providers can represent a service as a private endpoint in multiple VCNs of one or more customers. From the customer's perspective, the PE VNIC, which, instead of being attached to a customer's instance, appears attached to the service with which the customer wishes to interact. The traffic destined to the private endpoint is routed via PAGW 1330 to the service. These are referred to as customer-to-service private connections (C2S connections).

The PE concept can also be used to extend the private access for the service to customer's on-premises networks and data centers, by allowing the traffic to flow through FastConnect/IPsec links and the private endpoint in the customer VCN. Private access for the service can also be extended to the customer's peered VCNs, by allowing the traffic to flow between LPG 1332 and the PE in the customer's VCN.

A customer can control routing in a VCN at the subnet level, so the customer can specify which subnets in the customer's VCN, such as VCN 1304, use each gateway. A VCN's route tables are used to decide if traffic is allowed out of a VCN through a particular gateway. For example, in a particular instance, a route table for a public subnet within customer VCN 1304 may send non-local traffic through IGW 1320. The route table for a private subnet within the same customer VCN 1304 may send traffic destined for CSP services through SGW 1326. All remaining traffic may be sent via the NAT gateway 1328. Route tables only control traffic going out of a VCN.

Security lists associated with a VCN are used to control traffic that comes into a VCN via a gateway via inbound connections. All resources in a subnet use the same route table and security lists. Security lists may be used to control specific types of traffic allowed in and out of instances in a subnet of a VCN. Security list rules may comprise ingress (inbound) and egress (outbound) rules. For example, an ingress rule may specify an allowed source address range, while an egress rule may specify an allowed destination address range. Security rules may specify a particular protocol (e.g., TCP, ICMP), a particular port (e.g., 22 for SSH, 3389 for Windows RDP), etc. In certain implementations, an instance's operating system may enforce its own firewall rules that are aligned with the security list rules. Rules may be stateful (e.g., a connection is tracked and the response is automatically allowed without an explicit security list rule for the response traffic) or stateless.

Access from a customer VCN (i.e., by a resource or compute instance deployed on VCN 1304) can be categorized as public access, private access, or dedicated access. Public access refers to an access model where a public IP address or a NAT is used to access a public endpoint. Private access enables customer workloads in VCN 1304 with private IP addresses (e.g., resources in a private subnet) to access services without traversing a public network such as the Internet. In certain embodiments, CSPI 1301 enables customer VCN workloads with private IP addresses to access the (public service endpoints of) services using a service gateway. A service gateway thus offers a private access model by establishing a virtual link between the customer's VCN and the service's public endpoint residing outside the customer's private network.

Additionally, CSPI may offer dedicated public access using technologies such as FastConnect public peering where customer on-premises instances can access one or more services in a customer VCN using a FastConnect connection and without traversing a public network such as the Internet. CSPI also may also offer dedicated private access using FastConnect private peering where customer on-premises instances with private IP addresses can access the customer's VCN workloads using a FastConnect connection. FastConnect is a network connectivity alternative to using the public Internet to connect a customer's on-premise network to CSPI and its services. FastConnect provides an easy, elastic, and economical way to create a dedicated and private connection with higher bandwidth options and a more reliable and consistent networking experience when compared to Internet-based connections.

Figure 14:
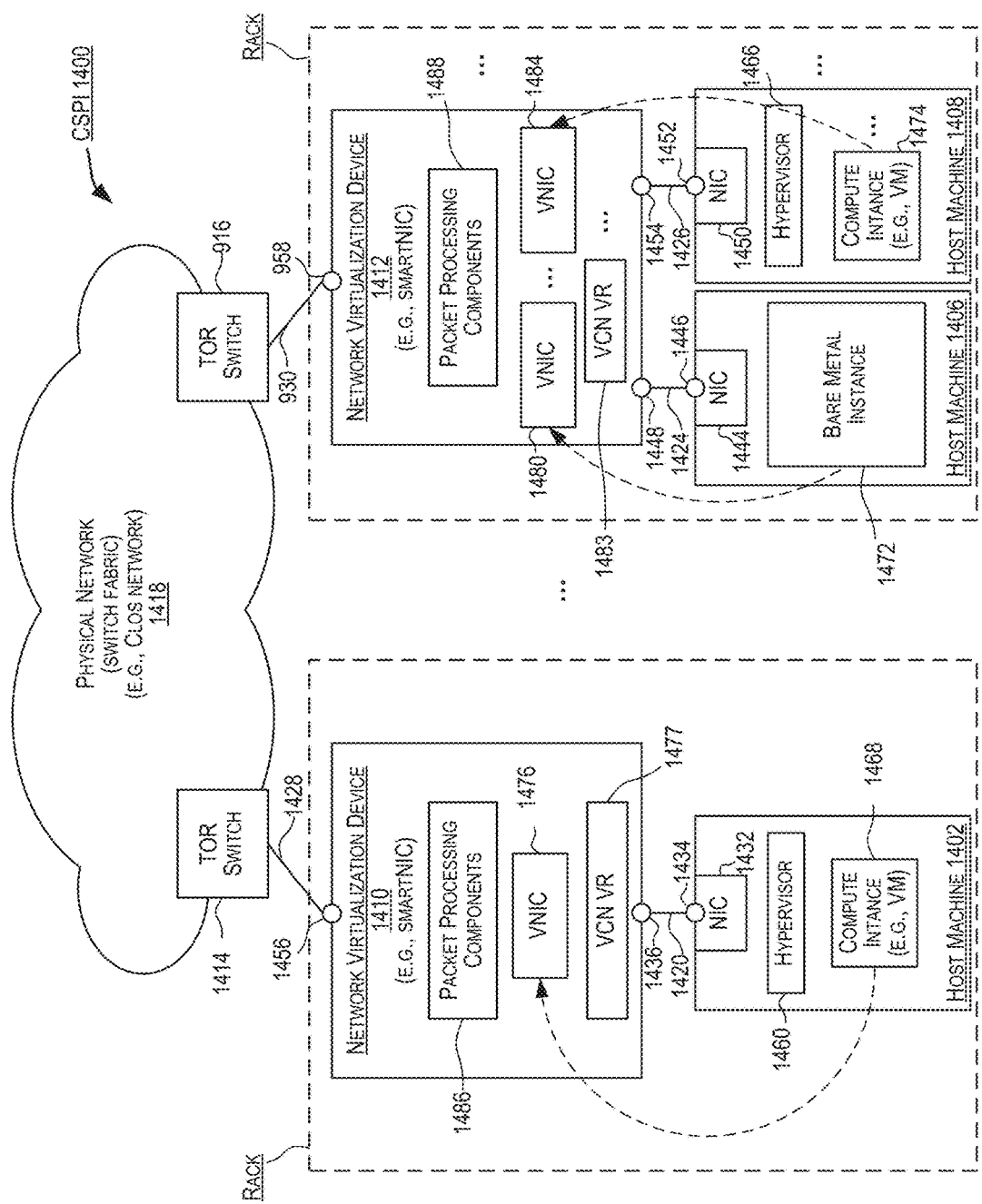
FIG. 14 depicts a simplified architectural diagram of the physical components in the physical network within CSPI according to certain embodiments.

FIG. 13 and the accompanying description above describes various virtualized components in an example virtual network. As described above, the virtual network is built on the underlying physical or substrate network. FIG. 14 depicts a simplified architectural diagram of the physical components in the physical network within CSPI 1400 that provide the underlay for the virtual network according to certain embodiments. As shown, CSPI 1400 provides a distributed environment comprising components and resources (e.g., compute, memory, and networking resources) provided by a cloud service provider (CSP). These components and resources are used to provide cloud services (e.g., IaaS services) to subscribing customers, i.e., customers that have subscribed to one or more services provided by the CSP. Based upon the services subscribed to by a customer, a subset of resources (e.g., compute, memory, and networking resources) of CSPI 1400 are provisioned for the customer. Customers can then build their own cloud-based (i.e., CSPI-hosted) customizable and private virtual networks using physical compute, memory, and networking resources provided by CSPI 1400. As previously indicated, these customer networks are referred to as virtual cloud networks (VCNs). A customer can deploy one or more customer resources, such as compute instances, on these customer VCNs. Compute instances can be in the form of virtual machines, bare metal instances, and the like. CSPI 1400 provides infrastructure and a set of complementary cloud services that enable customers to build and run a wide range of applications and services in a highly available hosted environment.

In the example embodiment depicted in FIG. 14, the physical components of CSPI 1400 include one or more physical host machines or physical servers (e.g., 1402, 1406, 1408), network virtualization devices (NVDs) (e.g., 1410, 1412), top-of-rack (TOR) switches (e.g., 1414, 1416), and a physical network (e.g., 1418), and switches in physical network 1418. The physical host machines or servers may host and execute various compute instances that participate in one or more subnets of a VCN. The compute instances may include virtual machine instances, and bare metal instances. For example, the various compute instances depicted in FIG. 13 may be hosted by the physical host machines depicted in FIG. 14. The virtual machine compute instances in a VCN may be executed by one host machine or by multiple different host machines. The physical host machines may also host virtual host machines, container-based hosts or functions, and the like. The VNICs and VCN VR depicted in FIG. 13 may be executed by the NVDs depicted in FIG. 14. The gateways depicted in FIG. 13 may be executed by the host machines and/or by the NVDs depicted in FIG. 14.

The host machines or servers may execute a hypervisor (also referred to as a virtual machine monitor or VMM) that creates and enables a virtualized environment on the host machines. The virtualization or virtualized environment facilitates cloud-based computing. One or more compute instances may be created, executed, and managed on a host machine by a hypervisor on that host machine. The hypervisor on a host machine enables the physical computing resources of the host machine (e.g., compute, memory, and networking resources) to be shared between the various compute instances executed by the host machine.

For example, as depicted in FIG. 14, host machines 1402 and 1408 execute hypervisors 1460 and 1466, respectively. These hypervisors may be implemented using software, firmware, or hardware, or combinations thereof. Typically, a hypervisor is a process or a software layer that sits on top of the host machine's operating system (OS), which in turn executes on the hardware processors of the host machine. The hypervisor provides a virtualized environment by enabling the physical computing resources (e.g., processing resources such as processors/cores, memory resources, networking resources) of the host machine to be shared among the various virtual machine compute instances executed by the host machine. For example, in FIG. 14, hypervisor 1460 may sit on top of the OS of host machine 1402 and enables the computing resources (e.g., processing, memory, and networking resources) of host machine 1402 to be shared between compute instances (e.g., virtual machines) executed by host machine 1402. A virtual machine can have its own operating system (referred to as a guest operating system), which may be the same as or different from the OS of the host machine. The operating system of a virtual machine executed by a host machine may be the same as or different from the operating system of another virtual machine executed by the same host machine. A hypervisor thus enables multiple operating systems to be executed alongside each other while sharing the same computing resources of the host machine. The host machines depicted in FIG. 14 may have the same or different types of hypervisors.

A compute instance can be a virtual machine instance or a bare metal instance. In FIG. 14, compute instances 1468 on host machine 1402 and 1474 on host machine 1408 are examples of virtual machine instances. Host machine 1406 is an example of a bare metal instance that is provided to a customer.

In certain instances, an entire host machine may be provisioned to a single customer, and all of the one or more compute instances (either virtual machines or bare metal instance) hosted by that host machine belong to that same customer. In other instances, a host machine may be shared between multiple customers (i.e., multiple tenants). In such a multi-tenancy scenario, a host machine may host virtual machine compute instances belonging to different customers. These compute instances may be members of different VCNs of different customers. In certain embodiments, a bare metal compute instance is hosted by a bare metal server without a hypervisor. When a bare metal compute instance is provisioned, a single customer or tenant maintains control of the physical CPU, memory, and network interfaces of the host machine hosting the bare metal instance and the host machine is not shared with other customers or tenants.

As previously described, each compute instance that is part of a VCN is associated with a VNIC that enables the compute instance to become a member of a subnet of the VCN. The VNIC associated with a compute instance facilitates the communication of packets or frames to and from the compute instance. A VNIC is associated with a compute instance when the compute instance is created. In certain embodiments, for a compute instance executed by a host machine, the VNIC associated with that compute instance is executed by an NVD connected to the host machine. For example, in FIG. 14, host machine 1402 executes a virtual machine compute instance 1468 that is associated with VNIC 1476, and VNIC 1476 is executed by NVD 1410 connected to host machine 1402. As another example, bare metal instance 1472 hosted by host machine 1406 is associated with VNIC 1480 that is executed by NVD 1412 connected to host machine 1406. As yet another example, VNIC 1484 is associated with compute instance 1474 executed by host machine 1408, and VNIC 1484 is executed by NVD 1412 connected to host machine 1408.

For compute instances hosted by a host machine, an NVD connected to that host machine also executes VCN VRs corresponding to VCNs of which the compute instances are members. For example, in the embodiment depicted in FIG. 14, NVD 1410 executes VCN VR 1477 corresponding to the VCN of which compute instance 1468 is a member. NVD 1412 may also execute one or more VCN VRs 1483 corresponding to VCNs corresponding to the compute instances hosted by host machines 1406 and 1408.

A host machine may include one or more network interface cards (NIC) that enable the host machine to be connected to other devices. A NIC on a host machine may provide one or more ports (or interfaces) that enable the host machine to be communicatively connected to another device. For example, a host machine may be connected to an NVD using one or more ports (or interfaces) provided on the host machine and on the NVD. A host machine may also be connected to other devices such as another host machine.

For example, in FIG. 14, host machine 1402 is connected to NVD 1410 using link 1420 that extends between a port 1434 provided by a NIC 1432 of host machine 1402 and between a port 1436 of NVD 1410. Host machine 1406 is connected to NVD 1412 using link 1424 that extends between a port 1446 provided by a NIC 1444 of host machine 1406 and between a port 1448 of NVD 1412. Host machine 1408 is connected to NVD 1412 using link 1426 that extends between a port 1452 provided by a NIC 1450 of host machine 1408 and between a port 1454 of NVD 1412.

The NVDs are in turn connected via communication links to top-of-the-rack (TOR) switches, which are connected to physical network 1418 (also referred to as the switch fabric). In certain embodiments, the links between a host machine and an NVD, and between an NVD and a TOR switch are Ethernet links. For example, in FIG. 14, NVDs 1410 and 1412 are connected to TOR switches 1414 and 1416, respectively, using links 1428 and 1430. In certain embodiments, the links 1420, 1424, 1426, 1428, and 1430 are Ethernet links. The collection of host machines and NVDs that are connected to a TOR is sometimes referred to as a rack.

Figure 17:
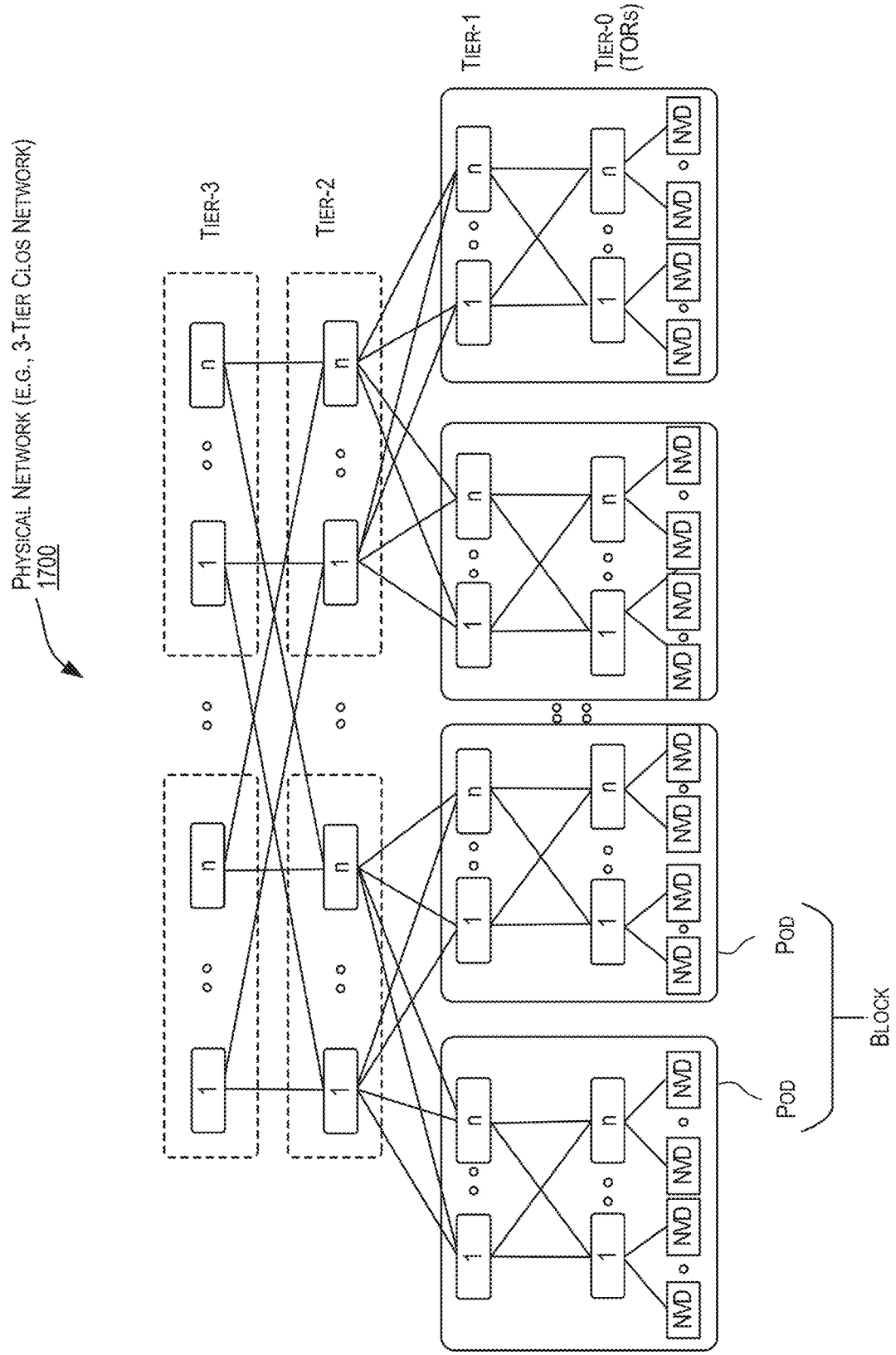
FIG. 17 depicts a simplified block diagram of a physical network provided by a CSPI according to certain embodiments.

Physical network 1418 provides a communication fabric that enables TOR switches to communicate with each other. Physical network 1418 can be a multi-tiered network. In certain implementations, physical network 1418 is a multi-tiered Clos network of switches, with TOR switches 1414 and 1416 representing the leaf level nodes of the multi-tiered and multi-node physical switching network 1418. Different Clos network configurations are possible including but not limited to a 2-tier network, a 3-tier network, a 4-tier network, a 9-tier network, and in general a "n"-tiered network. An example of a Clos network is depicted in FIG. 17 and described below.

Various different connection configurations are possible between host machines and NVDs such as one-to-one configuration, many-to-one configuration, one-to-many configuration, and others. In a one-to-one configuration implementation, each host machine is connected to its own separate NVD. For example, in FIG. 14, host machine 1402 is connected to NVD 1410 via NIC 1432 of host machine 1402. In a many-to-one configuration, multiple host machines are connected to one NVD. For example, in FIG. 14, host machines 1406 and 1408 are connected to the same NVD 1412 via NICs 1444 and 1450, respectively.

Figure 15:
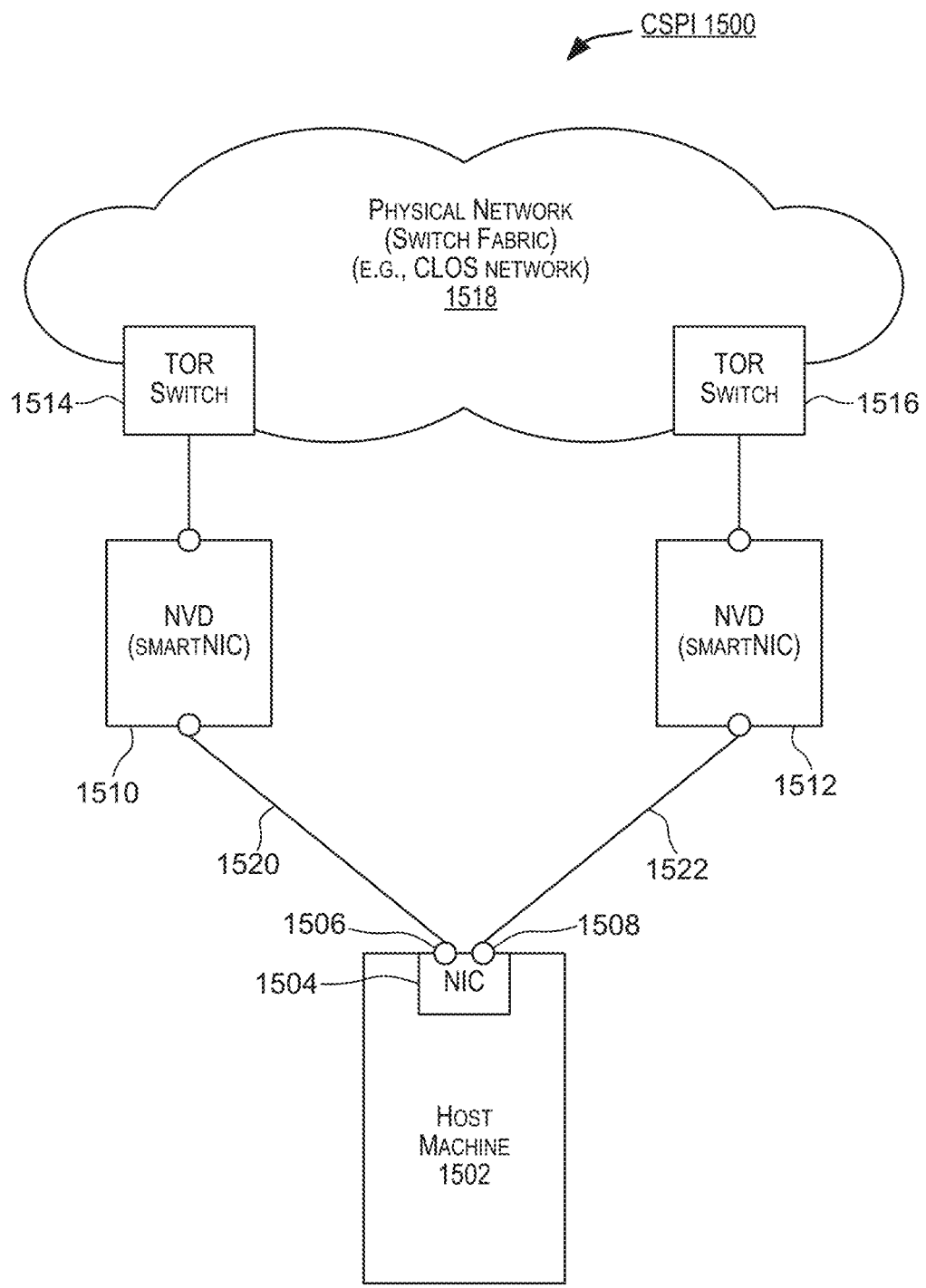
FIG. 15 shows an example arrangement within CSPI where a host machine is connected to multiple network virtualization devices (NVDs) according to certain embodiments.

In a one-to-many configuration, one host machine is connected to multiple NVDs. FIG. 15 shows an example within CSPI 1500 where a host machine is connected to multiple NVDs. As shown in FIG. 15, host machine 1502 comprises a network interface card (NIC) 1504 that includes multiple ports 1506 and 1508. Host machine 1502 is connected to a first NVD 1510 via port 1506 and link 1520, and connected to a second NVD 1512 via port 1508 and link 1522. Ports 1506 and 1508 may be Ethernet ports and the links 1520 and 1522 between host machine 1502 and NVDs 1510 and 1512 may be Ethernet links. NVD 1510 is in turn connected to a first TOR switch 1514 and NVD 1512 is connected to a second TOR switch 1516. The links between NVDs 1510 and 1512, and TOR switches 1514 and 1516 may be Ethernet links. TOR switches 1514 and 1516 represent the Tier-0 switching devices in multi-tiered physical network 1518.

The arrangement depicted in FIG. 15 provides two separate physical network paths to and from physical switch network 1518 to host machine 1502: a first path traversing TOR switch 1514 to NVD 1510 to host machine 1502, and a second path traversing TOR switch 1516 to NVD 1512 to host machine 1502. The separate paths provide for enhanced availability (referred to as high availability) of host machine 1502. If there are problems in one of the paths (e.g., a link in one of the paths goes down) or devices (e.g., a particular NVD is not functioning), then the other path may be used for communications to/from host machine 1502.

In the configuration depicted in FIG. 15, the host machine is connected to two different NVDs using two different ports provided by a NIC of the host machine. In other embodiments, a host machine may include multiple NICs that enable connectivity of the host machine to multiple NVDs.

Referring back to FIG. 14, an NVD is a physical device or component that performs one or more network and/or storage virtualization functions. An NVD may be any device with one or more processing units (e.g., CPUs, Network Processing Units (NPUs), FPGAs, packet processing pipelines, etc.), memory including cache, and ports. The various virtualization functions may be performed by software/firmware executed by the one or more processing units of the NVD.

An NVD may be implemented in various different forms. For example, in certain embodiments, an NVD is implemented as an interface card referred to as a smartNIC or an intelligent NIC with an embedded processor onboard. A smartNIC is a separate device from the NICs on the host machines. In FIG. 14, the NVDs 1410 and 1412 may be implemented as smartNICs that are connected to host machines 1402, and host machines 1406 and 1408, respectively.

A smartNIC is however just one example of an NVD implementation. Various other implementations are possible. For example, in some other implementations, an NVD or one or more functions performed by the NVD may be incorporated into or performed by one or more host machines, one or more TOR switches, and other components of CSPI 1400. For example, an NVD may be embodied in a host machine where the functions performed by an NVD are performed by the host machine. As another example, an NVD may be part of a TOR switch or a TOR switch may be configured to perform functions performed by an NVD that enables the TOR switch to perform various complex packet transformations that are used for a public cloud. A TOR that performs the functions of an NVD is sometimes referred to as a smart TOR. In yet other implementations, where virtual machines (VMs) instances, but not bare metal (BM) instances, are offered to customers, functions performed by an NVD may be implemented inside a hypervisor of the host machine. In some other implementations, some of the functions of the NVD may be offloaded to a centralized service running on a fleet of host machines.

In certain embodiments, such as when implemented as a smartNIC as shown in FIG. 14, an NVD may comprise multiple physical ports that enable it to be connected to one or more host machines and to one or more TOR switches. A port on an NVD can be classified as a host-facing port (also referred to as a "south port") or a network-facing or TOR-facing port (also referred to as a "north port"). A host-facing port of an NVD is a port that is used to connect the NVD to a host machine. Examples of host-facing ports in FIG. 14 include port 1436 on NVD 1410, and ports 1448 and 1454 on NVD 1412. A network-facing port of an NVD is a port that is used to connect the NVD to a TOR switch. Examples of network-facing ports in FIG. 14 include port 1456 on NVD 1410, and port 1458 on NVD 1412. As shown in FIG. 14, NVD 1410 is connected to TOR switch 1414 using link 1428 that extends from port 1456 of NVD 1410 to the TOR switch 1414. Likewise, NVD 1412 is connected to TOR switch 1416 using link 1430 that extends from port 1458 of NVD 1412 to the TOR switch 1416.

An NVD receives packets and frames from a host machine (e.g., packets and frames generated by a compute instance hosted by the host machine) via a host-facing port and, after performing the necessary packet processing, may forward the packets and frames to a TOR switch via a network-facing port of the NVD. An NVD may receive packets and frames from a TOR switch via a network-facing port of the NVD and, after performing the necessary packet processing, may forward the packets and frames to a host machine via a host-facing port of the NVD.

In certain embodiments, there may be multiple ports and associated links between an NVD and a TOR switch. These ports and links may be aggregated to form a link aggregator group of multiple ports or links (referred to as a LAG). Link aggregation allows multiple physical links between two end-points (e.g., between an NVD and a TOR switch) to be treated as a single logical link. All the physical links in a given LAG may operate in full-duplex mode at the same speed. LAGs help increase the bandwidth and reliability of the connection between two endpoints. If one of the physical links in the LAG goes down, traffic is dynamically and transparently reassigned to one of the other physical links in the LAG. The aggregated physical links deliver higher bandwidth than each individual link. The multiple ports associated with a LAG are treated as a single logical port. Traffic can be load-balanced across the multiple physical links of a LAG. One or more LAGs may be configured between two endpoints. The two endpoints may be between an NVD and a TOR switch, between a host machine and an NVD, and the like.

An NVD implements or performs network virtualization functions. These functions are performed by software/firmware executed by the NVD. Examples of network virtualization functions include without limitation: packet encapsulation and de-capsulation functions; functions for creating a VCN network; functions for implementing network policies such as VCN security list (firewall) functionality; functions that facilitate the routing and forwarding of packets to and from compute instances in a VCN; and the like. In certain embodiments, upon receiving a packet, an NVD is configured to execute a packet processing pipeline for processing the packet and determining how the packet is to be forwarded or routed. As part of this packet processing pipeline, the NVD may execute one or more virtual functions associated with the overlay network such as executing VNICs associated with cis in the VCN, executing a Virtual Router (VR) associated with the VCN, the encapsulation and decapsulation of packets to facilitate forwarding or routing in the virtual network, execution of certain gateways (e.g., the Local Peering Gateway), the implementation of Security Lists, Network Security Groups, network address translation (NAT) functionality (e.g., the translation of Public IP to Private IP on a host by host basis), throttling functions, and other functions.

In certain embodiments, the packet processing data path in an NVD may comprise multiple packet pipelines, each composed of a series of packet transformation stages. In certain implementations, upon receiving a packet, the packet is parsed and classified to a single pipeline. The packet is then processed in a linear fashion, one stage after another, until the packet is either dropped or sent out over an interface of the NVD. These stages provide basic functional packet processing building blocks (e.g., validating headers, enforcing throttle, inserting new Layer-2 headers, enforcing L4 firewall, VCN encapsulation/decapsulation, etc.) so that new pipelines can be constructed by composing existing stages, and new functionality can be added by creating new stages and inserting them into existing pipelines.

An NVD may perform both control plane and data plane functions corresponding to a control plane and a data plane of a VCN. Examples of a VCN Control Plane are also depicted in FIGS. 18, 19, 20, and 21 (see references 1816, 1916, 2016, and 2116) and described below. Examples of a VCN Data Plane are depicted in FIGS. 18, 19, 20, and 21 (see references 1818, 1918, 2018, and 2118) and described below. The control plane functions include functions used for configuring a network (e.g., setting up routes and route tables, configuring VNICs, etc.) that controls how data is to be forwarded. In certain embodiments, a VCN Control Plane is provided that computes all the overlay-to-substrate mappings centrally and publishes them to the NVDs and to the virtual network edge devices such as various gateways such as the DRG, the SGW, the IGW, etc. Firewall rules may also be published using the same mechanism. In certain embodiments, an NVD only gets the mappings that are relevant for that NVD. The data plane functions include functions for the actual routing/forwarding of a packet based upon configuration set up using control plane. A VCN data plane is implemented by encapsulating the customer's network packets before they traverse the substrate network. The encapsulation/decapsulation functionality is implemented on the NVDs. In certain embodiments, an NVD is configured to intercept all network packets in and out of host machines and perform network virtualization functions.

As indicated above, an NVD executes various virtualization functions including VNICs and VCN VRs. An NVD may execute VNICs associated with the compute instances hosted by one or more host machines connected to the VNIC. For example, as depicted in FIG. 14, NVD 1410 executes the functionality for VNIC 1476 that is associated with compute instance 1468 hosted by host machine 1402 connected to NVD 1410. As another example, NVD 1412 executes VNIC 1480 that is associated with bare metal compute instance 1472 hosted by host machine 1406, and executes VNIC 1484 that is associated with compute instance 1474 hosted by host machine 1408. A host machine may host compute instances belonging to different VCNs, which belong to different customers, and the NVD connected to the host machine may execute the VNICs (i.e., execute VNICs-relate functionality) corresponding to the compute instances.

An NVD also executes VCN Virtual Routers corresponding to the VCNs of the compute instances. For example, in the embodiment depicted in FIG. 14, NVD 1410 executes VCN VR 1477 corresponding to the VCN to which compute instance 1468 belongs. NVD 1412 executes one or more VCN VRs 1483 corresponding to one or more VCNs to which compute instances hosted by host machines 1406 and 1408 belong. In certain embodiments, the VCN VR corresponding to that VCN is executed by all the NVDs connected to host machines that host at least one compute instance belonging to that VCN. If a host machine hosts compute instances belonging to different VCNs, an NVD connected to that host machine may execute VCN VRs corresponding to those different VCNs.

In addition to VNICs and VCN VRs, an NVD may execute various software (e.g., daemons) and include one or more hardware components that facilitate the various network virtualization functions performed by the NVD. For purposes of simplicity, these various components are grouped together as "packet processing components" shown in FIG. 14. For example, NVD 1410 comprises packet processing components 1486 and NVD 1412 comprises packet processing components 1488. For example, the packet processing components for an NVD may include a packet processor that is configured to interact with the NVD's ports and hardware interfaces to monitor all packets received by and communicated using the NVD and store network information. The network information may, for example, include network flow information identifying different network flows handled by the NVD and per flow information (e.g., per flow statistics). In certain embodiments, network flows information may be stored on a per VNIC basis. The packet processor may perform packet-by-packet manipulations as well as implement stateful NAT and L4 firewall (FW). As another example, the packet processing components may include a replication agent that is configured to replicate information stored by the NVD to one or more different replication target stores. As yet another example, the packet processing components may include a logging agent that is configured to perform logging functions for the NVD. The packet processing components may also include software for monitoring the performance and health of the NVD and, also possibly of monitoring the state and health of other components connected to the NVD.

FIG. 13 shows the components of an example virtual or overlay network including a VCN, subnets within the VCN, compute instances deployed on subnets, VNICs associated with the compute instances, a VR for a VCN, and a set of gateways configured for the VCN. The overlay components depicted in FIG. 13 may be executed or hosted by one or more of the physical components depicted in FIG. 14. For example, the compute instances in a VCN may be executed or hosted by one or more host machines depicted in FIG. 14. For a compute instance hosted by a host machine, the VNIC associated with that compute instance is typically executed by an NVD connected to that host machine (i.e., the VNIC functionality is provided by the NVD connected to that host machine). The VCN VR function for a VCN is executed by all the NVDs that are connected to host machines hosting or executing the compute instances that are part of that VCN. The gateways associated with a VCN may be executed by one or more different types of NVDs. For example, certain gateways may be executed by smartNICs, while others may be executed by one or more host machines or other implementations of NVDs.

As described above, a compute instance in a customer VCN may communicate with various different endpoints, where the endpoints can be within the same subnet as the source compute instance, in a different subnet but within the same VCN as the source compute instance, or with an endpoint that is outside the VCN of the source compute instance. These communications are facilitated using VNICs associated with the compute instances, the VCN VRs, and the gateways associated with the VCNs.

For communications between two compute instances on the same subnet in a VCN, the communication is facilitated using VNICs associated with the source and destination compute instances. The source and destination compute instances may be hosted by the same host machine or by different host machines. A packet originating from a source compute instance may be forwarded from a host machine hosting the source compute instance to an NVD connected to that host machine. On the NVD, the packet is processed using a packet processing pipeline, which can include execution of the VNIC associated with the source compute instance. Since the destination endpoint for the packet is within the same subnet, execution of the VNIC associated with the source compute instance results in the packet being forwarded to an NVD executing the VNIC associated with the destination compute instance, which then processes and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs). The VNICs may use routing/forwarding tables stored by the NVD to determine the next hop for the packet.

For a packet to be communicated from a compute instance in a subnet to an endpoint in a different subnet in the same VCN, the packet originating from the source compute instance is communicated from the host machine hosting the source compute instance to the NVD connected to that host machine. On the NVD, the packet is processed using a packet processing pipeline, which can include execution of one or more VNICs, and the VR associated with the VCN. For example, as part of the packet processing pipeline, the NVD executes or invokes functionality corresponding to the VNIC (also referred to as executes the VNIC) associated with source compute instance. The functionality performed by the VNIC may include looking at the VLAN tag on the packet. Since the packet's destination is outside the subnet, the VCN VR functionality is next invoked and executed by the NVD. The VCN VR then routes the packet to the NVD executing the VNIC associated with the destination compute instance. The VNIC associated with the destination compute instance then processes the packet and forwards the packet to the destination compute instance. The VNICs associated with the source and destination compute instances may be executed on the same NVD (e.g., when both the source and destination compute instances are hosted by the same host machine) or on different NVDs (e.g., when the source and destination compute instances are hosted by different host machines connected to different NVDs).

If the destination for the packet is outside the VCN of the source compute instance, then the packet originating from the source compute instance is communicated from the host machine hosting the source compute instance to the NVD connected to that host machine. The NVD executes the VNIC associated with the source compute instance. Since the destination end point of the packet is outside the VCN, the packet is then processed by the VCN VR for that VCN. The NVD invokes the VCN VR functionality, which may result in the packet being forwarded to an NVD executing the appropriate gateway associated with the VCN. For example, if the destination is an endpoint within the customer's on-premise network, then the packet may be forwarded by the VCN VR to the NVD executing the DRG gateway configured for the VCN. The VCN VR may be executed on the same NVD as the NVD executing the VNIC associated with the source compute instance or by a different NVD. The gateway may be executed by an NVD, which may be a smartNIC, a host machine, or other NVD implementation. The packet is then processed by the gateway and forwarded to a next hop that facilitates communication of the packet to its intended destination endpoint. For example, in the embodiment depicted in FIG. 14, a packet originating from compute instance 1468 may be communicated from host machine 1402 to NVD 1410 over link 1420 (using NIC 1432). On NVD 1410, VNIC 1476 is invoked since it is the VNIC associated with source compute instance 1468. VNIC 1476 is configured to examine the encapsulated information in the packet, and determine a next hop for forwarding the packet with the goal of facilitating communication of the packet to its intended destination endpoint, and then forward the packet to the determined next hop.

A compute instance deployed on a VCN can communicate with various different endpoints. These endpoints may include endpoints that are hosted by CSPI 1400 and endpoints outside CSPI 1400. Endpoints hosted by CSPI 1400 may include instances in the same VCN or other VCNs, which may be the customer's VCNs, or VCNs not belonging to the customer. Communications between endpoints hosted by CSPI 1400 may be performed over physical network 1418. A compute instance may also communicate with endpoints that are not hosted by CSPI 1400, or are outside CSPI 1400. Examples of these endpoints include endpoints within a customer's on-premise network or data center, or public endpoints accessible over a public network such as the Internet. Communications with endpoints outside CSPI 1400 may be performed over public networks (e.g., the Internet) (not shown in FIG. 14) or private networks (not shown in FIG. 14) using various communication protocols.

The architecture of CSPI 1400 depicted in FIG. 14 is merely an example and is not intended to be limiting. Variations, alternatives, and modifications are possible in alternative embodiments. For example, in some implementations, CSPI 1400 may have more or fewer systems or components than those shown in FIG. 14, may combine two or more systems, or may have a different configuration or arrangement of systems. The systems, subsystems, and other components depicted in FIG. 14 may be implemented in software (e.g., code, instructions, program) executed by one or more processing units (e.g., processors, cores) of the respective systems, using hardware, or combinations thereof. The software may be stored on a non-transitory storage medium (e.g., on a memory device).

Figure 16:
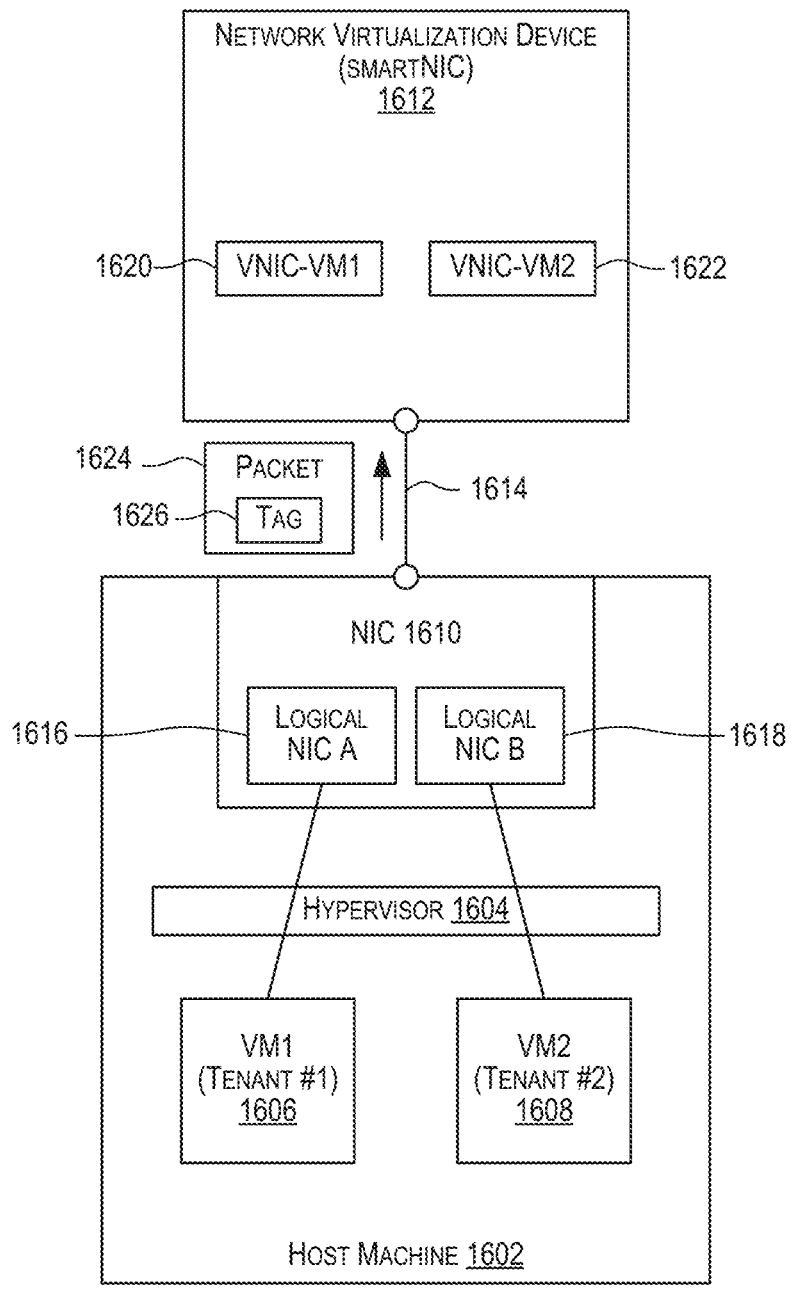
FIG. 16 depicts connectivity between a host machine and an NVD for providing I/O virtualization for supporting multitenancy according to certain embodiments.

FIG. 16 depicts connectivity between a host machine and an NVD for providing I/O virtualization for supporting multitenancy according to certain embodiments. As depicted in FIG. 16, host machine 1602 executes a hypervisor 1604 that provides a virtualized environment. Host machine 1602 executes two virtual machine instances, VM1 1606 belonging to customer/tenant #1 and VM2 1608 belonging to customer/tenant #2. Host machine 1602 comprises a physical NIC 1610 that is connected to an NVD 1612 via link 1614. Each of the compute instances is attached to a VNIC that is executed by NVD 1612. In the embodiment in FIG. 16, VM1 1606 is attached to VNIC-VM1 1620 and VM2 1608 is attached to VNIC-VM2 1622.

As shown in FIG. 16, NIC 1610 comprises two logical NICs, logical NIC A 1616 and logical NIC B 1618. Each virtual machine is attached to and configured to work with its own logical NIC. For example, VM1 1606 is attached to logical MC A 1616 and VM2 1608 is attached to logical NIC B 1618. Even though host machine 1602 comprises only one physical NIC 1610 that is shared by the multiple tenants, due to the logical NICs, each tenant's virtual machine believes they have their own host machine and NIC.

In certain embodiments, each logical NIC is assigned its own VLAN ID. Thus, a specific VLAN ID is assigned to logical NIC A 1616 for Tenant #1 and a separate VLAN ID is assigned to logical NIC B 1618 for Tenant #2. When a packet is communicated from VM1 1606, a tag assigned to Tenant #1 is attached to the packet by the hypervisor and the packet is then communicated from host machine 1602 to NVD 1612 over link 1614. In a similar manner, when a packet is communicated from VM2 1608, a tag assigned to Tenant #2 is attached to the packet by the hypervisor and the packet is then communicated from host machine 1602 to NVD 1612 over link 1614. Accordingly, a packet 1624 communicated from host machine 1602 to NVD 1612 has an associated tag 1626 that identifies a specific tenant and associated VM. On the NVD, for a packet 1624 received from host machine 1602, the tag 1626 associated with the packet is used to determine whether the packet is to be processed by VNIC-VM1 1620 or by VNIC-VM2 1622. The packet is then processed by the corresponding VNIC. The configuration depicted in FIG. 16 enables each tenant's compute instance to believe that they own their own host machine and NIC. The setup depicted in FIG. 16 provides for I/O virtualization for supporting multi-tenancy.

FIG. 17 depicts a simplified block diagram of a physical network 1700 according to certain embodiments. The embodiment depicted in FIG. 17 is structured as a Clos network. A Clos network is a particular type of network topology designed to provide connection redundancy while maintaining high bisection bandwidth and maximum resource utilization. A Clos network is a type of non-blocking, multistage or multi-tiered switching network, where the number of stages or tiers can be two, three, four, five, etc. The embodiment depicted in FIG. 17 is a 3-tiered network comprising tiers 1, 2, and 3. The TOR switches 1704 represent Tier-0 switches in the Clos network. One or more NVDs are connected to the TOR switches. Tier-0 switches are also referred to as edge devices of the physical network. The Tier-0 switches are connected to Tier-1 switches, which are also referred to as leaf switches. In the embodiment depicted in FIG. 17, a set of "n" Tier-0 TOR switches are connected to a set of "n" Tier-1 switches and together form a pod. Each Tier-0 switch in a pod is interconnected to all the Tier-1 switches in the pod, but there is no connectivity of switches between pods. In certain implementations, two pods are referred to as a block. Each block is served by or connected to a set of "n" Tier-2 switches (sometimes referred to as spine switches). There can be several blocks in the physical network topology. The Tier-2 switches are in turn connected to "n" Tier-3 switches (sometimes referred to as super-spine switches). Communication of packets over physical network 1700 is typically performed using one or more Layer-3 communication protocols. Typically, all the layers of the physical network, except for the TORs layer are n-ways redundant thus allowing for high availability. Policies may be specified for pods and blocks to control the visibility of switches to each other in the physical network so as to enable scaling of the physical network.

A feature of a Clos network is that the maximum hop count to reach from one Tier-0 switch to another Tier-0 switch (or from an NVD connected to a Tier-0-switch to another NVD connected to a Tier-0 switch) is fixed. For example, in a 3-Tiered Clos network at most seven hops are needed for a packet to reach from one NVD to another NVD, where the source and target NVDs are connected to the leaf tier of the Clos network. Likewise, in a 4-tiered Clos network, at most nine hops are needed for a packet to reach from one NVD to another NVD, where the source and target NVDs are connected to the leaf tier of the Clos network. Thus, a Clos network architecture maintains consistent latency throughout the network, which is important for communication within and between data centers. A Clos topology scales horizontally and is cost effective. The bandwidth/throughput capacity of the network can be easily increased by adding more switches at the various tiers (e.g., more leaf and spine switches) and by increasing the number of links between the switches at adjacent tiers.

In certain embodiments, each resource within CSPI is assigned a unique identifier called a Cloud Identifier (CID).

This identifier is included as part of the resource's information and can be used to manage the resource, for example, via a Console or through APIs. An example syntax for a CID is:

ocid1.<RESOURCE TYPE>.<REALM>.[REGION][.FUTURE USE].<UNIQUE ID> where,
ocid1: The literal string indicating the version of the CID;
resource type: The type of resource (for example, instance, volume, VCN, subnet, user, group, and so on);
realm: The realm the resource is in. Example values are "c1" for the commercial realm, "c2" for the Government Cloud realm, or "c3" for the Federal Government Cloud realm, etc. Each realm may have its own domain name;
region: The region the resource is in. If the region is not applicable to the resource, this part might be blank;
future use: Reserved for future use.
unique ID: The unique portion of the ID. The format may vary depending on the type of resource or service.

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 18:
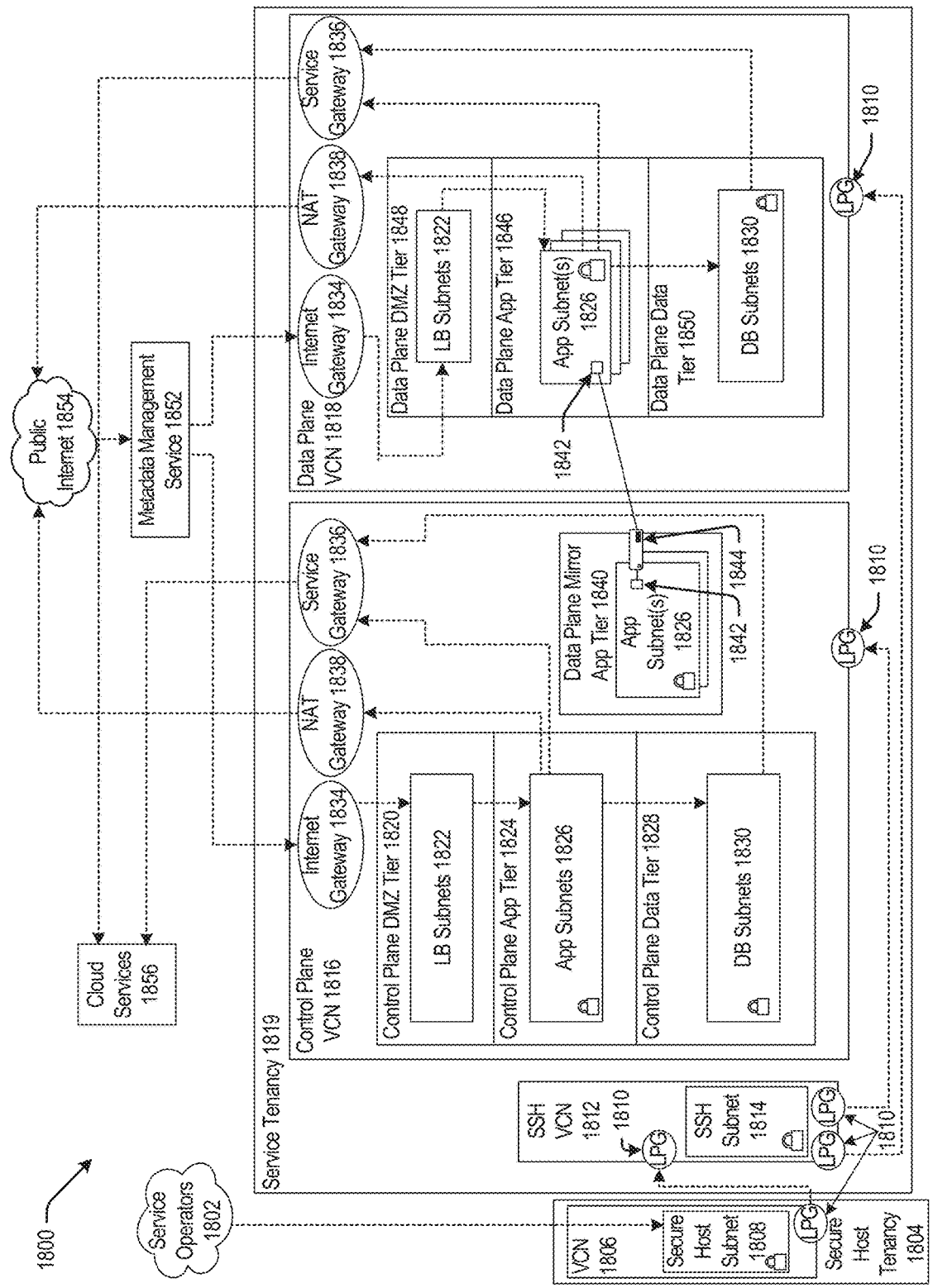
FIG. 18 is a block diagram illustrating one pattern for implementing a cloud infrastructure as a service system, according to at least one embodiment.

FIG. 18 is a block diagram 1800 illustrating an example pattern of an IaaS architecture, according to at least one embodiment. Service operators 1802 can be communicatively coupled to a secure host tenancy 1804 that can include a virtual cloud network (VCN) 1806 and a secure host subnet 1808. In some examples, the service operators 1802 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 13, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 1806 and/or the Internet.

The VCN 1806 can include a local peering gateway (LPG) 1810 that can be communicatively coupled to a secure shell (SSH) VCN 1812 via an LPG 1810 contained in the SSH VCN 1812. The SSH VCN 1812 can include an SSH subnet 1814, and the SSH VCN 1812 can be communicatively coupled to a control plane VCN 1816 via the LPG 1810 contained in the control plane VCN 1816. Also, the SSH VCN 1812 can be communicatively coupled to a data plane VCN 1818 via an LPG 1810. The control plane VCN 1816 and the data plane VCN 1818 can be contained in a service tenancy 1819 that can be owned and/or operated by the IaaS provider.

The control plane VCN 1816 can include a control plane demilitarized zone (DMZ) tier 1820 that acts as a perimeter network (e.g., portions of a corporate network between the corporate intranet and external networks). The DMZ-based servers may have restricted responsibilities and help keep security breaches contained. Additionally, the DMZ tier 1820 can include one or more load balancer (LB) subnet(s) 1822, a control plane app tier 1824 that can include app subnet(s) 1826, a control plane data tier 1828 that can include database (DB) subnet(s) 1830 (e.g., frontend DB subnet(s) and/or backend DB subnet(s)). The LB subnet(s) 1822 contained in the control plane DMZ tier 1820 can be communicatively coupled to the app subnet(s) 1826 contained in the control plane app tier 1824 and an Internet gateway 1834 that can be contained in the control plane VCN 1816, and the app subnet(s) 1826 can be communicatively coupled to the DB subnet(s) 1830 contained in the control plane data tier 1828 and a service gateway 1836 and a network address translation (NAT) gateway 1838. The control plane VCN 1816 can include the service gateway 1836 and the NAT gateway 1838.

The control plane VCN 1816 can include a data plane mirror app tier 1840 that can include app subnet(s) 1826. The app subnet(s) 1826 contained in the data plane mirror app tier 1840 can include a virtual network interface controller (VNIC) 1842 that can execute a compute instance 1844. The compute instance 1844 can communicatively couple the app subnet(s) 1826 of the data plane mirror app tier 1840 to app subnet(s) 1826 that can be contained in a data plane app tier 1846.

The data plane VCN 1818 can include the data plane app tier 1846, a data plane DMZ tier 1848, and a data plane data tier 1850. The data plane DMZ tier 1848 can include LB subnet(s) 1822 that can be communicatively coupled to the app subnet(s) 1826 of the data plane app tier 1846 and the Internet gateway 1834 of the data plane VCN 1818. The app subnet(s) 1826 can be communicatively coupled to the service gateway 1836 of the data plane VCN 1818 and the NAT gateway 1838 of the data plane VCN 1818. The data plane data tier 1850 can also include the DB subnet(s) 1830 that can be communicatively coupled to the app subnet(s) 1826 of the data plane app tier 1846.

The Internet gateway 1834 of the control plane VCN 1816 and of the data plane VCN 1818 can be communicatively coupled to a metadata management service 1852 that can be communicatively coupled to public Internet 1854. Public Internet 1854 can be communicatively coupled to the NAT gateway 1838 of the control plane VCN 1816 and of the data plane VCN 1818. The service gateway 1836 of the control plane VCN 1816 and of the data plane VCN 1818 can be communicatively couple to cloud services 1856.

In some examples, the service gateway 1836 of the control plane VCN 1816 or of the data plane VCN 1818 can make application programming interface (API) calls to cloud services 1856 without going through public Internet 1854. The API calls to cloud services 1856 from the service gateway 1836 can be one-way: the service gateway 1836 can make API calls to cloud services 1856, and cloud services 1856 can send requested data to the service gateway 1836. But, cloud services 1856 may not initiate API calls to the service gateway 1836.

In some examples, the secure host tenancy 1804 can be directly connected to the service tenancy 1819, which may be otherwise isolated. The secure host subnet 1808 can communicate with the SSH subnet 1814 through an LPG 1810 that may enable two-way communication over an otherwise isolated system. Connecting the secure host subnet 1808 to the SSH subnet 1814 may give the secure host subnet 1808 access to other entities within the service tenancy 1819.

The control plane VCN 1816 may allow users of the service tenancy 1819 to set up or otherwise provision desired resources. Desired resources provisioned in the control plane VCN 1816 may be deployed or otherwise used in the data plane VCN 1818. In some examples, the control plane VCN 1816 can be isolated from the data plane VCN 1818, and the data plane mirror app tier 1840 of the control plane VCN 1816 can communicate with the data plane app tier 1846 of the data plane VCN 1818 via VNICs 1842 that can be contained in the data plane mirror app tier 1840 and the data plane app tier 1846.

In some examples, users of the system, or customers, can make requests, for example create, read, update, or delete (CRUD) operations, through public Internet 1854 that can communicate the requests to the metadata management service 1852. The metadata management service 1852 can communicate the request to the control plane VCN 1816 through the Internet gateway 1834. The request can be received by the LB subnet(s) 1822 contained in the control plane DMZ tier 1820. The LB subnet(s) 1822 may determine that the request is valid, and in response to this determination, the LB subnet(s) 1822 can transmit the request to app subnet(s) 1826 contained in the control plane app tier 1824. If the request is validated and requires a call to public Internet 1854, the call to public Internet 1854 may be transmitted to the NAT gateway 1838 that can make the call to public Internet 1854. Memory that may be desired to be stored by the request can be stored in the DB subnet(s) 1830.

In some examples, the data plane mirror app tier 1840 can facilitate direct communication between the control plane VCN 1816 and the data plane VCN 1818. For example, changes, updates, or other suitable modifications to configuration may be desired to be applied to the resources contained in the data plane VCN 1818. Via a VNIC 1842, the control plane VCN 1816 can directly communicate with, and can thereby execute the changes, updates, or other suitable modifications to configuration to, resources contained in the data plane VCN 1818.

In some embodiments, the control plane VCN 1816 and the data plane VCN 1818 can be contained in the service tenancy 1819. In this case, the user, or the customer, of the system may not own or operate either the control plane VCN 1816 or the data plane VCN 1818. Instead, the IaaS provider may own or operate the control plane VCN 1816 and the data plane VCN 1818, both of which may be contained in the service tenancy 1819. This embodiment can enable isolation of networks that may prevent users or customers from interacting with other users', or other customers', resources. Also, this embodiment may allow users or customers of the system to store databases privately without needing to rely on public Internet 1854, which may not have a desired level of security, for storage.

In other embodiments, the LB subnet(s) 1822 contained in the control plane VCN 1816 can be configured to receive a signal from the service gateway 1836. In this embodiment, the control plane VCN 1816 and the data plane VCN 1818 may be configured to be called by a customer of the IaaS provider without calling public Internet 1854. Customers of the IaaS provider may desire this embodiment since database(s) that the customers use may be controlled by the IaaS provider and may be stored on the service tenancy 1819, which may be isolated from public Internet 1854.

Figure 19:
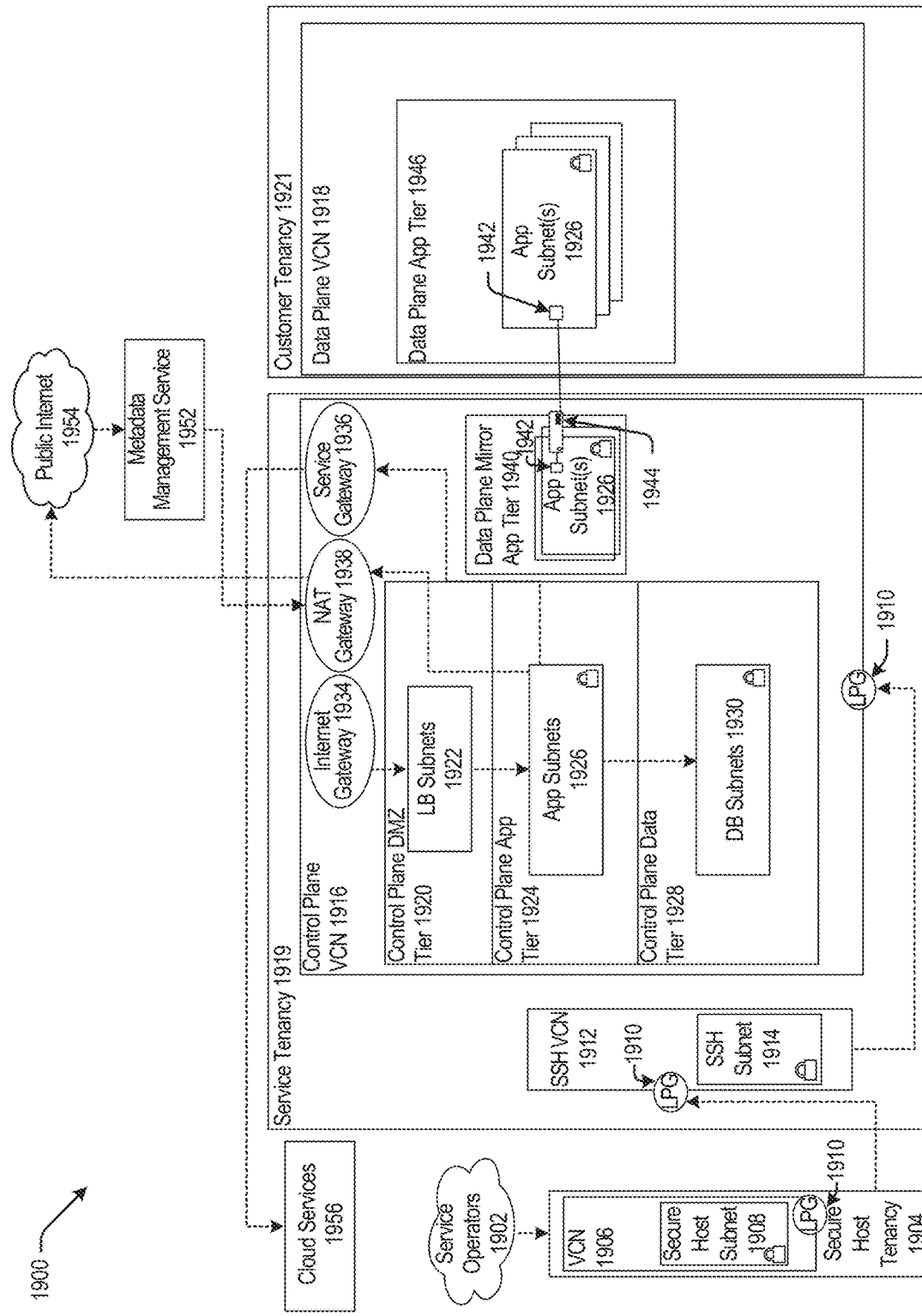
FIG. 19 is a block diagram illustrating another pattern for implementing a cloud infrastructure as a service system, according to at least one embodiment.

FIG. 19 is a block diagram 1900 illustrating another example pattern of an IaaS architecture, according to at least one embodiment. Service operators 1902 (e.g. service operators 1802 of FIG. 18) can be communicatively coupled to a secure host tenancy 1904 (e.g. the secure host tenancy 1804 of FIG. 18) that can include a virtual cloud network (VCN) 1906 (e.g. the VCN 1806 of FIG. 18) and a secure host subnet 1908 (e.g. the secure host subnet 1808 of FIG. 18). The VCN 1906 can include a local peering gateway (LPG) 1910 (e.g. the LPG 1810 of FIG. 18) that can be communicatively coupled to a secure shell (SSH) VCN 1912 (e.g. the SSH VCN 1812 of FIG. 18) via an LPG 1810 contained in the SSH VCN 1912. The SSH VCN 1912 can include an SSH subnet 1914 (e.g. the SSH subnet 1814 of FIG. 18), and the SSH VCN 1912 can be communicatively coupled to a control plane VCN 1916 (e.g. the control plane VCN 1816 of FIG. 18) via an LPG 1910 contained in the control plane VCN 1916. The control plane VCN 1916 can be contained in a service tenancy 1919 (e.g. the service tenancy 1819 of FIG. 18), and the data plane VCN 1918 (e.g. the data plane VCN 1818 of FIG. 18) can be contained in a customer tenancy 1921 that may be owned or operated by users, or customers, of the system.

The control plane VCN 1916 can include a control plane DMZ tier 1920 (e.g. the control plane DMZ tier 1820 of FIG. 18) that can include LB subnet(s) 1922 (e.g. LB subnet(s) 1822 of FIG. 18), a control plane app tier 1924 (e.g. the control plane app tier 1824 of FIG. 18) that can include app subnet(s) 1926 (e.g. app subnet(s) 1826 of FIG. 18), a control plane data tier 1928 (e.g. the control plane data tier 1828 of FIG. 18) that can include database (DB) subnet(s) 1930 (e.g. similar to DB subnet(s) 1830 of FIG. 18). The LB subnet(s) 1922 contained in the control plane DMZ tier 1920 can be communicatively coupled to the app subnet(s) 1926 contained in the control plane app tier 1924 and an Internet gateway 1934 (e.g. the Internet gateway 1834 of FIG. 18) that can be contained in the control plane VCN 1916, and the app subnet(s) 1926 can be communicatively coupled to the DB subnet(s) 1930 contained in the control plane data tier 1928 and a service gateway 1936 (e.g. the service gateway of FIG. 18) and a network address translation (NAT) gateway 1938 (e.g. the NAT gateway 1838 of FIG. 18). The control plane VCN 1916 can include the service gateway 1936 and the NAT gateway 1938.

The control plane VCN 1916 can include a data plane mirror app tier 1940 (e.g. the data plane mirror app tier 1840 of FIG. 18) that can include app subnet(s) 1926. The app subnet(s) 1926 contained in the data plane mirror app tier 1940 can include a virtual network interface controller (VNIC) 1942 (e.g. the VNIC of 1842) that can execute a compute instance 1944 (e.g. similar to the compute instance 1844 of FIG. 18). The compute instance 1944 can facilitate communication between the app subnet(s) 1926 of the data plane mirror app tier 1940 and the app subnet(s) 1926 that can be contained in a data plane app tier 1946 (e.g. the data plane app tier 1846 of FIG. 18) via the VNIC 1942 contained in the data plane mirror app tier 1940 and the VNIC 1942 contained in the data plane app tier 1946.

The Internet gateway 1934 contained in the control plane VCN 1916 can be communicatively coupled to a metadata management service 1952 (e.g. the metadata management service 1852 of FIG. 18) that can be communicatively coupled to public Internet 1954 (e.g. public Internet 1854 of FIG. 18). Public Internet 1954 can be communicatively coupled to the NAT gateway 1938 contained in the control plane VCN 1916. The service gateway 1936 contained in the control plane VCN 1916 can be communicatively couple to cloud services 1956 (e.g. cloud services 1856 of FIG. 18).

In some examples, the data plane VCN 1918 can be contained in the customer tenancy 1921. In this case, the IaaS provider may provide the control plane VCN 1916 for each customer, and the IaaS provider may, for each customer, set up a unique compute instance 1944 that is contained in the service tenancy 1919. Each compute instance 1944 may allow communication between the control plane VCN 1916, contained in the service tenancy 1919, and the data plane VCN 1918 that is contained in the customer tenancy 1921. The compute instance 1944 may allow resources, that are provisioned in the control plane VCN 1916 that is contained in the service tenancy 1919, to be deployed or otherwise used in the data plane VCN 1918 that is contained in the customer tenancy 1921.

In other examples, the customer of the IaaS provider may have databases that live in the customer tenancy 1921. In this example, the control plane VCN 1916 can include the data plane mirror app tier 1940 that can include app subnet(s) 1926. The data plane mirror app tier 1940 can reside in the data plane VCN 1918, but the data plane mirror app tier 1940 may not live in the data plane VCN 1918. That is, the data plane mirror app tier 1940 may have access to the customer tenancy 1921, but the data plane mirror app tier 1940 may not exist in the data plane VCN 1918 or be owned or operated by the customer of the IaaS provider. The data plane mirror app tier 1940 may be configured to make calls to the data plane VCN 1918 but may not be configured to make calls to any entity contained in the control plane VCN 1916. The customer may desire to deploy or otherwise use resources in the data plane VCN 1918 that are provisioned in the control plane VCN 1916, and the data plane mirror app tier 1940 can facilitate the desired deployment, or other usage of resources, of the customer.

In some embodiments, the customer of the IaaS provider can apply filters to the data plane VCN 1918. In this embodiment, the customer can determine what the data plane VCN 1918 can access, and the customer may restrict access to public Internet 1954 from the data plane VCN 1918. The IaaS provider may not be able to apply filters or otherwise control access of the data plane VCN 1918 to any outside networks or databases. Applying filters and controls by the customer onto the data plane VCN 1918, contained in the customer tenancy 1921, can help isolate the data plane VCN 1918 from other customers and from public Internet 1954.

In some embodiments, cloud services 1956 can be called by the service gateway 1936 to access services that may not exist on public Internet 1954, on the control plane VCN 1916, or on the data plane VCN 1918. The connection between cloud services 1956 and the control plane VCN 1916 or the data plane VCN 1918 may not be live or continuous. Cloud services 1956 may exist on a different network owned or operated by the IaaS provider. Cloud services 1956 may be configured to receive calls from the service gateway 1936 and may be configured to not receive calls from public Internet 1954. Some cloud services 1956 may be isolated from other cloud services 1956, and the control plane VCN 1916 may be isolated from cloud services 1956 that may not be in the same region as the control plane VCN 1916. For example, the control plane VCN 1916 may be located in "Region 1," and cloud service "Deployment 18," may be located in Region 1 and in "Region 2." If a call to Deployment 18 is made by the service gateway 1936 contained in the control plane VCN 1916 located in Region 1, the call may be transmitted to Deployment 18 in Region 1. In this example, the control plane VCN 1916, or Deployment 18 in Region 1, may not be communicatively coupled to, or otherwise in communication with, Deployment 18 in Region 2.

Figure 20:
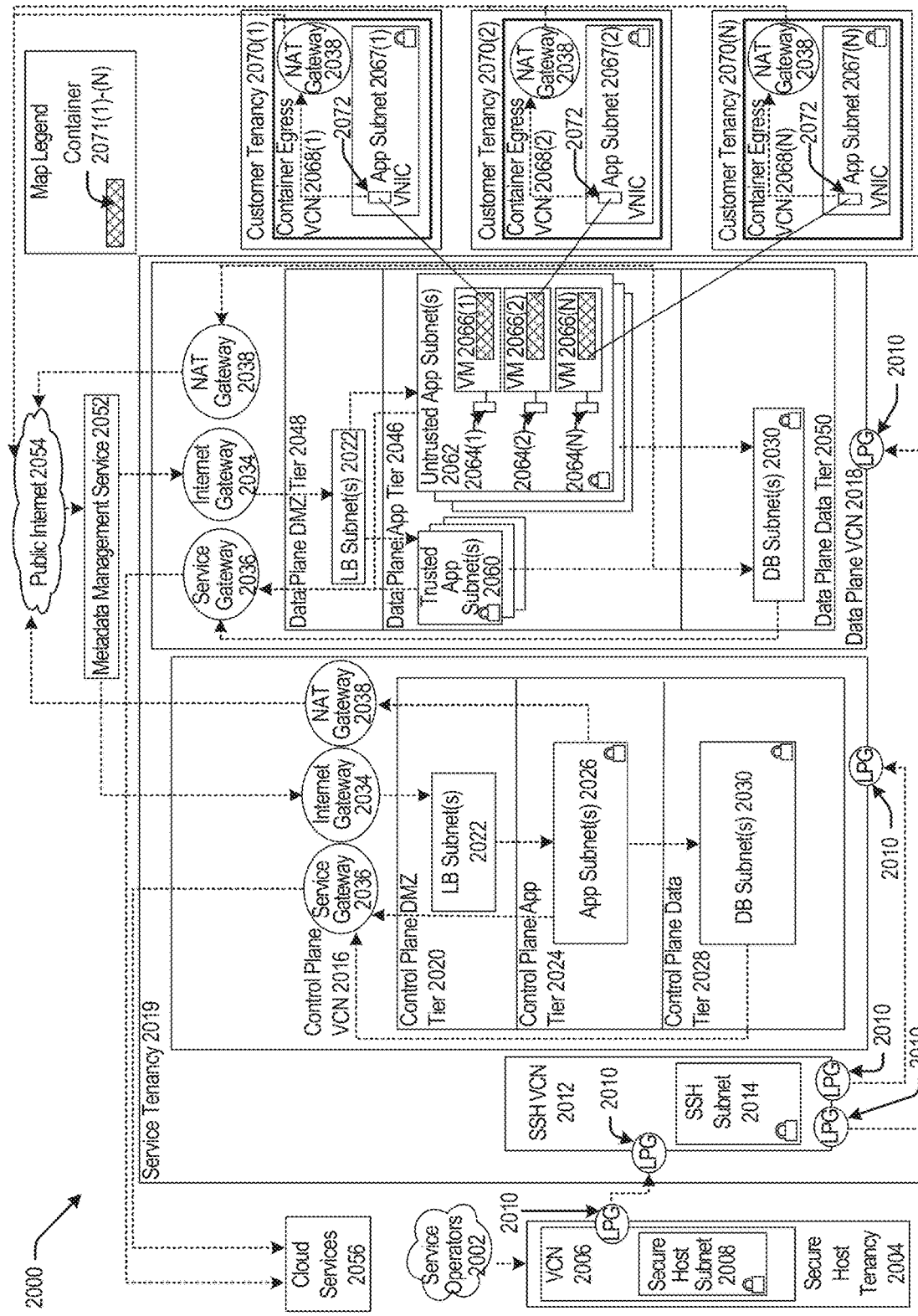
FIG. 20 is a block diagram illustrating another pattern for implementing a cloud infrastructure as a service system, according to at least one embodiment.

FIG. 20 is a block diagram 2000 illustrating another example pattern of an IaaS architecture, according to at least one embodiment. Service operators 2002 (e.g. service operators 1802 of FIG. 18) can be communicatively coupled to a secure host tenancy 2004 (e.g. the secure host tenancy 1804 of FIG. 18) that can include a virtual cloud network (VCN) 2006 (e.g. the VCN 1806 of FIG. 18) and a secure host subnet 2008 (e.g. the secure host subnet 1808 of FIG. 18). The VCN 2006 can include an LPG 2010 (e.g. the LPG 1810 of FIG. 18) that can be communicatively coupled to an SSH VCN 2012 (e.g. the SSH VCN 1812 of FIG. 18) via an LPG 2010 contained in the SSH VCN 2012. The SSH VCN 2012 can include an SSH subnet 2014 (e.g. the SSH subnet 1814 of FIG. 18), and the SSH VCN 2012 can be communicatively coupled to a control plane VCN 2016 (e.g. the control plane VCN 1816 of FIG. 18) via an LPG 2010 contained in the control plane VCN 2016 and to a data plane VCN 2018 (e.g. the data plane 1818 of FIG. 18) via an LPG 2010 contained in the data plane VCN 2018. The control plane VCN 2016 and the data plane VCN 2018 can be contained in a service tenancy 2019 (e.g. the service tenancy 1819 of FIG. 18).

The control plane VCN 2016 can include a control plane DMZ tier 2020 (e.g. the control plane DMZ tier 1820 of FIG. 18) that can include load balancer (LB) subnet(s) 2022 (e.g. LB subnet(s) 1822 of FIG. 18), a control plane app tier 2024 (e.g. the control plane app tier 1824 of FIG. 18) that can include app subnet(s) 2026 (e.g. similar to app subnet(s) 1826 of FIG. 18), a control plane data tier 2028 (e.g. the control plane data tier 1828 of FIG. 18) that can include DB subnet(s) 2030. The LB subnet(s) 2022 contained in the control plane DMZ tier 2020 can be communicatively coupled to the app subnet(s) 2026 contained in the control plane app tier 2024 and to an Internet gateway 2034 (e.g. the Internet gateway 1834 of FIG. 18) that can be contained in the control plane VCN 2016, and the app subnet(s) 2026 can be communicatively coupled to the DB subnet(s) 2030 contained in the control plane data tier 2028 and to a service gateway 2036 (e.g. the service gateway of FIG. 18) and a network address translation (NAT) gateway 2038 (e.g. the NAT gateway 1838 of FIG. 18). The control plane VCN 2016 can include the service gateway 2036 and the NAT gateway 2038.

The data plane VCN 2018 can include a data plane app tier 2046 (e.g. the data plane app tier 1846 of FIG. 18), a data plane DMZ tier 2048 (e.g. the data plane DMZ tier 1848 of FIG. 18), and a data plane data tier 2050 (e.g. the data plane data tier 1850 of FIG. 18). The data plane DMZ tier 2048 can include LB subnet(s) 2022 that can be communicatively coupled to trusted app subnet(s) 2060 and untrusted app subnet(s) 2062 of the data plane app tier 2046 and the Internet gateway 2034 contained in the data plane VCN 2018. The trusted app subnet(s) 2060 can be communicatively coupled to the service gateway 2036 contained in the data plane VCN 2018, the NAT gateway 2038 contained in the data plane VCN 2018, and DB subnet(s) 2030 contained in the data plane data tier 2050. The untrusted app subnet(s) 2062 can be communicatively coupled to the service gateway 2036 contained in the data plane VCN 2018 and DB subnet(s) 2030 contained in the data plane data tier 2050. The data plane data tier 2050 can include DB subnet(s) 2030 that can be communicatively coupled to the service gateway 2036 contained in the data plane VCN 2018.

The untrusted app subnet(s) 2062 can include one or more primary VNICs 2064(1)-(N) that can be communicatively coupled to tenant virtual machines (VMs) 2066(1)-(N). Each tenant VM 2066(1)-(N) can be communicatively coupled to a respective app subnet 2067(1)-(N) that can be contained in respective container egress VCNs 2068(1)-(N) that can be contained in respective customer tenancies 2070(1)-(N). Respective secondary VNICs 2072(1)-(N) can facilitate communication between the untrusted app subnet(s) 2062 contained in the data plane VCN 2018 and the app subnet contained in the container egress VCNs 2068(1)-(N). Each container egress VCNs 2068(1)-(N) can include a NAT gateway 2038 that can be communicatively coupled to public Internet 2054 (e.g. public Internet 1854 of FIG. 18).

The Internet gateway 2034 contained in the control plane VCN 2016 and contained in the data plane VCN 2018 can be communicatively coupled to a metadata management service 2052 (e.g. the metadata management system 1852 of FIG. 18) that can be communicatively coupled to public Internet 2054. Public Internet 2054 can be communicatively coupled to the NAT gateway 2038 contained in the control plane VCN 2016 and contained in the data plane VCN 2018. The service gateway 2036 contained in the control plane VCN 2016 and contained in the data plane VCN 2018 can be communicatively couple to cloud services 2056.

In some embodiments, the data plane VCN 2018 can be integrated with customer tenancies 2070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 2046. Code to run the function may be executed in the VMs 2066(1)-(N), and the code may not be configured to run anywhere else on the data plane VCN 2018. Each VM 2066(1)-(N) may be connected to one customer tenancy 2070. Respective containers 2071(1)-(N) contained in the VMs 2066(1)-(N) may be configured to run the code. In this case, there can be a dual isolation (e.g., the containers 2071(1)-(N) running code, where the containers 2071(1)-(N) may be contained in at least the VM 2066(1)-(N) that are contained in the untrusted app subnet(s) 2062), which may help prevent incorrect or otherwise undesirable code from damaging the network of the IaaS provider or from damaging a network of a different customer. The containers 2071 (1)-(N) may be communicatively coupled to the customer tenancy 2070 and may be configured to transmit or receive data from the customer tenancy 2070. The containers 2071 (1)-(N) may not be configured to transmit or receive data from any other entity in the data plane VCN 2018. Upon completion of running the code, the IaaS provider may kill or otherwise dispose of the containers 2071(1)-(N).

In some embodiments, the trusted app subnet(s) 2060 may run code that may be owned or operated by the IaaS provider. In this embodiment, the trusted app subnet(s) 2060 may be communicatively coupled to the DB subnet(s) 2030 and be configured to execute CRUD operations in the DB subnet(s) 2030. The untrusted app subnet(s) 2062 may be communicatively coupled to the DB subnet(s) 2030, but in this embodiment, the untrusted app subnet(s) may be configured to execute read operations in the DB subnet(s) 2030. The containers 2071(1)-(N) that can be contained in the VM 2066(1)-(N) of each customer and that may run code from the customer may not be communicatively coupled with the DB subnet(s) 2030.

In other embodiments, the control plane VCN 2016 and the data plane VCN 2018 may not be directly communicatively coupled. In this embodiment, there may be no direct communication between the control plane VCN 2016 and the data plane VCN 2018. However, communication can occur indirectly through at least one method. An LPG 2010 may be established by the IaaS provider that can facilitate communication between the control plane VCN 2016 and the data plane VCN 2018. In another example, the control plane VCN 2016 or the data plane VCN 2018 can make a call to cloud services 2056 via the service gateway 2036. For example, a call to cloud services 2056 from the control plane VCN 2016 can include a request for a service that can communicate with the data plane VCN 2018.

Figure 21:
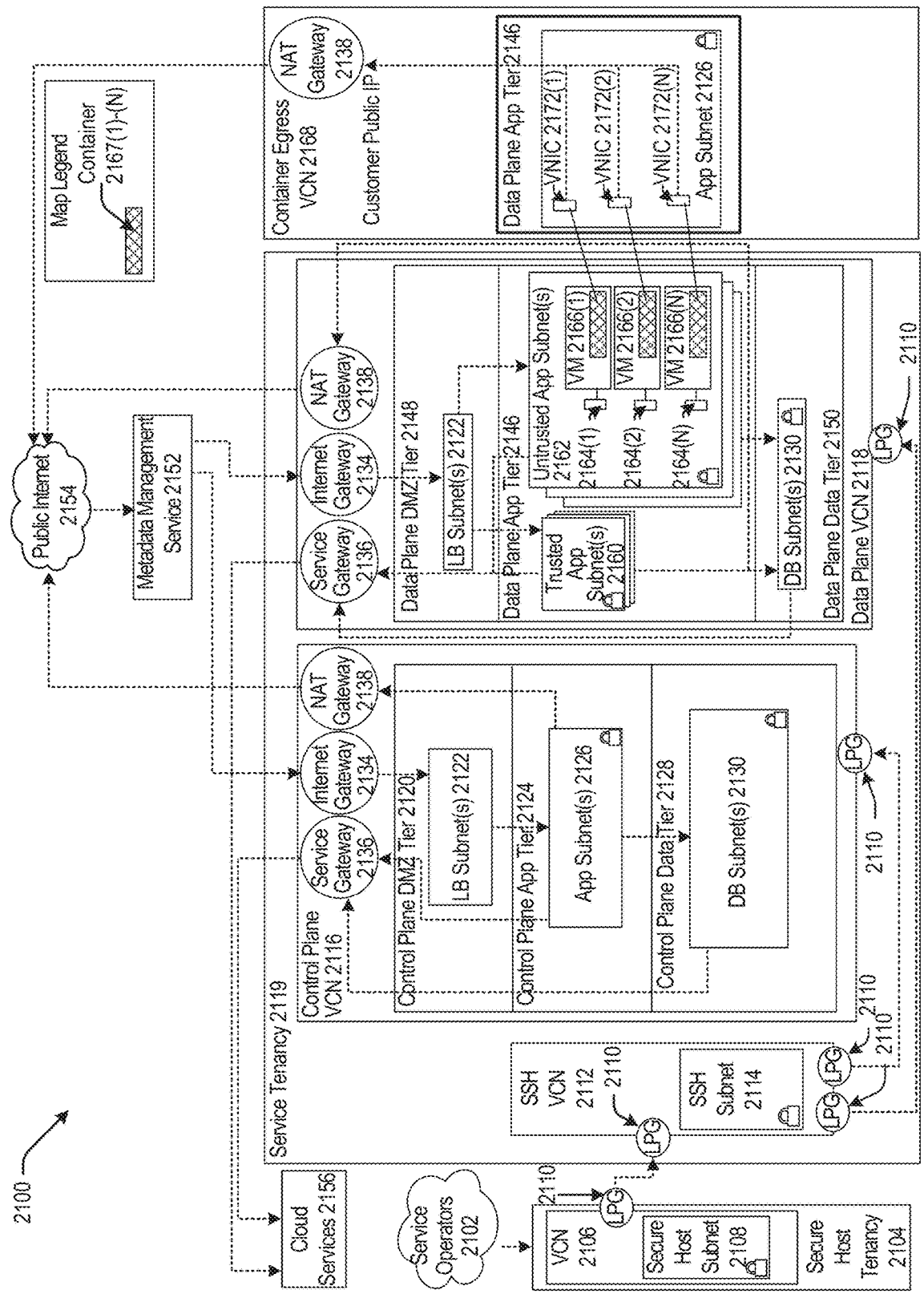
FIG. 21 is a block diagram illustrating another pattern for implementing a cloud infrastructure as a service system, according to at least one embodiment.

FIG. 21 is a block diagram 2100 illustrating another example pattern of an IaaS architecture, according to at least one embodiment. Service operators 2102 (e.g. service operators 1802 of FIG. 18) can be communicatively coupled to a secure host tenancy 2104 (e.g. the secure host tenancy 1804 of FIG. 18) that can include a virtual cloud network (VCN) 2106 (e.g. the VCN 1806 of FIG. 18) and a secure host subnet 2108 (e.g. the secure host subnet 1808 of FIG. 18). The VCN 2106 can include an LPG 2110 (e.g. the LPG 1810 of FIG. 18) that can be communicatively coupled to an SSH VCN 2112 (e.g. the SSH VCN 1812 of FIG. 18) via an LPG 2110 contained in the SSH VCN 2112. The SSH VCN 2112 can include an SSH subnet 2114 (e.g. the SSH subnet 1814 of FIG. 18), and the SSH VCN 2112 can be communicatively coupled to a control plane VCN 2116 (e.g. the control plane VCN 1816 of FIG. 18) via an LPG 2110 contained in the control plane VCN 2116 and to a data plane VCN 2118 (e.g. the data plane 1818 of FIG. 18) via an LPG 2110 contained in the data plane VCN 2118. The control plane VCN 2116 and the data plane VCN 2118 can be contained in a service tenancy 2119 (e.g. the service tenancy 1819 of FIG. 18).

The control plane VCN 2116 can include a control plane DMZ tier 2120 (e.g. the control plane DMZ tier 1820 of FIG. 18) that can include LB subnet(s) 2122 (e.g. LB subnet(s) 1822 of FIG. 18), a control plane app tier 2124 (e.g. the control plane app tier 1824 of FIG. 18) that can include app subnet(s) 2126 (e.g. app subnet(s) 1826 of FIG. 18), a control plane data tier 2128 (e.g. the control plane data tier 1828 of FIG. 18) that can include DB subnet(s) 2130 (e.g. DB subnet(s) 2030 of FIG. 20). The LB subnet(s) 2122 contained in the control plane DMZ tier 2120 can be communicatively coupled to the app subnet(s) 2126 contained in the control plane app tier 2124 and to an Internet gateway 2134 (e.g. the Internet gateway 1834 of FIG. 18) that can be contained in the control plane VCN 2116, and the app subnet(s) 2126 can be communicatively coupled to the DB subnet(s) 2130 contained in the control plane data tier 2128 and to a service gateway 2136 (e.g. the service gateway of FIG. 18) and a network address translation (NAT) gateway 2138 (e.g. the NAT gateway 1838 of FIG. 18). The control plane VCN 2116 can include the service gateway 2136 and the NAT gateway 2138.

The data plane VCN 2118 can include a data plane app tier 2146 (e.g. the data plane app tier 1846 of FIG. 18), a data plane DMZ tier 2148 (e.g. the data plane DMZ tier 1848 of FIG. 18), and a data plane data tier 2150 (e.g. the data plane data tier 1850 of FIG. 18). The data plane DMZ tier 2148 can include LB subnet(s) 2122 that can be communicatively coupled to trusted app subnet(s) 2160 (e.g. trusted app subnet(s) 2060 of FIG. 20) and untrusted app subnet(s) 2162 (e.g. untrusted app subnet(s) 2062 of FIG. 20) of the data plane app tier 2146 and the Internet gateway 2134 contained in the data plane VCN 2118. The trusted app subnet(s) 2160 can be communicatively coupled to the service gateway 2136 contained in the data plane VCN 2118, the NAT gateway 2138 contained in the data plane VCN 2118, and DB subnet(s) 2130 contained in the data plane data tier 2150. The untrusted app subnet(s) 2162 can be communicatively coupled to the service gateway 2136 contained in the data plane VCN 2118 and DB subnet(s) 2130 contained in the data plane data tier 2150. The data plane data tier 2150 can include DB subnet(s) 2130 that can be communicatively coupled to the service gateway 2136 contained in the data plane VCN 2118.

The untrusted app subnet(s) 2162 can include primary VNICs 2164(1)-(N) that can be communicatively coupled to tenant virtual machines (VMs) 2166(1)-(N) residing within the untrusted app subnet(s) 2162. Each tenant VM 2166(1)-(N) can run code in a respective container 2167(1)-(N), and be communicatively coupled to an app subnet 2126 that can be contained in a data plane app tier 2146 that can be contained in a container egress VCN 2168. Respective secondary VNICs 2172(1)-(N) can facilitate communication between the untrusted app subnet(s) 2162 contained in the data plane VCN 2118 and the app subnet contained in the container egress VCN 2168. The container egress VCN can include a NAT gateway 2138 that can be communicatively coupled to public Internet 2154 (e.g. public Internet 1854 of FIG. 18).

The Internet gateway 2134 contained in the control plane VCN 2116 and contained in the data plane VCN 2118 can be communicatively coupled to a metadata management service 2152 (e.g. the metadata management system 1852 of FIG. 18) that can be communicatively coupled to public Internet 2154. Public Internet 2154 can be communicatively coupled to the NAT gateway 2138 contained in the control plane VCN 2116 and contained in the data plane VCN 2118. The service gateway 2136 contained in the control plane VCN 2116 and contained in the data plane VCN 2118 can be communicatively couple to cloud services 2156.

In some examples, the pattern illustrated by the architecture of block diagram 2100 of FIG. 21 may be considered an exception to the pattern illustrated by the architecture of block diagram 2000 of FIG. 20 and may be desirable for a customer of the IaaS provider if the IaaS provider cannot directly communicate with the customer (e.g., a disconnected region). The respective containers 2167(1)-(N) that are contained in the VMs 2166(1)-(N) for each customer can be accessed in real-time by the customer. The containers 2167(1)-(N) may be configured to make calls to respective secondary VNICs 2172(1)-(N) contained in app subnet(s) 2126 of the data plane app tier 2146 that can be contained in the container egress VCN 2168. The secondary VNICs 2172(1)-(N) can transmit the calls to the NAT gateway 2138 that may transmit the calls to public Internet 2154. In this example, the containers 2167(1)-(N) that can be accessed in real-time by the customer can be isolated from the control plane VCN 2116 and can be isolated from other entities contained in the data plane VCN 2118. The containers 2167(1)-(N) may also be isolated from resources from other customers.

In other examples, the customer can use the containers 2167(1)-(N) to call cloud services 2156. In this example, the customer may run code in the containers 2167(1)-(N) that requests a service from cloud services 2156. The containers 2167(1)-(N) can transmit this request to the secondary VNICs 2172(1)-(N) that can transmit the request to the NAT gateway that can transmit the request to public Internet 2154. Public Internet 2154 can transmit the request to LB subnet(s) 2122 contained in the control plane VCN 2116 via the Internet gateway 2134. In response to determining the request is valid, the LB subnet(s) can transmit the request to app subnet(s) 2126 that can transmit the request to cloud services 2156 via the service gateway 2136.

It should be appreciated that IaaS architectures 1800, 1900, 2000, 2100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

FIG. 22 illustrates an example computer system 2200, in which various embodiments may be implemented. The system 2200 may be used to implement any of the computer systems described above. As shown in the figure, computer system 2200 includes a processing unit 2204 that communicates with a number of peripheral subsystems via a bus subsystem 2202. These peripheral subsystems may include a processing acceleration unit 2206, an I/O subsystem 2208, a storage subsystem 2218 and a communications subsystem 2224. Storage subsystem 2218 includes tangible computer-readable storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative embodiments of the bus subsystem may utilize multiple buses. Bus subsystem 2202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 2204, which can be implemented as one or more integrated circuits (e.g., a conventional microprocessor or microcontroller), controls the operation of computer system 2200. One or more processors may be included in processing unit 2204. These processors may include single core or multicore processors. In certain embodiments, processing unit 2204 may be implemented as one or more independent processing units 2232 and/or 2234 with single or multicore processors included in each processing unit. In other embodiments, processing unit 2204 may also be implemented as a quad-core processing unit formed by integrating two dual-core processors into a single chip.

In various embodiments, processing unit 2204 can execute a variety of programs in response to program code and can maintain multiple concurrently executing programs or processes. At any given time, some or all of the program code to be executed can be resident in processor(s) 2204 and/or in storage subsystem 2218. Through suitable programming, processor(s) 2204 can provide various functionalities described above. Computer system 2200 may additionally include a processing acceleration unit 2206, which can include a digital signal processor (DSP), a special-purpose processor, and/or the like.

I/O subsystem 2208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 2200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 2200 may comprise a storage subsystem 2218 that comprises software elements, shown as being currently located within a system memory 2210. System memory 2210 may store program instructions that are loadable and executable on processing unit 2204, as well as data generated during the execution of these programs.

Depending on the configuration and type of computer system 2200, system memory 2210 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 2204. In some implementations, system memory 2210 may include multiple different types of memory, such as static random access memory (SRAM) or dynamic random access memory (DRAM). In some implementations, a basic input/output system (BIOS), containing the basic routines that help to transfer information between elements within computer system 2200, such as during start-up, may typically be stored in the ROM. By way of example, and not limitation, system memory 2210 also illustrates application programs 2212, which may include client applications, Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 22 OS, and Palm® OS operating systems.

Storage subsystem 2218 may also provide a tangible computer-readable storage medium for storing the basic programming and data constructs that provide the functionality of some embodiments. Software (programs, code modules, instructions) that when executed by a processor provide the functionality described above may be stored in storage subsystem 2218. These software modules or instructions may be executed by processing unit 2204. Storage subsystem 2218 may also provide a repository for storing data used in accordance with the present disclosure.

Storage subsystem 2200 may also include a computer-readable storage media reader 2220 that can further be connected to computer-readable storage media 2222. Together and, optionally, in combination with system memory 2210, computer-readable storage media 2222 may comprehensively represent remote, local, fixed, and/or removable storage devices plus storage media for temporarily and/or more permanently containing, storing, transmitting, and retrieving computer-readable information.

Computer-readable storage media 2222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 2200.

By way of example, computer-readable storage media 2222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to connect to one or more devices via the Internet. In some embodiments communications subsystem 2224 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.11 family standards, or other mobile communication technologies, or any combination thereof), global positioning system (GPS) receiver components, and/or other components. In some embodiments communications subsystem 2224 can provide wired network connectivity (e.g., Ethernet) in addition to or instead of a wireless interface.

In some embodiments, communications subsystem 2224 may also receive input communication in the form of structured and/or unstructured data feeds 2226, event streams 2228, event updates 2230, and the like on behalf of one or more users who may use computer system 2200.

By way of example, communications subsystem 2224 may be configured to receive data feeds 2226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 2224 may also be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to output the structured and/or unstructured data feeds 2226, event streams 2228, event updates 2230, and the like to one or more databases that may be in communication with one or more streaming data source computers coupled to computer system 2200.

Computer system 2200 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 2200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method, comprising:
    receiving, at a first processing node of a network interface card associated with a virtual network, a message intended for the virtual network and sent using a two-way communication protocol, the network interface card comprising a network virtualization device configured to implement the virtual network which is running on top of a physical network;
    converting, at the first processing node, the message from the two-way communication protocol to a one-way communication protocol;
    sending the message from the first processing node to a second processing node of the network interface card using the one-way communication protocol;
    receiving the message at the second processing node; and
    sending, from the second processing node, the message to a destination resource of the virtual network.

2. The method of claim 1, wherein the one-way communication protocol is user datagram protocol.

3. The method of claim 1, wherein the network interface card comprises a smart network interface card.

4. The method of claim 1, wherein the virtual network comprises a virtual cloud network.

5. The method of claim 1, wherein the virtual network is configured to not be connected to a public network.

6. The method of claim 1, wherein the message, after leaving the second processing node, passes through a filter chain before arriving at the destination resource.

7. The method of claim 1, wherein a connection between the first processing node and the second processing node is established using a networking cable.

8. The method of claim 7, wherein the connection established using the networking cable does not include a diode.

9. A non-transitory computer-readable storage medium storing a set of instructions, that, when executed by one or more processors of a computing device, cause the computing device to perform instructions comprising:
    receiving, at a first processing node of a network interface card associated with a virtual network, a message intended for the virtual network and sent using a two-way communication protocol, the network interface card comprising a network virtualization device configured to implement the virtual network which is running on top of a physical network;
    converting, at the first processing node, the message from the two-way communication protocol to a one-way communication protocol;
    sending the message from the first processing node to a second processing node of the network interface card using the one-way communication protocol;
    receiving the message at the second processing node; and
    sending, from the second processing node, the message to a destination resource of the virtual network.

10. The non-transitory computer-readable storage medium of claim 9, wherein the one-way communication protocol is user datagram protocol.

11. The non-transitory computer-readable storage medium of claim 9, wherein the network interface card comprises a smart network interface card.

12. The non-transitory computer-readable storage medium of claim 9, wherein the virtual network comprises a virtual cloud network.

13. The non-transitory computer-readable storage medium of claim 9, wherein the virtual network is configured to not be connected to a public network.

14. The non-transitory computer-readable storage medium of claim 9, wherein the message, after leaving the second processing node, passes through a filter chain before arriving at the destination resource.

15. The non-transitory computer-readable storage medium of claim 9, wherein a connection between the first processing node and the second processing node is a networking cable.

16. A network interface card associated with a virtual network, comprising:
    a first processing node;
    a second processing node;
    a memory storing computer-executable instructions; and
    one or more processors configured to access the first processing node, the second processing node, and the memory, and configured to execute the computer-executable instructions to at least:
        receive, at the first processing node, a message intended for the virtual network and sent using a two-way communication protocol, the network interface card comprising a network virtualization device configured to implement the virtual network which is running on top of a physical network;
        convert, at the first processing node, the message from the two-way communication protocol to a one-way communication protocol;
        send the message from the first processing node to the second processing node using the one-way communication protocol;
        receive the message at the second processing node; and
        send, from the second processing node, the message to a destination resource of the virtual network.

17. The network interface card of claim 16, wherein the one-way communication protocol is user datagram protocol.

18. The network interface card of claim 16, wherein the network interface card comprises a smart network interface card.

19. The network interface card of claim 16, wherein the virtual network comprises a virtual cloud network.

20. The network interface card of claim 16, wherein the message, after leaving the second processing node, passes through a filter chain before arriving at the destination resource.

21. The method of claim 1,
    wherein the network interface card is configured to, upon having determined that the message is from an untrusted source, convert the message at the first processing node from the two-way communication protocol to the one-way communication protocol and to send the message from the first processing node to the second processing node using the one-way communication protocol, and
    wherein the network interface card is configured to, upon having determined that the message is from a trusted source, send the message from the first processing node to the second processing node using the two-way communication protocol.

22. The method of claim 1,
wherein the message is received at the first processing node from a first source, and wherein converting the message from the two-way communication protocol to the one-way communication protocol is performed based on the message being received from the first source;
wherein the method further comprises:
  receiving, at the first processing node of the network interface card associated with the virtual network, a second message intended for the virtual network and sent using the two-way communication protocol, wherein the second message is received at the second processing node from a second source, wherein the second source is different from the first source;
  based on the second message being received from the second source, sending the second message from the first processing node to the second processing node of the network interface card using the two-way communication protocol;
  receiving the second message at the second processing node; and
  sending, from the second processing node, the second message to a second destination resource of the virtual network.

23. The method of claim 22, further comprising:
determining, at the first processing node, that the second source is a trusted source; and
sending the second message from the first processing node to the second processing node of the network interface card using the two-way communication protocol responsive to determining that the second source is the trusted source.

24. The method of claim 22, further comprising:
determining, at the first processing node, that the first source is an untrusted source; and
converting the message from the two-way communication protocol to the one-way communication protocol responsive to determining that the first source is the untrusted source.

25. The method of claim 22,
wherein the first source is a first streaming data source, and wherein the second source is a second streaming data source.

26. The method of claim 1,
wherein converting the message from the two-way communication protocol to the one-way communication protocol comprises:
  configuring the two-way communication protocol for one-way communication.

27. The method of claim 1,
wherein the message is a streaming message, and wherein converting the message from the two-way communication protocol to the one-way communication protocol comprises:
  repackaging the message into a format defined by the one-way communication protocol;
  wherein sending the message from the second processing node to the destination resource comprises:
    forwarding the message from the second processing node to the destination resource as having originated from the second processing node.

28. The method of claim 27, wherein receiving the message at the first processing node comprises:
  intercepting the streaming message at the first processing node, wherein the first processing node functions as a destination node.

29. The method of claim 28, wherein receiving the message at the first processing node comprises:
  intercepting the streaming message at the first processing node, wherein the streaming message comprises a plurality of message packets; and
  storing the plurality of message packets at the first processing node.

30. The method of claim 29,
wherein the destination resource is located within a secured network;
wherein forwarding the message from the second processing node to the destination resource as having originated from the second processing node comprises:
  sending the plurality of message packets from the second processing node to the destination resource using a network protocol employed in the secured network.

31. The method of claim 29, wherein the one-way communication protocol is a connectionless protocol.

32. The method of claim 1, further comprising:
determining that a conversion criteria for converting from the two-way communication protocol to the one-way communication protocol is met;
wherein converting the message from the two-way communication protocol to the one-way communication protocol is performed in response to determining that the conversion criteria is met.

33. The method of claim 32, wherein the conversion criteria comprises a set of one or more rules configured on the network interface card.

34. The method of claim 32, further comprising:
receiving, at the first processing node, a second message intended for the virtual network and sent using the one-way communication protocol;
determining that the conversion criteria for converting from the two-way communication protocol to the one-way communication protocol is unmet;
sending the second message from the first processing node to the second processing node of the network interface card using the one-way communication protocol;
receiving the second message at the second processing node; and
sending, from the second processing node, the second message to a second destination resource of the virtual network.

35. The method of claim 34,
wherein determining that the conversion criteria is met comprises determining that the message is configured according to the two-way communication protocol;
wherein determining that the conversion criteria is unmet comprises determining that the second message is configured according to the one-way communication protocol.

* * * * *

UNITED STATES PATENT AND TRADEMARK OFFICE
CERTIFICATE OF CORRECTION

PATENT NO. : 12,095,868 B2
APPLICATION NO. : 17/534187
DATED : September 17, 2024
INVENTOR(S) : Adogla et al.

It is certified that error appears in the above-identified patent and that said Letters Patent is hereby corrected as shown below:

In the Drawings

On sheet 4 of 22, in FIG. 4, under reference numeral 402, Line 1, delete "form" and insert -- from --, therefor.

On sheet 11 of 22, in FIG. 11, under reference numeral 1130, Line 2, delete "car" and insert -- card --, therefor.

On sheet 14 of 22, in FIG. 14, under reference numeral 1468, Line 2, delete "INTANCE" and insert -- INSTANCE --, therefor.

On sheet 14 of 22, in FIG. 14, under reference numeral 1474, Line 2, delete "INTANCE" and insert -- INSTANCE --, therefor.

In the Specification

In Column 1, Line 66, delete "or and" and insert -- or/and --, therefor.

In Column 3, Line 44, delete "loop," and insert -- loop. --, therefor.

In Column 4, Line 1, delete "(MC)," and insert -- (NIC), --, therefor.

In Column 10, Lines 27-28, delete "Messages" and insert -- messages --, therefor.

In Column 14, Line 12, delete "(STEM)" and insert -- (SIEM) --, therefor.

In Column 14, Line 15, delete "STEM" and insert -- SIEM --, therefor.

In Column 14, Line 58, delete "and or" and insert -- and/or --, therefor.

Signed and Sealed this
Twenty-eighth Day of January, 2025

Coke Morgan Stewart
*Acting Director of the United States Patent and Trademark Office*

In Column 16, Line 3, delete "(STEM)" and insert -- (SIEM) --, therefor.

In Column 19, Line 51, delete "message" and insert -- message. --, therefor.

In Column 33, Line 6, delete "and or" and insert -- and/or --, therefor.

In Column 43, Line 51, delete "MC" and insert -- NIC --, therefor.